United States Patent
Murphy et al.

(10) Patent No.: US 12,533,937 B2
(45) Date of Patent: Jan. 27, 2026

(54) STEPS AND MOUNTING FOR UNDERSLUNG BATTERY PACK

(71) Applicant: Oshkosh Corporation, Oshkosh, WI (US)

(72) Inventors: Mitchell Murphy, Oshkosh, WI (US); Mathew Ubachs, Oshkosh, WI (US); Ryan Wolf, Oshkosh, WI (US); Jon Branson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 286 days.

(21) Appl. No.: 18/171,111

(22) Filed: Feb. 17, 2023

(65) Prior Publication Data

US 2023/0415555 A1 Dec. 28, 2023

Related U.S. Application Data

(60) Provisional application No. 63/356,084, filed on Jun. 28, 2022.

(51) Int. Cl.
*B60K 1/04* (2019.01)
*B65F 3/02* (2006.01)
(Continued)

(52) U.S. Cl.
CPC ............... *B60K 1/04* (2013.01); *B65F 3/02* (2013.01); *H01M 50/204* (2021.01);
(Continued)

(58) Field of Classification Search
CPC .... B60K 2001/0405; B60K 2001/0438; B60K 2001/0444
See application file for complete search history.

(56) References Cited

U.S. PATENT DOCUMENTS 7,712,563 B2   5/2010 Niebuhr
10,493,837 B1  12/2019 Angelo et al.
(Continued)

FOREIGN PATENT DOCUMENTS

CN    206490114 U    9/2017
DE       323690 C    7/1920
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Erez Gurari
(74) *Attorney, Agent, or Firm* — Foley & Lardner LLP

(57) ABSTRACT

A refuse vehicle includes a chassis including a plurality of rails, a front and rear tractive assemblies coupled to the chassis, and a battery assembly. The battery assembly is coupled to the chassis between the front and rear tractive assemblies. The battery assembly includes a battery housing, a mounting assembly, and a support. The mounting assembly is coupled to the battery housing and the plurality of rails. The mounting assembly includes a isolator configured to stabilize the battery assembly. The support is positioned within the battery housing and extends along a midpoint of the battery housing. The isolator absorbs horizontal and vertical impact forces introduced to the battery assembly.

20 Claims, 50 Drawing Sheets

(51) Int. Cl.
*H01M 50/204* (2021.01)
*H01M 50/242* (2021.01)
*H01M 50/244* (2021.01)
*H01M 50/249* (2021.01)
*H01M 50/262* (2021.01)
*B62D 21/02* (2006.01)

(52) U.S. Cl.
CPC ....... *H01M 50/242* (2021.01); *H01M 50/244* (2021.01); *H01M 50/249* (2021.01); *H01M 50/262* (2021.01); *B62D 21/02* (2013.01); *B65F 2003/0279* (2013.01); *H01M 2220/20* (2013.01)

(56) References Cited

U.S. PATENT DOCUMENTS

| | | | |
|---|---|---|---|
| 10,899,214 | B2 | 1/2021 | Sloan et al. |
| 11,040,610 | B2 | 6/2021 | Sloan et al. |
| 11,043,714 | B2 | 6/2021 | Sloan et al. |
| 11,124,076 | B1 | 9/2021 | Borghi et al. |
| 11,312,221 | B2 | 4/2022 | Sloan et al. |
| 11,465,482 | B2 | 10/2022 | Menon et al. |
| 11,685,268 | B2 | 6/2023 | Sjätholm |
| 11,766,925 | B2 | 9/2023 | Landvik et al. |
| 11,772,474 | B2 | 10/2023 | Sloan et al. |
| 11,938,804 | B2 | 3/2024 | Andersson et al. |
| 12,157,362 | B2 | 12/2024 | Sloan et al. |
| 12,202,542 | B2 | 1/2025 | Hendriks |
| 12,208,669 | B2 | 1/2025 | Landvik |
| 2009/0000843 | A1 | 1/2009 | Burchett et al. |
| 2021/0155224 | A1 | 5/2021 | McKibben et al. |
| 2021/0188069 | A1* | 6/2021 | Friedman ................ B62D 27/06 |
| 2021/0213821 | A1 | 7/2021 | Sloan et al. |
| 2021/0305545 | A1* | 9/2021 | Garcia ................ H01M 50/244 |
| 2021/0380001 | A1 | 12/2021 | HÃ-Rder et al. |
| 2022/0021050 | A1 | 1/2022 | Sloan et al. |
| 2022/0021056 | A1 | 1/2022 | Sloan et al. |
| 2022/0111717 | A1* | 4/2022 | Hendriks ................ B60L 50/66 |
| 2022/0126706 | A1* | 4/2022 | Ragot .................... B60L 50/66 |
| 2022/0355140 | A1* | 11/2022 | Linsmeier .............. B60K 6/442 |
| 2022/0384893 | A1* | 12/2022 | Schneider ........... H01M 50/242 |
| 2023/0015644 | A1* | 1/2023 | Hörder .................... B60L 50/66 |
| 2023/0070769 | A1 | 3/2023 | Wheeler et al. |
| 2024/0047809 | A1* | 2/2024 | Arai .................... H01M 50/242 |
| 2024/0075821 | A1* | 3/2024 | Lundin ............... H01M 50/249 |
| 2024/0149657 | A1* | 5/2024 | Coupal-Sikes ....... F16B 43/001 |
| 2024/0166040 | A1 | 5/2024 | Coupal-Sikes et al. |
| 2024/0166060 | A1 | 5/2024 | Tyerman et al. |
| 2024/0356140 | A1* | 10/2024 | Zhang ................ H01M 50/289 |
| 2025/0042236 | A1 | 2/2025 | Maroney et al. |
| 2025/0135863 | A1* | 5/2025 | Shin .................... H01M 50/271 |
| 2025/0135899 | A1* | 5/2025 | Foley .................... B60L 53/18 |
| 2025/0153555 | A1* | 5/2025 | Little .................... B60L 50/66 |
| 2025/0162406 | A1* | 5/2025 | Landvik ................ B60K 15/07 |

FOREIGN PATENT DOCUMENTS

| | | |
|---|---|---|
| EP | 3 345 815 A1 | 7/2018 |
| EP | 4 438 365 A1 | 10/2024 |
| JP | H03-020045 A | 1/1991 |
| JP | 2012-250830 A | 12/2012 |
| WO | WO-2025/001202 A1 | 1/2025 |

OTHER PUBLICATIONS https://www.youtube.com/watch?v=NQFtAnm7D-c; "All-New Mack LR Electric Garbage Truck." Retrieved on Mar. 21, 2023.

* cited by examiner

STEPS AND MOUNTING FOR UNDERSLUNG BATTERY PACK

CROSS-REFERENCE TO RELATED PATENT APPLICATION

This application claims the benefit of and priority to U.S. Provisional Application No. 63/356,084, filed Jun. 28, 2022, the entire disclosure of which is incorporated by reference herein.

BACKGROUND

The present disclosure relates generally to vehicles. More specifically, the present disclosure relates to a battery pack mounting system for a vehicle.

SUMMARY

One implementation of the present disclosure is a refuse vehicle, according to some embodiments. In some embodiments, the refuse vehicle includes a chassis, tractive elements, and a battery assembly. In some embodiments, the chassis includes a first rail and a second rail spaced apart from each other in a lateral direction and extending lengthwise in a longitudinal direction. In some embodiments, the tractive elements are coupled with the chassis. In some embodiments, the battery assembly is coupled to the chassis at a longitudinal position between a front pair of the tractive elements and a rear pair of the tractive elements. In some embodiments, the battery assembly includes a housing defining an inner volume. In some embodiments, the housing includes a medial portion positioned between the first rail and the second rail. In some embodiments, the medial portion defines a first inner sub-volume. In some embodiments, a first battery is positioned within the first inner sub-volume. In some embodiments, the housing includes a first lateral portion positioned laterally outwards of the first rail. In some embodiments, the first lateral portion defines a second inner sub-volume. In some embodiments, a second battery is positioned within the second inner sub-volume. In some embodiments, the housing includes a second lateral portion positioned laterally outwards of the second rail. In some embodiments, the second lateral portion defines a third inner sub-volume. In some embodiments, a third battery is positioned within the third inner sub-volume.

In some embodiments, the battery assembly includes a mounting assembly configured to support the medial portion, the first lateral portion, and the second lateral portion. In some embodiments, the mounting assembly includes a first mounting body configured to directly couple with the first rail on a laterally outer surface of the first rail, and a second mounting body configured to directly couple with the second rail on a laterally outer surface of the second rail.

In some embodiments, the first mounting body directly contacts the laterally outer surface of the first rail and the second mounting body directly contacts the laterally outer surface of the second rail. In some embodiments, the first mounting body is coupled with the first rail by a first fastener that extends in the lateral direction, and the second mounting body is coupled with the second rail by a second fastener that extends in the lateral direction.

In some embodiments, the medial portion, the first lateral portion, and the second lateral portion are hang from the first mounting body and the second mounting body through an isolator. In some embodiments, the isolator is configured to absorb forces or impacts being transferred between the medial portion, the first lateral portion, the second lateral portion and the chassis.

In some embodiments, the medial portion, the first lateral portion, and the second lateral portion define a first channel between the medial portion and the first lateral portion, and a second channel between the medial portion and the second lateral portion. In some embodiments, the first channel is configured to receive the first rail and the second channel is configured to receive the second rail.

In some embodiments, an upper surface of the medial portion is positioned above a bottom of the first rail and the second rail and below a top of the first rail and the second rail. In some embodiments, an upper surface of the first lateral portion is positioned above the bottom of the first rail and the second rail and below the top of the first rail and the second rail. In some embodiments, an upper surface of the second lateral portion is positioned above the bottom of the first rail and the second rail and below the top of the first rail and the second rail.

In some embodiments, the medial portion, the first lateral portion, and the second lateral portion include a common bottom surface. In some embodiments, the common bottom surface is disposed a distance below a bottom of the first rail and the second rail.

In some embodiments, the first battery is a first medial battery. In some embodiments, the medial portion is configured to store a second medial battery within the first inner sub-volume. In some embodiments, the first medial battery is positioned within the first inner sub-volume and the second medial battery is also positioned within the first inner sub-volume. In some embodiments, the first medial battery extends upwards between the first rail and the second rail, and the second medial battery is positioned at a vertical position beneath a bottom of the first rail and the second rail.

In some embodiments, the second battery is a first lateral battery. In some embodiments, the first lateral portion is configured to store the first lateral battery and a second lateral battery within the second inner sub-volume. In some embodiments, the first lateral battery is positioned above the second lateral battery, an upper periphery of the first lateral battery extending upwards beyond a bottom periphery of the first rail and the second rail, and a bottom periphery of the second lateral battery extending downwards beyond the bottom periphery of the first rail and the second rail. In some embodiments, the refuse vehicle is a fully electric refuse vehicle and the first battery, the second battery, and the third battery are configured to provide electrical energy for transporting the refuse vehicle.

In some embodiments, at least one of the first lateral portion or the second lateral portion define multiple steps positioned on a laterally outer side of the battery assembly. In some embodiments, the steps are configured to facilitate access to a lateral side of the refuse vehicle by a technician.

Another implementation of the present disclosure is a chassis for a refuse vehicle, according to some embodiments. In some embodiments, the chassis includes a first rail and a second rail spaced apart from each other in a lateral direction and extending lengthwise in a longitudinal direction. In some embodiments, the chassis includes a battery assembly coupled to the first rail and the second rail. In some embodiments, the battery assembly includes a medial portion, a first lateral portion, and a second lateral portion. In some embodiments, the medial portion is positioned between the first rail and the second rail. In some embodiments, the medial portion defines a first inner sub-volume. In some embodiments, a first battery is positioned within the first inner sub-volume. In some embodiments, the first lateral portion is positioned laterally outwards of the first rail. In some embodiments, the first lateral portion defines a second inner sub-volume. In some embodiments, a second battery is positioned within the second inner sub-volume. In some embodiments, the second later housing is positioned laterally outwards of the second rail. In some embodiments, the second lateral portion defines a third inner sub-volume. In some embodiments, a third battery is positioned within the third inner sub-volume.

In some embodiments, the battery assembly further includes a mounting assembly configured to support the medial portion, the first lateral portion, and the second lateral portion. In some embodiments, the mounting assembly includes a first mounting body configured to directly couple with the first rail on a laterally outer surface of the first rail, and a second mounting body configured to directly couple with the second rail on a laterally outer surface of the second rail.

In some embodiments, the first mounting body directly contacts the laterally outer surface of the first rail and the second mounting body directly contact the laterally outer surface of the second rail. In some embodiments, the first mounting body is coupled with the first rail by a first fastener that extends in the lateral direction, and the second mounting body is coupled with the second rail by a second fastener that extends in the lateral direction.

In some embodiments, the medial portion, the first lateral portion, and the second lateral portion are hang from the first mounting body and the second mounting body through an isolator, In some embodiments, the isolator is configured to absorb forces or impacts being transferred between the medial portion, the first lateral portion, the second lateral portion and the chassis.

In some embodiments, the medial portion, the first lateral portion, and the second lateral portion define a first channel between the medial portion and the first lateral portion, and a second channel between the medial portion and the second lateral portion. In some embodiments, the first channel is configured to receive the first rail and the second channel is configured to receive the second rail.

In some embodiments, an upper surface of the medial portion is positioned above a bottom of the first rail and the second rail and below a top of the first rail and the second rail. In some embodiments, an upper surface of the first lateral portion is positioned above the bottom of the first rail and the second rail and below the top of the first rail and the second rail. In some embodiments, an upper surface of the second lateral portion is positioned above the bottom of the first rail and the second rail and below the top of the first rail and the second rail.

In some embodiments, the medial portion, the first lateral portion, and the second lateral portion include a common bottom surface. In some embodiments, the common bottom surface is disposed a distance below a bottom of the first rail and the second rail.

In some embodiments, the first battery is a first medial battery. In some embodiments, the medial portion is configured to store a second medial battery within the first inner sub-volume. In some embodiments, the first medial battery is positioned within the first inner sub-volume and the second medial battery is also positioned within the first inner sub-volume. In some embodiments, the first medial battery extends upwards between the first rail and the second rail, and the second medial battery is positioned at a vertical position beneath a bottom of the first rail and the second rail.

Another implementation of the present disclosure is a battery assembly for a refuse vehicle, according to some embodiments. In some embodiments, the battery assembly includes a housing defining an inner volume. In some embodiments, the housing includes a medial portion, a first lateral portion, and a second lateral portion. In some embodiments, the medial portion is positioned between a first rail and a second rail of a chassis of the refuse vehicle. In some embodiments, the medial portion defines a first inner sub-volume of the inner volume. In some embodiments, a first battery is positioned within the first inner sub-volume. In some embodiments, the first lateral portion is positioned laterally outwards of the first rail. In some embodiments, the first lateral portion defines a second inner sub-volume of the inner volume. In some embodiments, a second battery is positioned within the second inner sub-volume. In some embodiments, the second lateral portion is positioned laterally outwards of the second rail. In some embodiments, the second lateral portion defines a third inner sub-volume of the inner volume. In some embodiments, a third battery is positioned within the third inner sub-volume. In some embodiments, the first lateral portion and the second lateral portion define stairs on opposite lateral sides of the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a chassis including a plurality of rails, a front and rear tractive assemblies coupled to the chassis, and a battery assembly. The battery assembly is coupled to the chassis between the front and rear tractive assemblies. The battery assembly includes a battery housing, a mounting assembly, and a support. The mounting assembly is coupled to the battery housing and the plurality of rails. The mounting assembly includes a stabilizer configured to stabilize the battery assembly. The support is positioned within the battery housing and extends along a midpoint of the battery housing. The stabilizer absorbs horizontal and vertical impact forces introduced to the battery assembly.

The housing includes one or more slots formed therein, where the rails may be positioned therethrough. Additionally or alternatively, the slots may separate or otherwise provide reference to a separation of battery modules positioned within the battery assembly.

In some embodiments, the mounting assembly further includes an upper portion and a lower portion. The upper portion is fixedly coupled to the rails. The lower portion includes the stabilizer and is configured to compress the stabilizer.

Overall Vehicle

Figure 1:
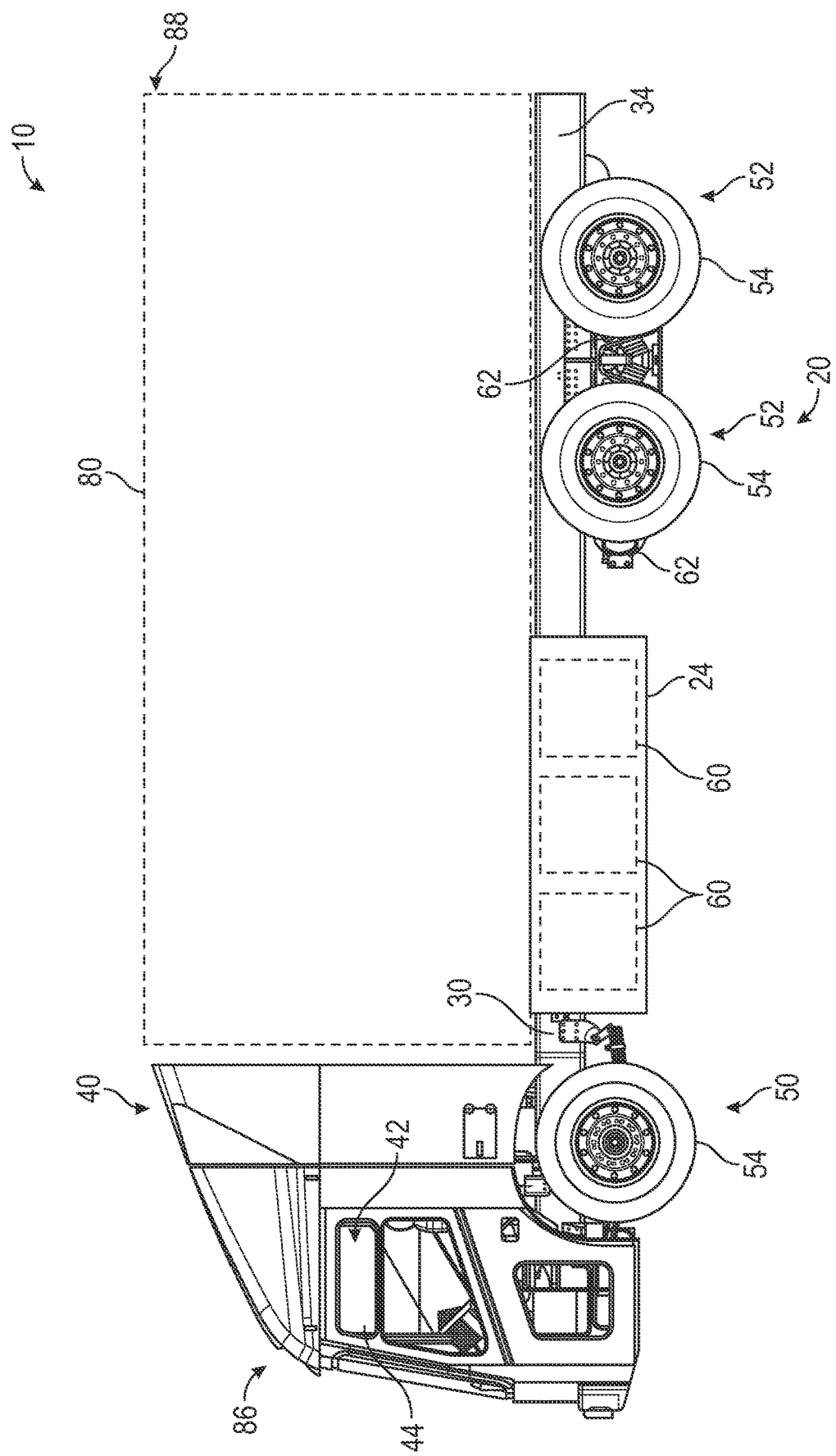
FIG. 1 is a left side view of a vehicle, according to an exemplary embodiment.
Figure 2:
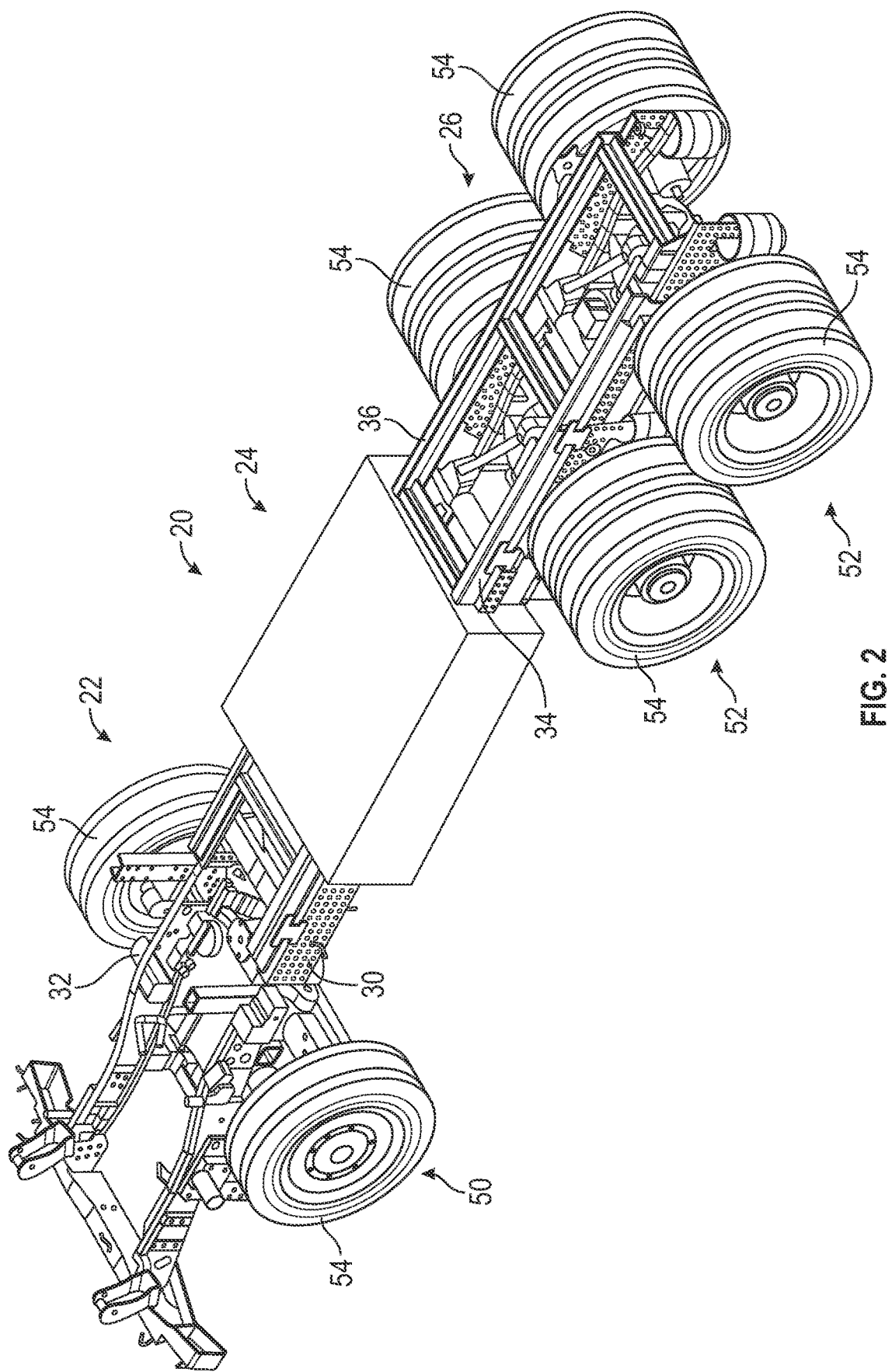
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
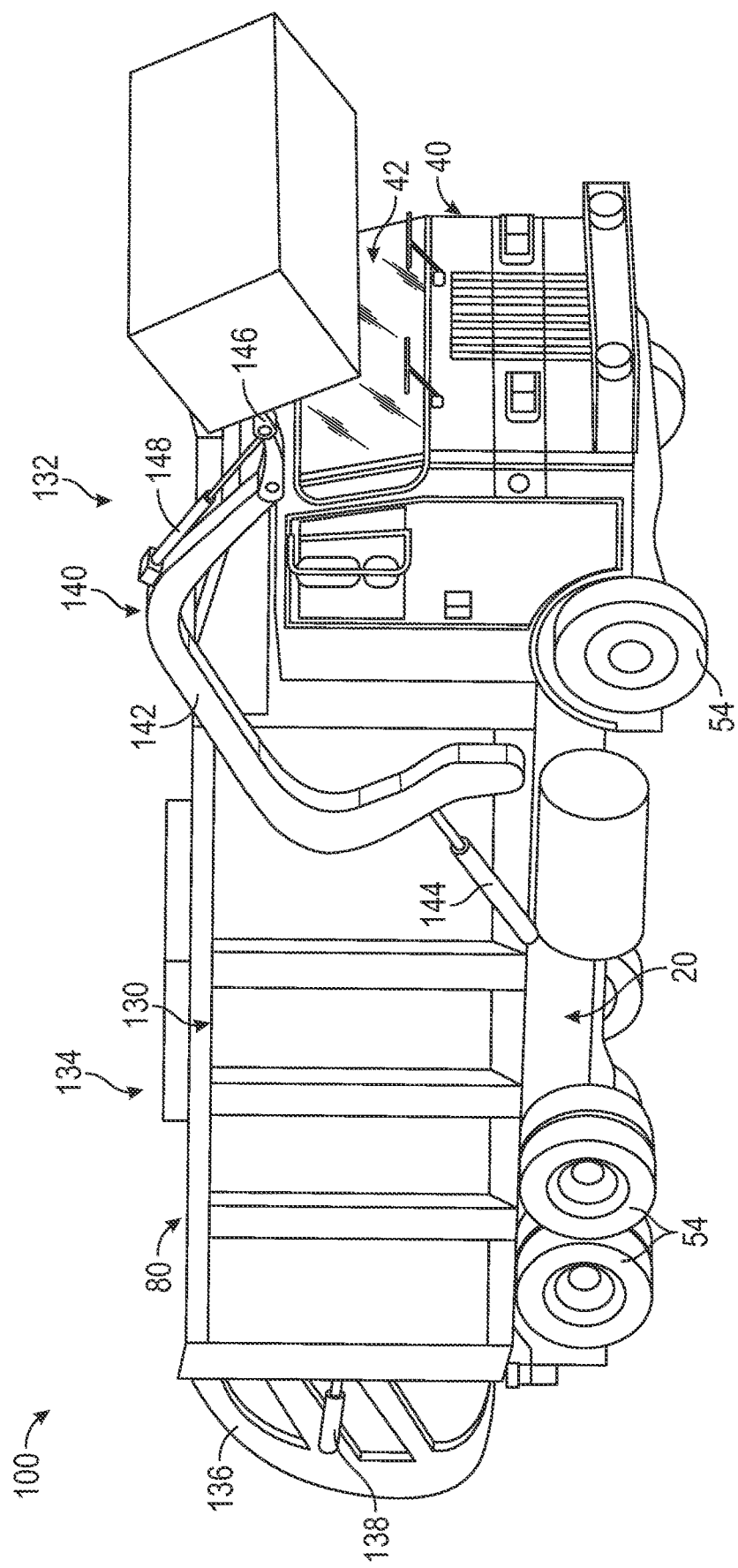
FIG. 3 is a perspective view of the vehicle of FIG. 1 configured as a front-loading refuse vehicle, according to an exemplary embodiment.
Figure 4:
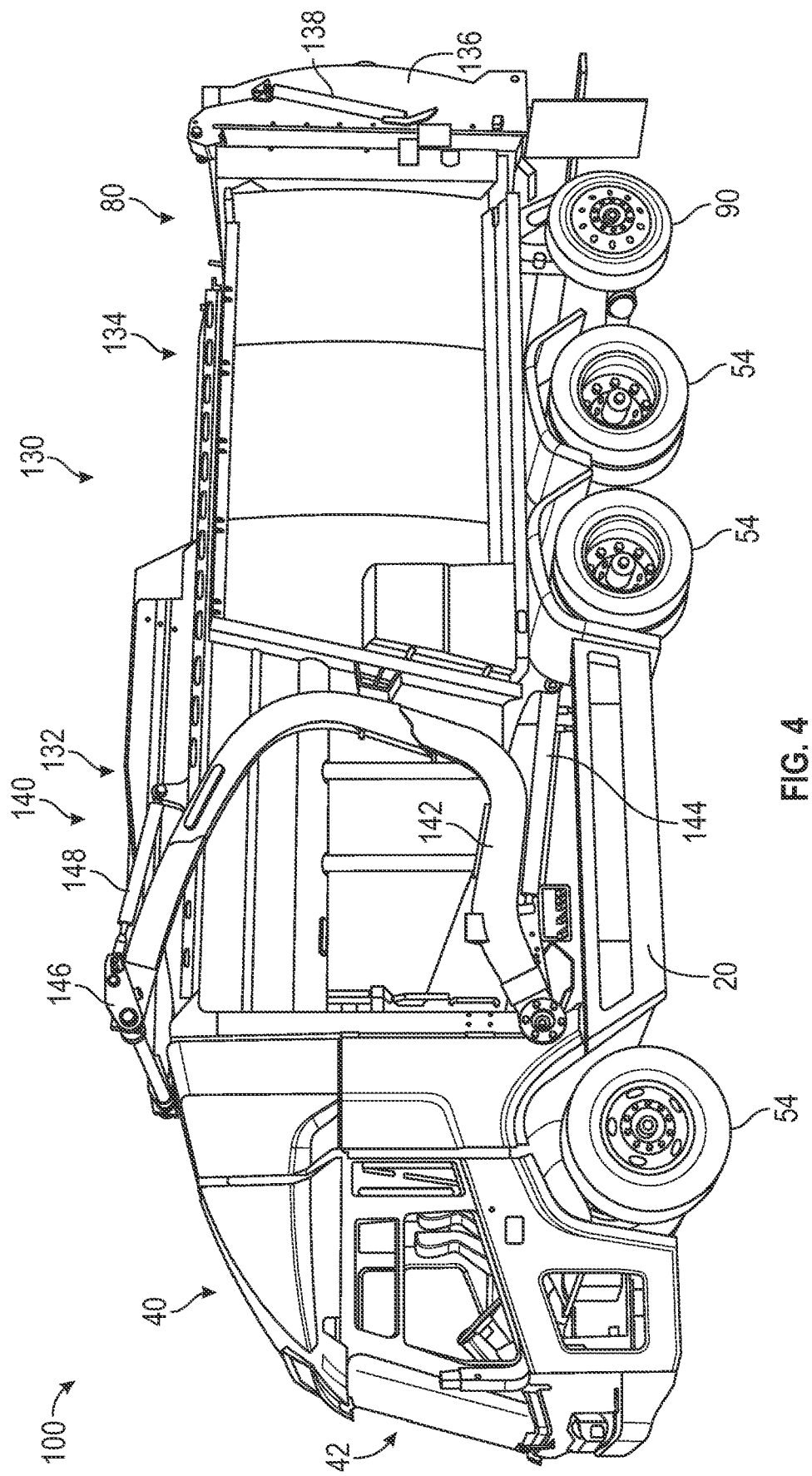
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
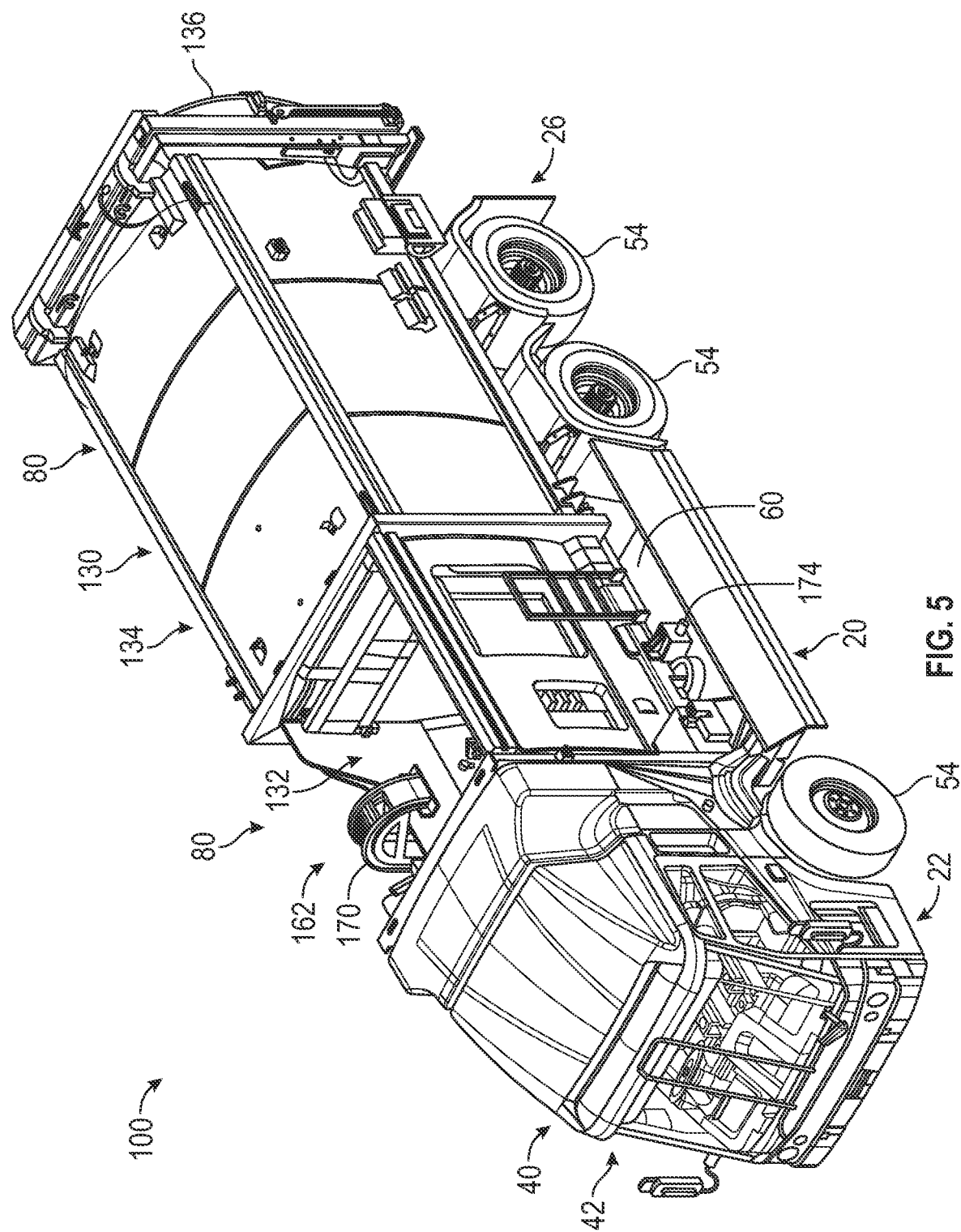
FIG. 5 is a perspective view of the vehicle of FIG. 1 configured as a side-loading refuse vehicle, according to an exemplary embodiment.
Figure 6:
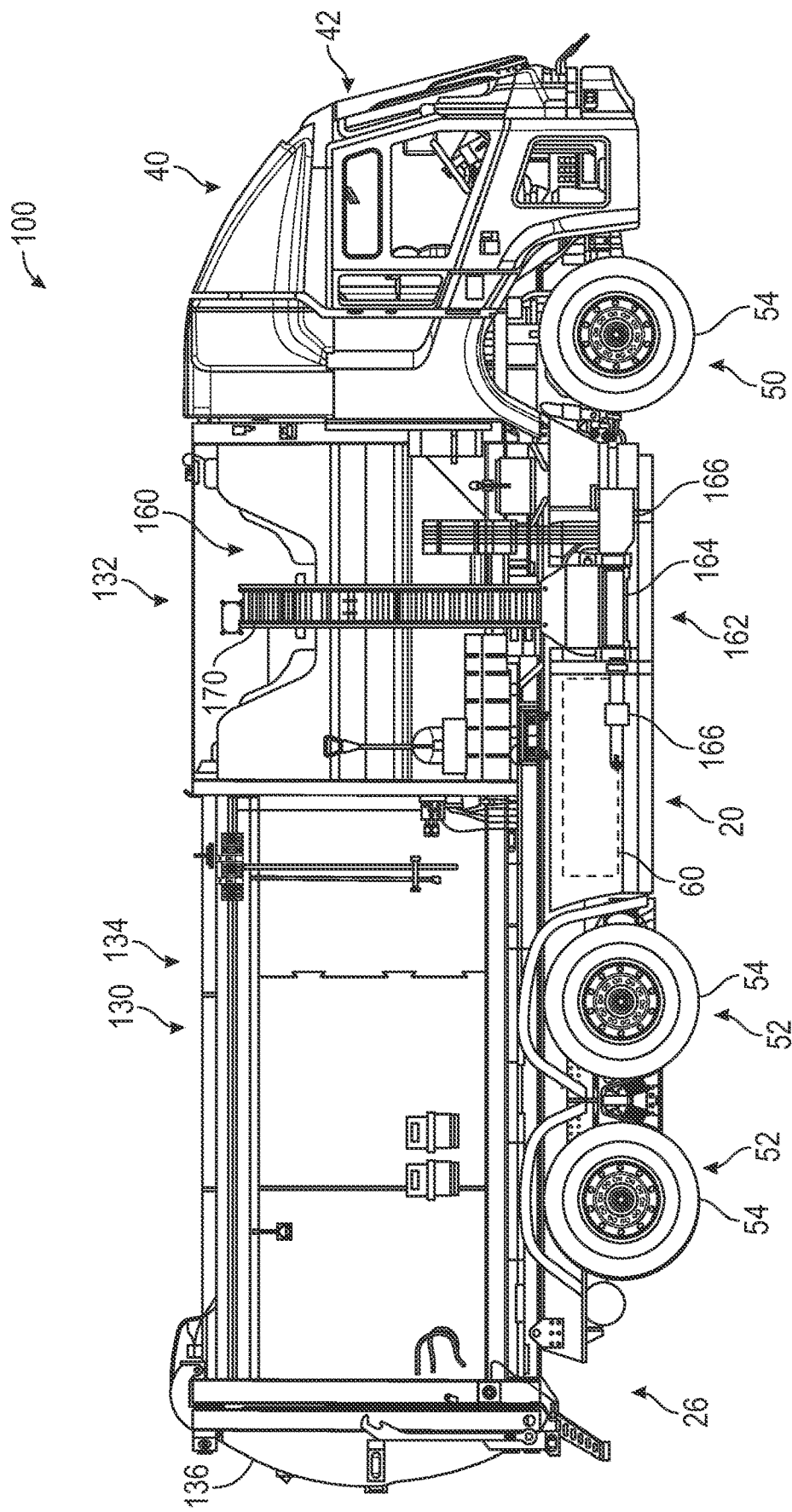
FIG. 6 is a right side view of the side-loading refuse vehicle of FIG. 5.
Figure 7:
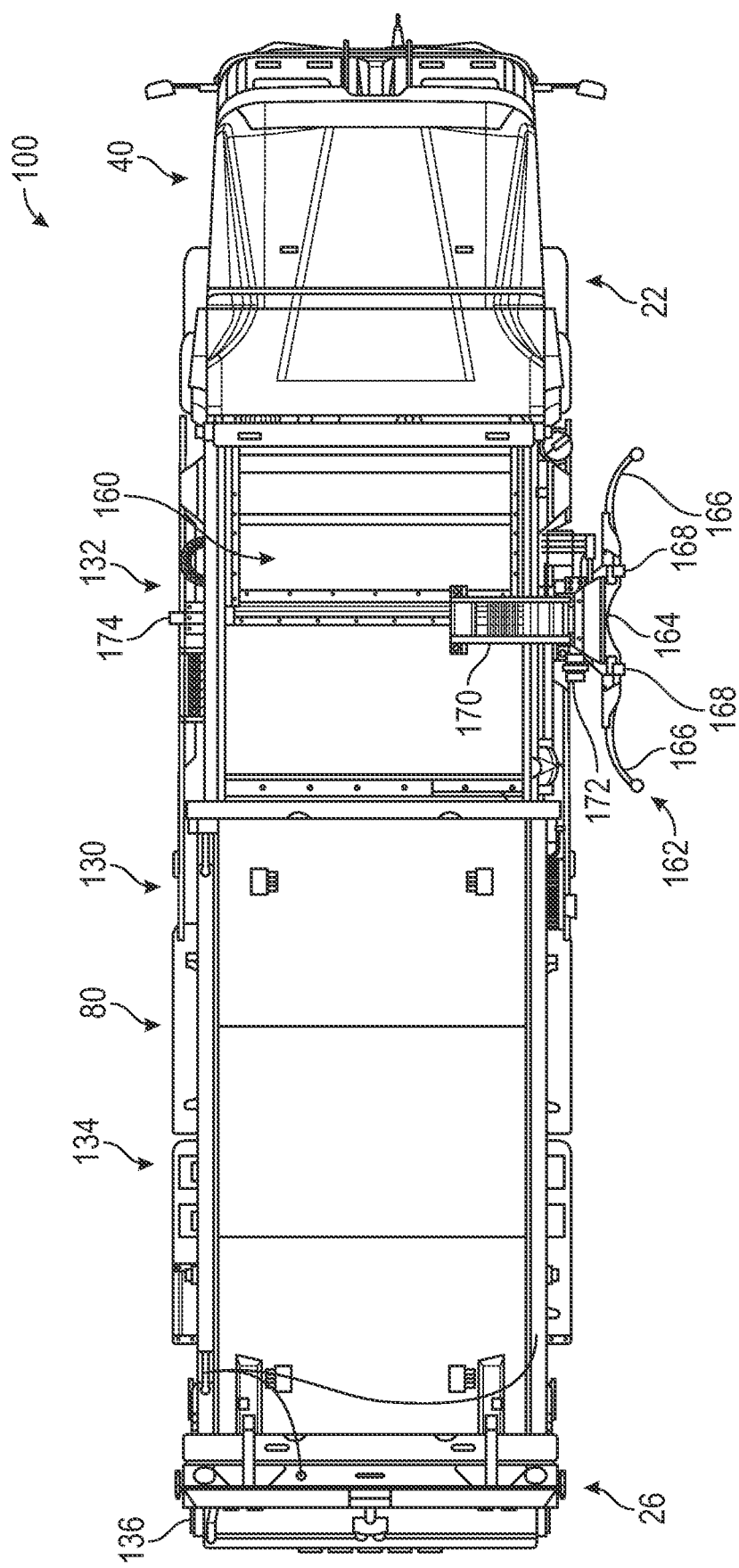
FIG. 7 is a top view of the side-loading refuse vehicle of FIG. 5.
Figure 8:
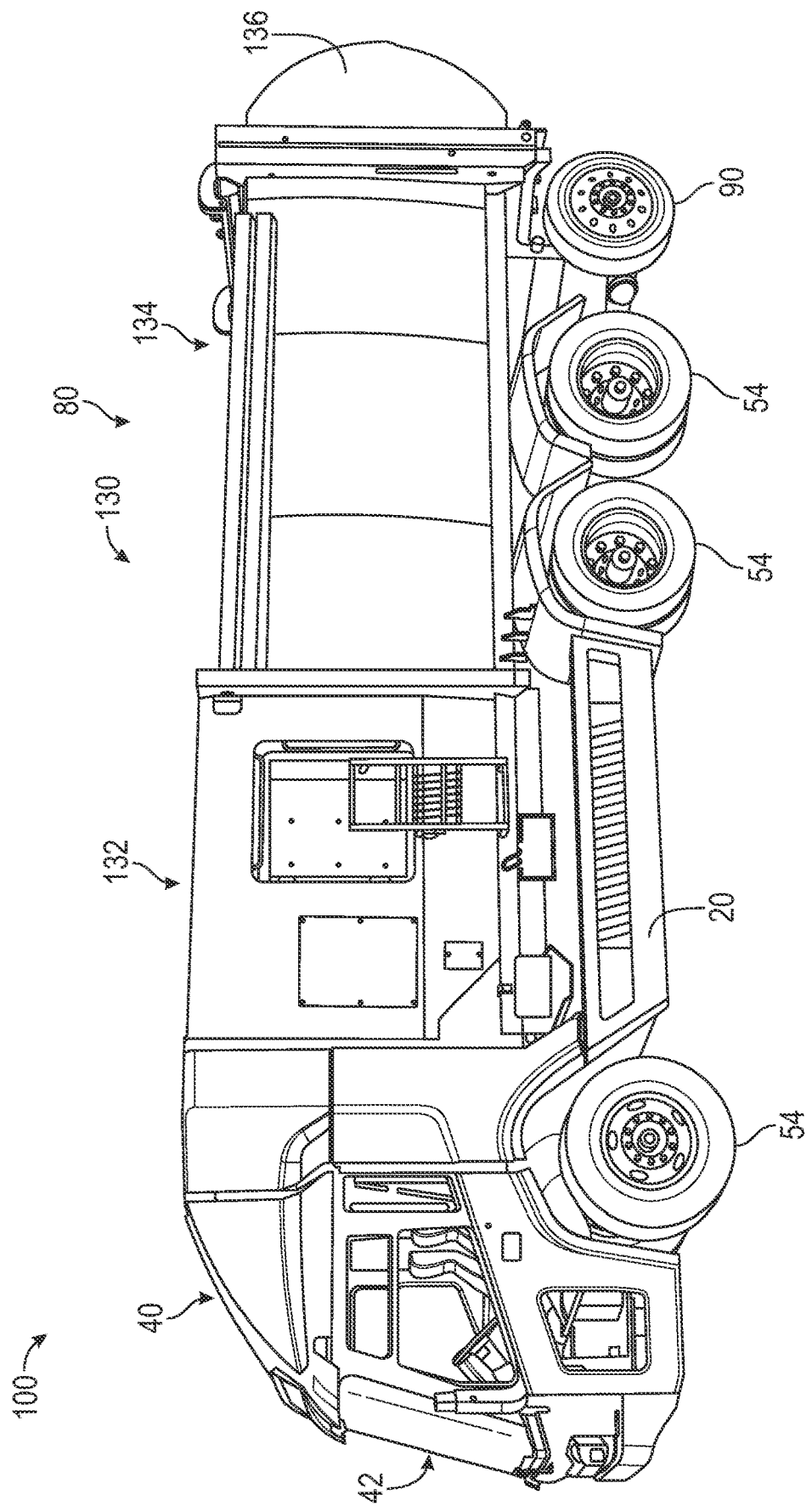
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
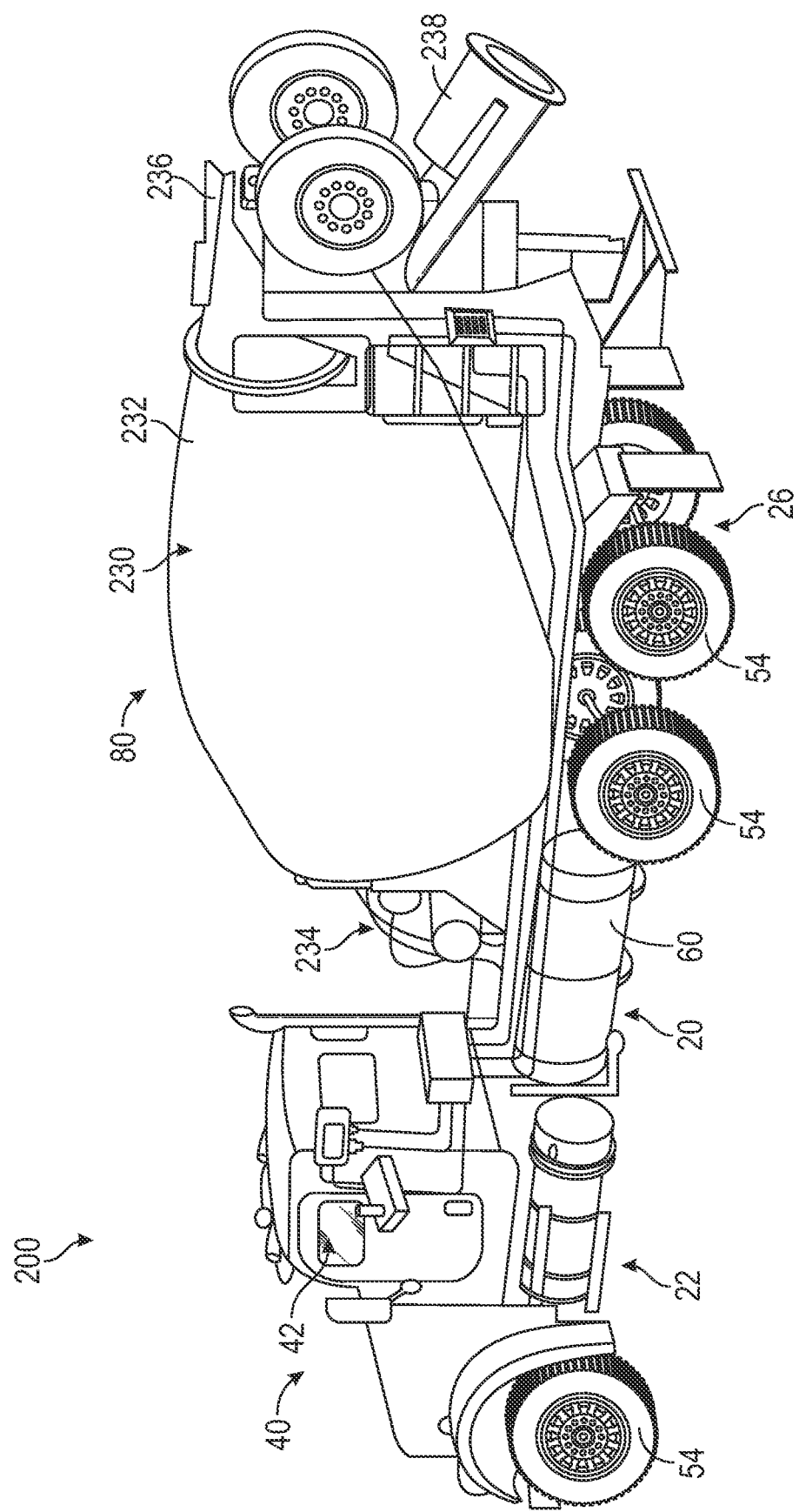
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
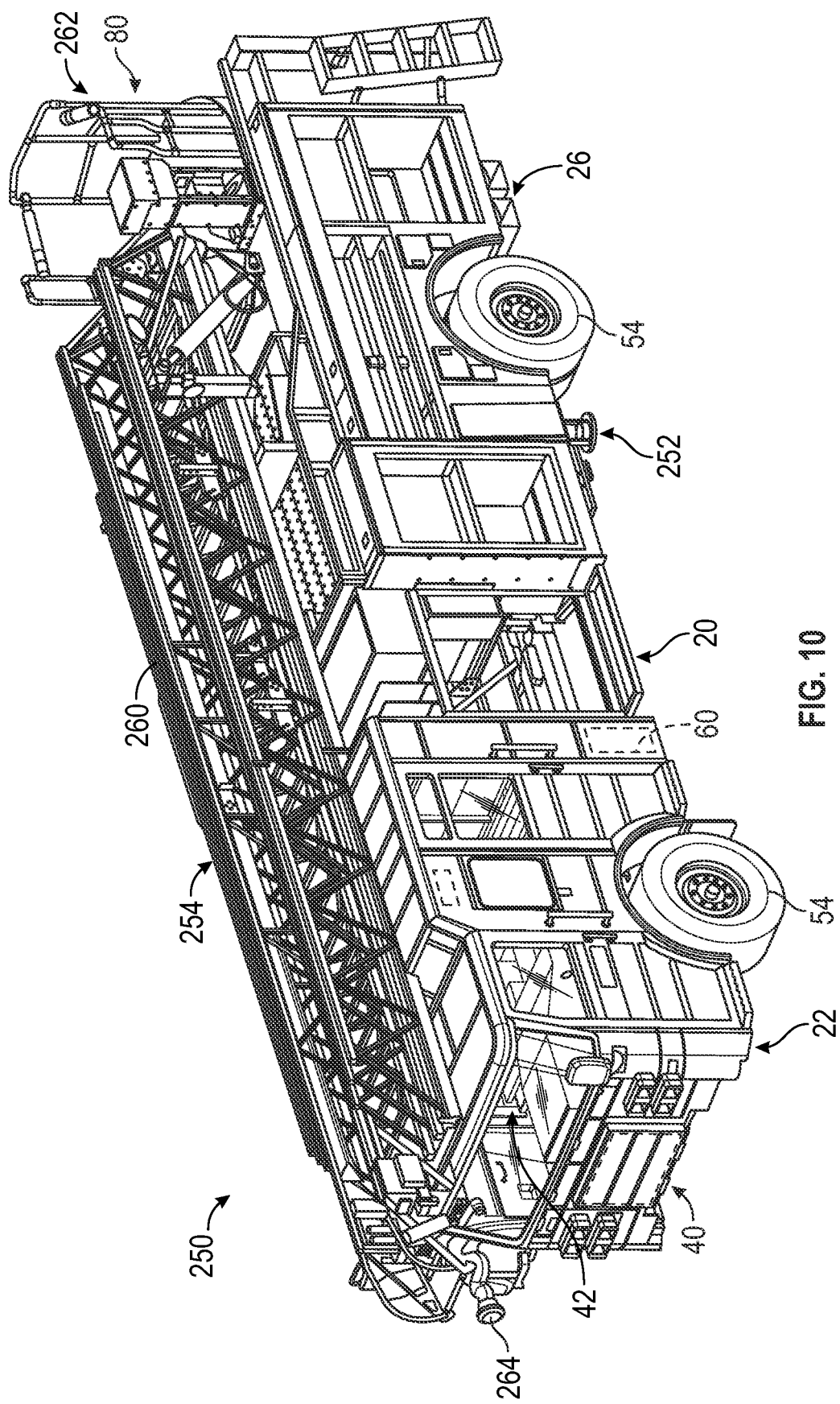
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
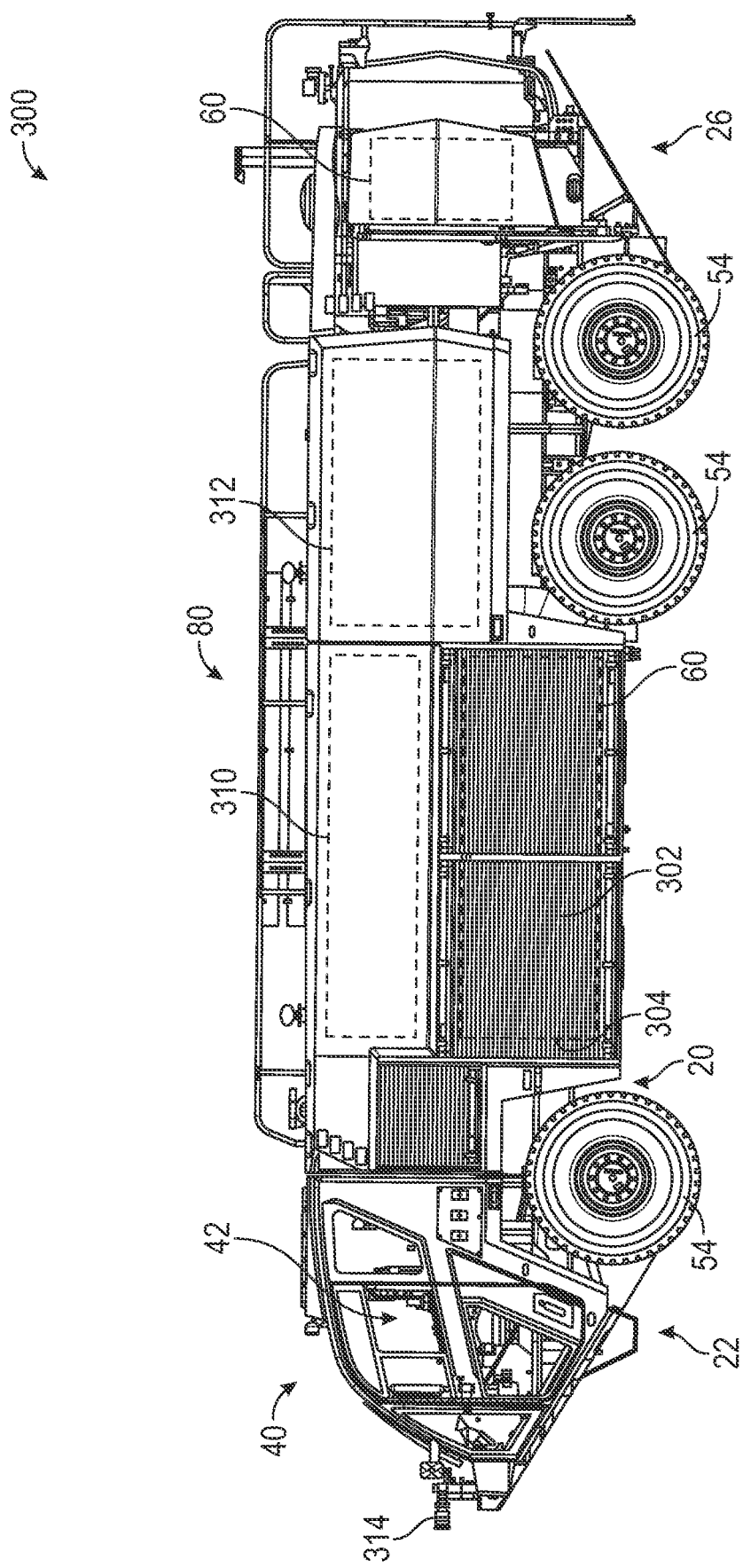
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
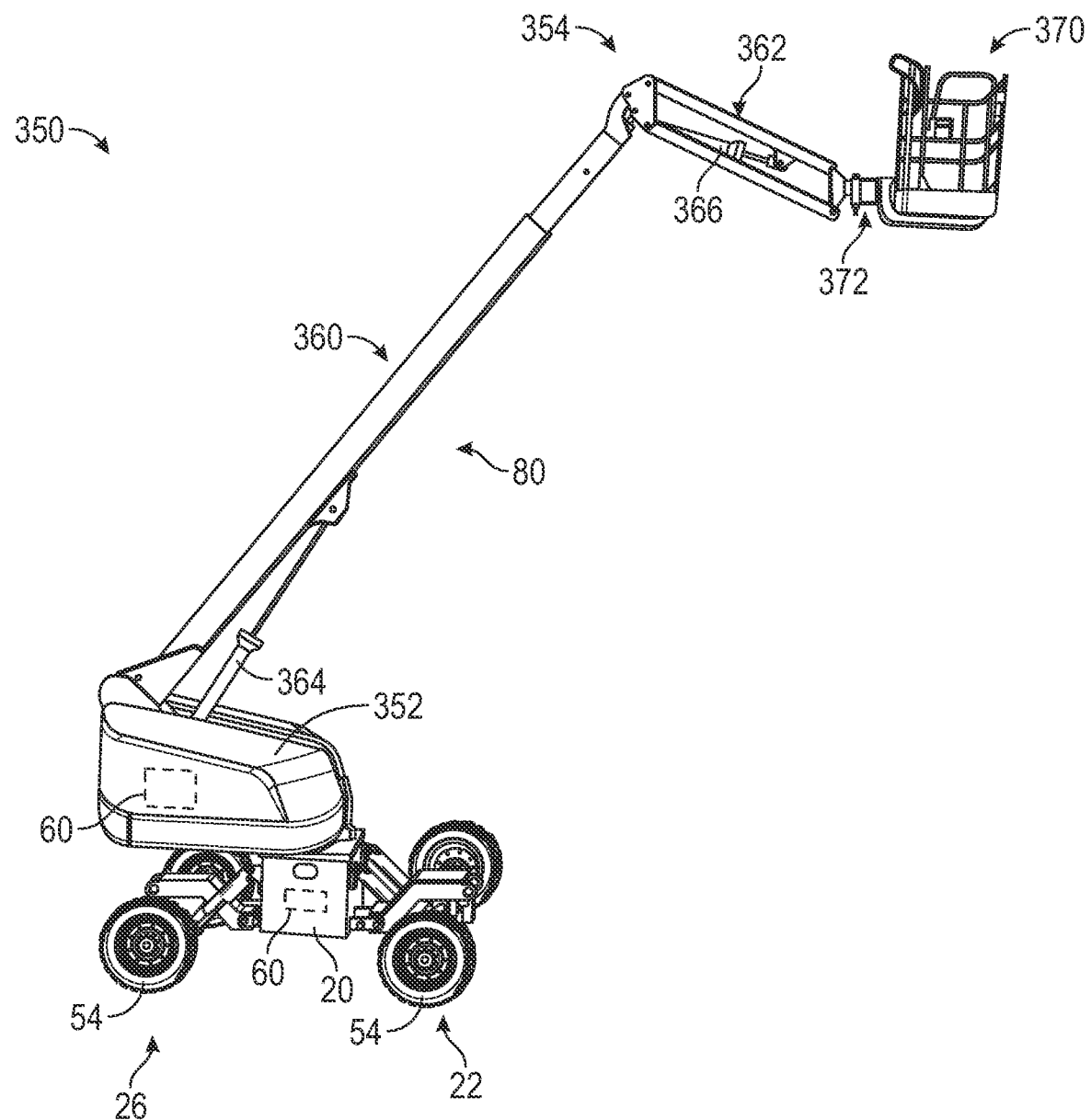
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
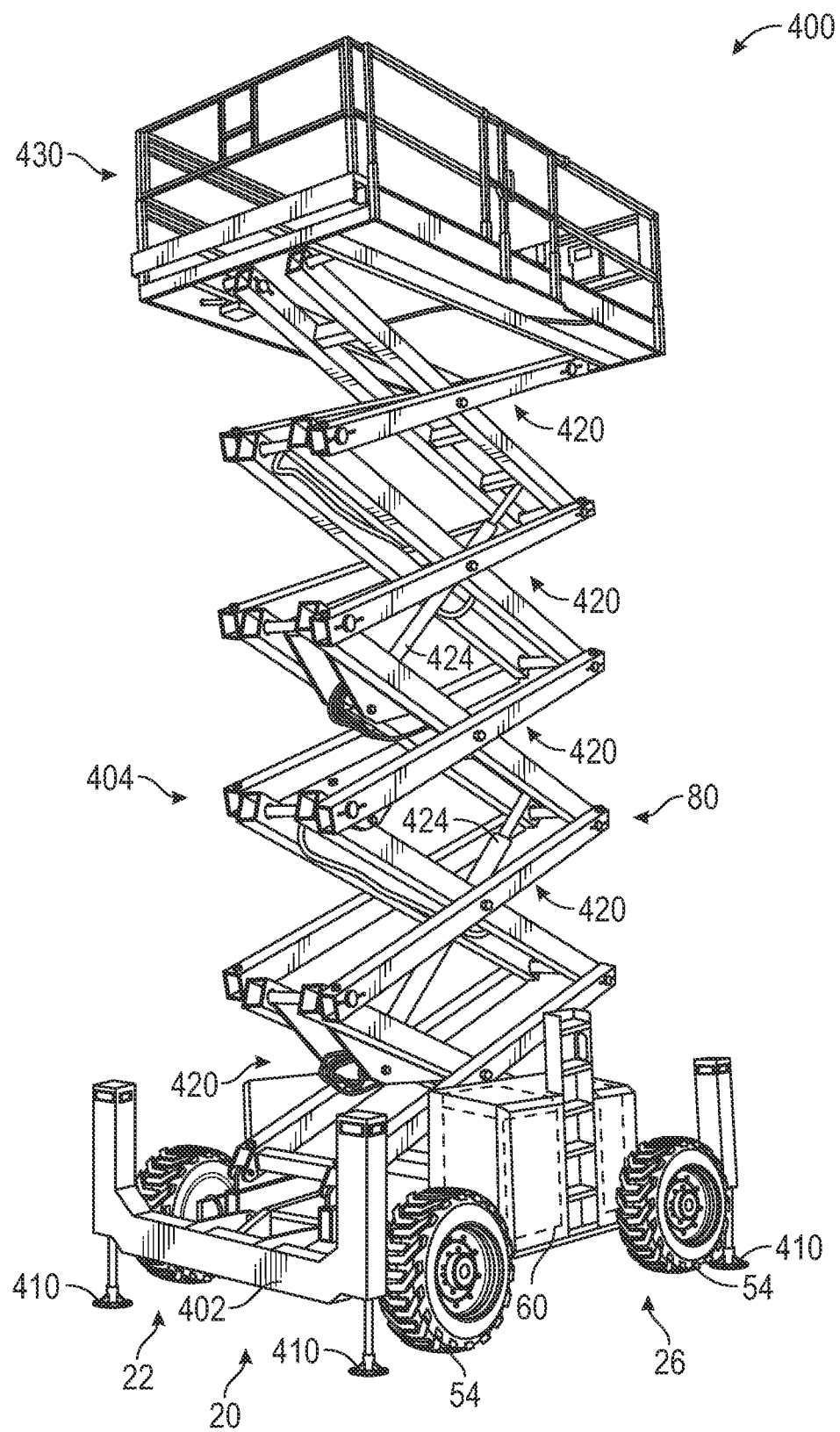
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Underslung Battery Pack

Figure 14:
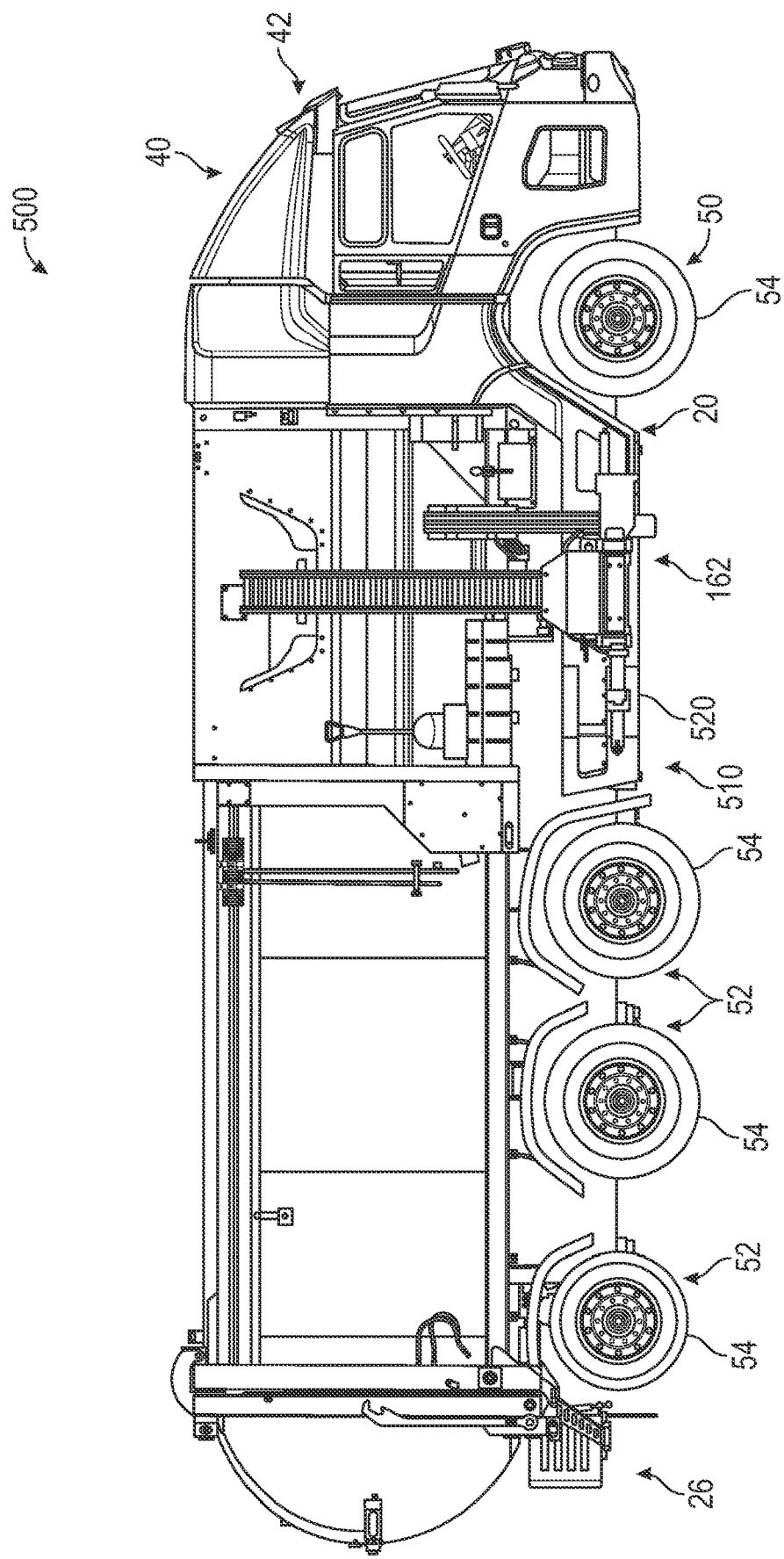
FIG. 14 is a side view of a vehicle including an underslung battery mount, according to an exemplary embodiment.

Referring now to FIG. 14, a vehicle 500 (e.g., the vehicle 100) is shown, according to an exemplary embodiment. The vehicle 500 may be substantially similar to the vehicle 100, and, as such, like components may be used to describe the vehicle 500. The vehicle 500 may the chassis 20. The chassis 20 may extend through an underside of the vehicle 500. The vehicle 500 may further include the rear section 26 and the cab 40 coupled to the chassis 20. Both the rear section 26 and the cab 40 may cooperatively define a body of the vehicle 500. The chassis 20 may be coupled to one or more axles, shown as front axle 50 and rear axle 52. The front axle 50 and the rear axle 52 may include respective tire assemblies 54 coupled to ends of the axles 50, 52 that are configured to permit travel of the vehicle 500. The vehicle 500 may include a battery assembly 510 (e.g., a battery cell assembly, a housing including one or more battery cells or energy storage devices, an energy storage system configured to store electrical energy, etc.). The battery assembly 510 may be positioned between the front axle 50 and the rear axle 52 and may further be coupled to the chassis 20. According to an exemplary embodiment, the battery assembly 510 may at least partially extend along a length of the chassis 20 between the front axle and the rear axle 52. In some embodiments, the battery assembly 510 may extend past the front axle 50 and the rear axle 52. The battery assembly 510 may further define a battery assembly width (e.g., in a lateral direction). The battery assembly width may extend past the chassis 20. In other embodiments, the battery assembly may extend up to the chassis 20 (e.g., laterally).

The battery assembly 510 may include a battery housing 520. The battery housing 520 may be a housing configured to house and/or secure one or more batteries. The battery housing 520 may be a prismatic battery housing, but it is appreciated that the battery housing 520 may include any geometrical configuration (e.g., circular, trapezoidal, defining an inner volume within which the batteries are positioned, etc.). As will be discussed in greater detail herein, the battery housing 520 may be configured to house one or more components of the battery assembly 510 therein. The battery assembly 510 may be coupled to a grabber assembly, shown as the grabber assembly 162. More specifically, the grabber assembly 162 may be fixedly coupled to the battery housing 520 on a side of the battery housing 520. Additionally or alternatively, the grabber assembly 162 may extend laterally on a side of the battery housing 520. According to an exemplary embodiment, the grabber assembly 162 may extend laterally along one side of the battery housing 520. In some embodiments, the grabber assembly 162 may extend laterally along both sides of the battery housing 520. In other embodiments, the grabber assembly 162 does not extend laterally on any side of the battery housing 520.

Figure 15:
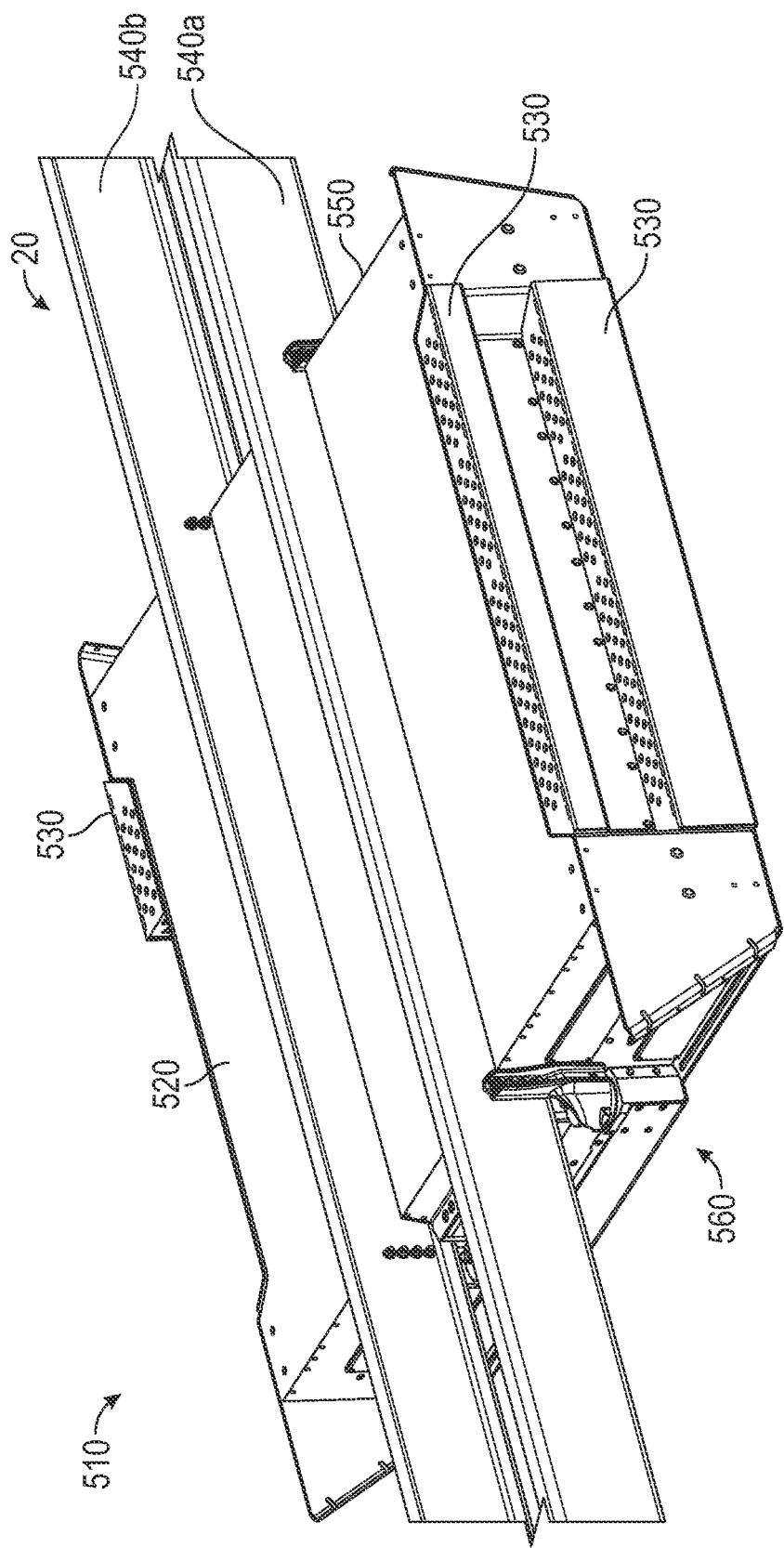
FIGS. 15-17 are various views of the underslung battery mount of FIG. 14, according to an exemplary embodiment.
Figure 16:
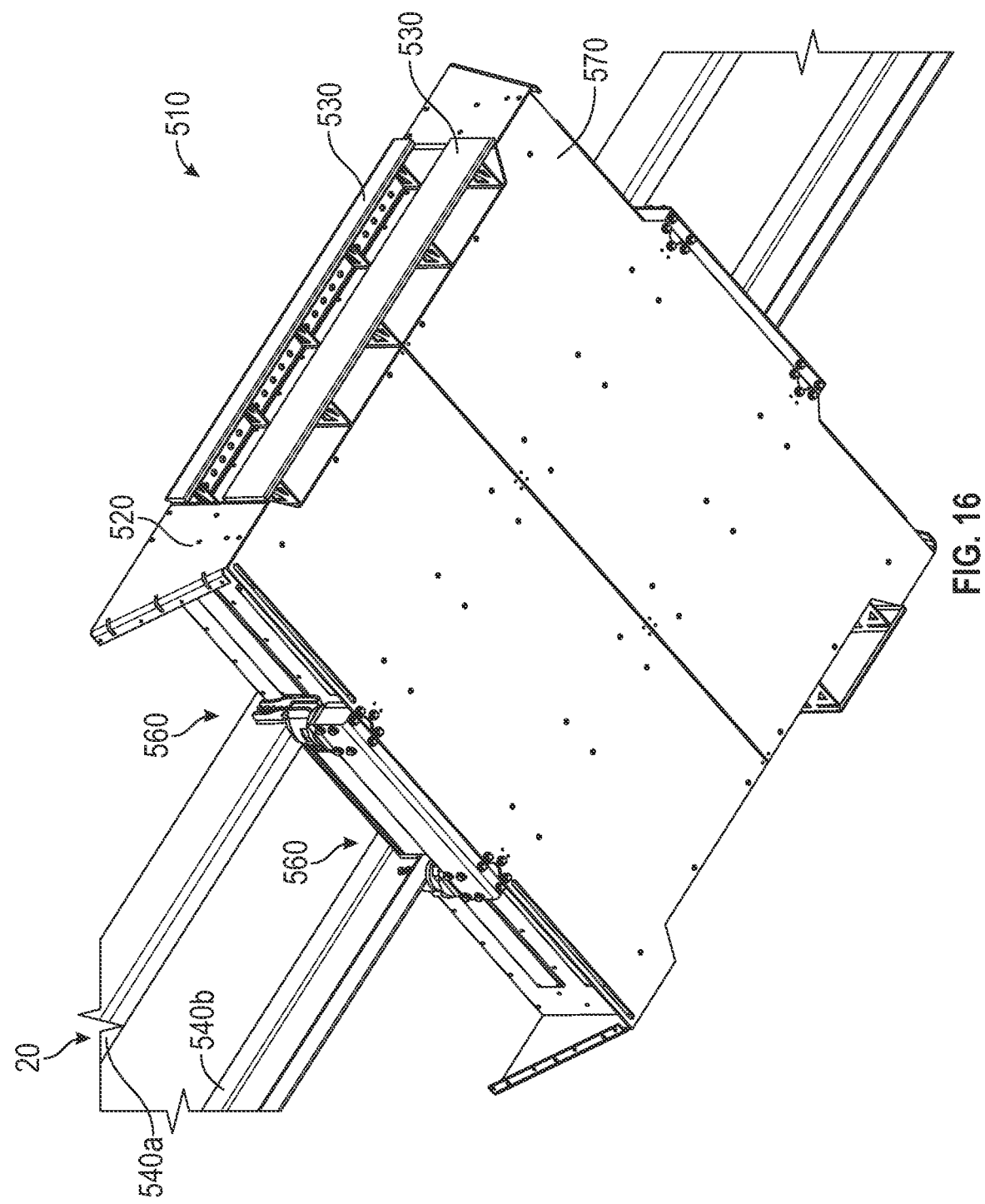
Figure 17:
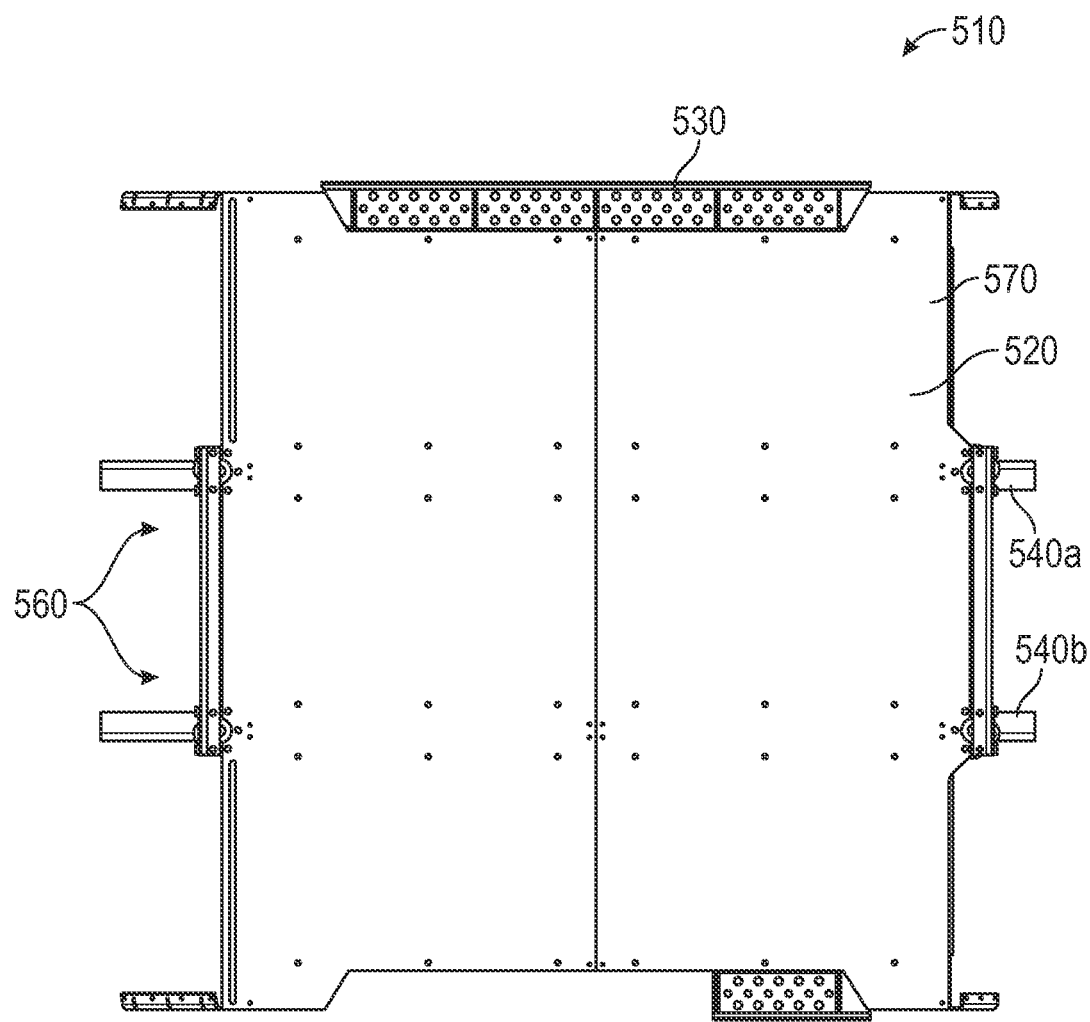

Referring to FIGS. 15-17, the battery housing 520 may include a top portion 550 (e.g., a top surface, a top face, an upper plate, an upper periphery, etc.) and a bottom portion 570 (e.g., a bottom surface, a bottom face, a lower plate, a lower periphery, etc.). The top portion 550 may be positioned opposite the bottom portion 570 (e.g., defining opposite vertical ends of the battery housing 520). In some embodiments, the top portion 550 may be positioned adjacent the bottom portion 570. The battery assembly 510 may be coupled to the chassis 20 of the vehicle 500. The chassis 20 may include one or more frame rails, shown as rails 540, where the battery assembly 510 may be coupled to the rails 510. The rails 540 may be disposed within one or more slots, cavities, channels, grooves, openings, longitudinally extending voids, (e.g., slots 740 in FIG. 27), formed within the battery housing 520. More specifically, the slots may be formed within the top portion 550. According to some embodiments, the battery housing 520 may include two slots, where each slot includes two rails 540 positioned therein. In some embodiments, the battery housing 520 may include more or less than two slots, where each slot may receive a respective rail 540. As will be discussed in greater detail herein, the battery assembly 510 may include one or more mounting assemblies, shown as mounting assembly 560. In some embodiments, the mounting assembly 560 is fixedly coupled to the rails 540 to thereby couple the battery assembly 510 with the rails 540.

The battery housing 520 may include one or more steps, shown as steps 530. The steps 530 may be formed on two sidewalls of the battery housing 520. The steps 530 may be formed on other sidewalls than the sidewalls in which the rails 540 extend through. For example, the rails 540 may extend through a first and third sidewalls, and the steps 530 may be formed within a second and fourth sidewalls. In such an example, the first and third sidewalls may be positioned opposite one another, and the second and fourth sidewalls may be formed opposite one another. In other embodiments, the steps 530 may be formed on sidewalls adjacent one another. The steps 530 may be configured to support a user to facilitate access to a side of the vehicle 500 or an elevated portion of the vehicle 500. For example, the user may climb, step, or travel up the steps 530 to access the side of the vehicle 500. As shown in FIG. 17, the battery housing 520 may include two sets of steps 530. A first set of steps may be provided along at least a portion of a length of the sidewall of the battery housing 520. Accordingly, a second set of steps may be provided along only a portion of the length of the sidewall of the battery housing 520. By way of example, the second set of steps may be less in length to allow the grabber assembly 162 to be coupled to the vehicle 500. In other embodiments, the sets of steps may be the same length, where the sets of steps are provided partially or wholly along a length of the vehicle.

Figure 18:
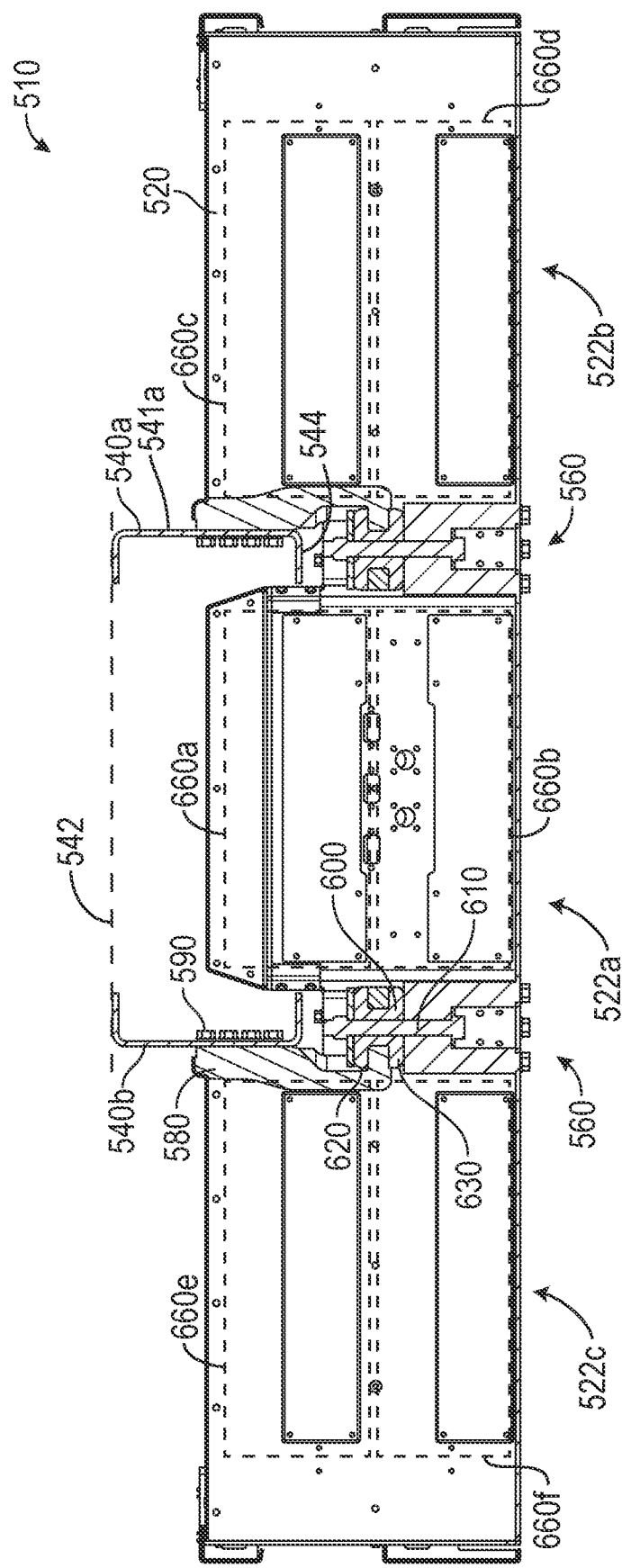
FIGS. 18 and 19 are various section views of the underslung battery mount of FIG. 14, according to an exemplary embodiment.
Figure 19:
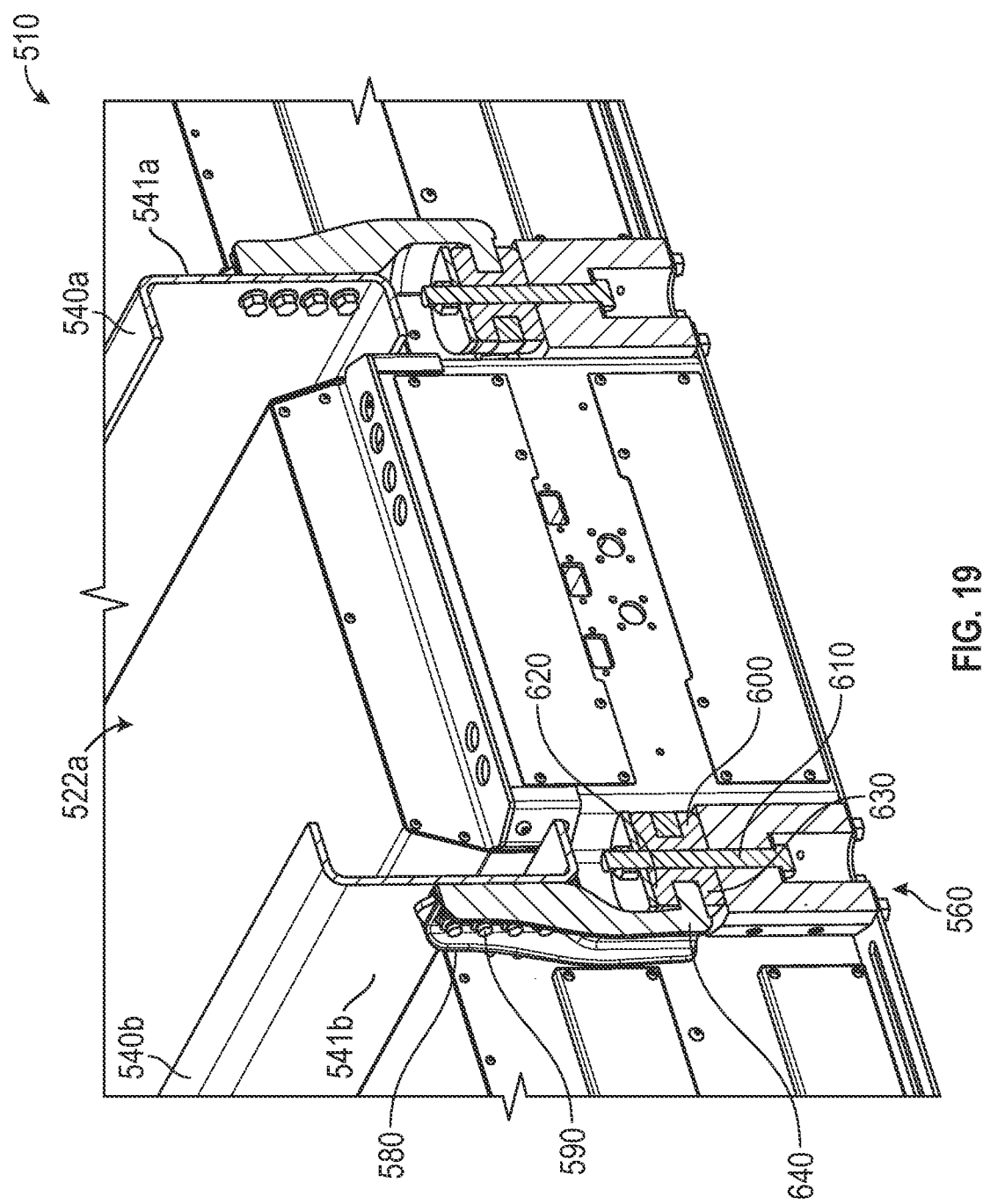

Referring now to FIGS. 18 and 19, the mounting assembly 560 may be vertically provided about the battery assembly 510. The mounting assembly 560 may be configured to fixedly couple the battery assembly 510 to the rails 540. The mounting assembly 560 may include a mounting body 580. The mounting body 580 may be formed about an upper portion of the mounting assembly 560 and further be coupled to the rails 540. More specifically, the mounting body 580 may be configured to receive one or more fasteners, shown as mounting fasteners 590. The mounting fasteners 590 may be provided through at least the rails 540 and the mounting body 580 to couple the rails 540 to the mounting body 580. In some embodiments, the mounting fasteners 590 are arranged in a vertical array and are uniformly spaced. In some embodiments, the mounting fasteners 590 include four fasteners. In other embodiments, the rails 540 may be coupled to the mounting body 580 using an alternate method (e.g., welding, crimping, etc.). In some embodiments, the mounting body 580 is positioned on a laterally outer surface of the rails 540. The rails 540 have a C-shape, according to some embodiments.

The mounting assembly 560 may be configured to dampen forces introduced to the battery assembly 510 and/or stabilize the battery assembly 510 via one or more stabilizers, shown as isolator 600 (e.g., a resilient member, a damping member, a rubber member, a bushing, a compressible member, etc.). Each mounting assembly 560 may include a respective isolator 600. The isolator 600 may be include an aperture therethrough, where a lateral fastener 610 may be provided therethrough. The lateral fastener 610 may be configured to compress the isolator 600 to rigidly hold the isolator 600. The isolator 600 may include one or more portions, shown as upper stabilizer 620 and lower stabilizer 630. The lateral fastener 610 may be configured to compress the upper stabilizer 620 against the lower stabilizer 630. In other embodiments, the isolator 600 may be comprised of a single component. The isolator 600 may include a central portion having a smaller diameter than the upper and lower stabilizers 620, 630 to locate the isolator 600 within the mounting assembly 540. More specifically, the central portion may interface with one or more mounting tabs 640. The mounting tabs 640 may locate the isolator 600 and further prevent vertical movement of the isolator 600. In other embodiments, the mounting tabs 640 may prevent horizontal movement of the isolator 600. The isolator 600 may be a rubber stabilizer configured to absorb forces introduced to the battery assembly 510.

Referring still to FIGS. 18 and 19, the housing 520 can include or define a medial portion 522a (e.g., a medial housing), a first lateral portion 522b (e.g., a first lateral housing), and a second lateral portion 522c (e.g., a second lateral housing), according to some embodiments. In some embodiments, the medial portion 522a is positioned between and extends upwards between the rails 540 (e.g., between first rail 540a and second rail 540b). In some embodiments, the medial portion 522a extends upwards between the first rail 540a and the second rail 540b a distance such that a top of the medial portion 522a is at a vertical position above a bottom periphery or surface 544 of the rails 540. In some embodiments, the medial portion 522a terminates at a vertical position lower than an upper periphery or surface 542 of the rails 540. The housing 520 may include or define an inner volume that is continuous or discrete (e.g., segregated into different portions). The medial portion 522a defines a first sub-volume within which one or more batteries 660 (e.g., multiple battery packs, an array of battery packs, an array of battery cells, a row of batteries that extend longitudinally along a length of the housing 520, etc.) are positioned. In particular, the medial portion 522a includes a first set of one or more medial batteries 660a and a second set of one or more medial batteries 660b. The medial batteries 660a are positioned vertically above (e.g., stacked on top of) the medial batteries 660b. In some embodiments, the first medial batteries 660a extend vertically upwards past the bottom surface 544 of the rails 540, and vertically downwards past the bottom surfaces 544 of the rails 540. The second medial batteries 660b can be positioned entirely below (e.g., at a vertical position lower than) the bottom surface 544 of the rails 540.

Referring still to FIGS. 18 and 19, the first lateral portion 522b can include or define a second inner sub-volume of the housing 520, and the second lateral portion 522c can include or define a third inner sub-volume of the housing 520. In some embodiments, the sub-volumes defined by the medial portion 522a, the first lateral portion 522b, and the second lateral portion 522c extend longitudinally an entire length of the housing 520. In some embodiments, the first lateral portion 522b and the second lateral portion 522c are similar or symmetric with each other, and are disposed on opposite lateral sides of the rails 540. For example, the second lateral portion 522c may be positioned laterally outwards of a laterally outer surface 541b of the second rail 540b, and the first lateral portion 522b may be positioned laterally outwards of a laterally outer surface 541a of the first rail 540a. In some embodiments, the first lateral portion 522b includes one or rows of batteries (e.g., battery packs, battery cells, etc.), shown as lateral batteries 660c and lateral batteries 660d that are arranged longitudinally through the second sub-volume of the first lateral portion 522b and are positioned laterally outwards from the first rail 540a (e.g., on a first lateral side of the medial portion 522a). The lateral batteries 660c and the lateral batteries 660c may be vertically positioned similarly to the batteries 660a and the batteries 660b (e.g., stacked on top of each other, extending upwards beyond the bottom surface 544 of the rails 540, etc.), but are laterally offset relative to the batteries 660a and the batteries 660b. The second lateral portion 522c similarly includes multiple batteries, shown as lateral batteries 660e and lateral batteries 660f that are laterally offset from the batteries 660a and the batteries 660b in an opposite direction as the lateral batteries 660c and the lateral batteries 660d. In this way, the first lateral portion 522b and the second lateral portion 522c are symmetric to each other and are positioned on opposite lateral sides of the medial portion 522a of the housing 520.

Figure 20:
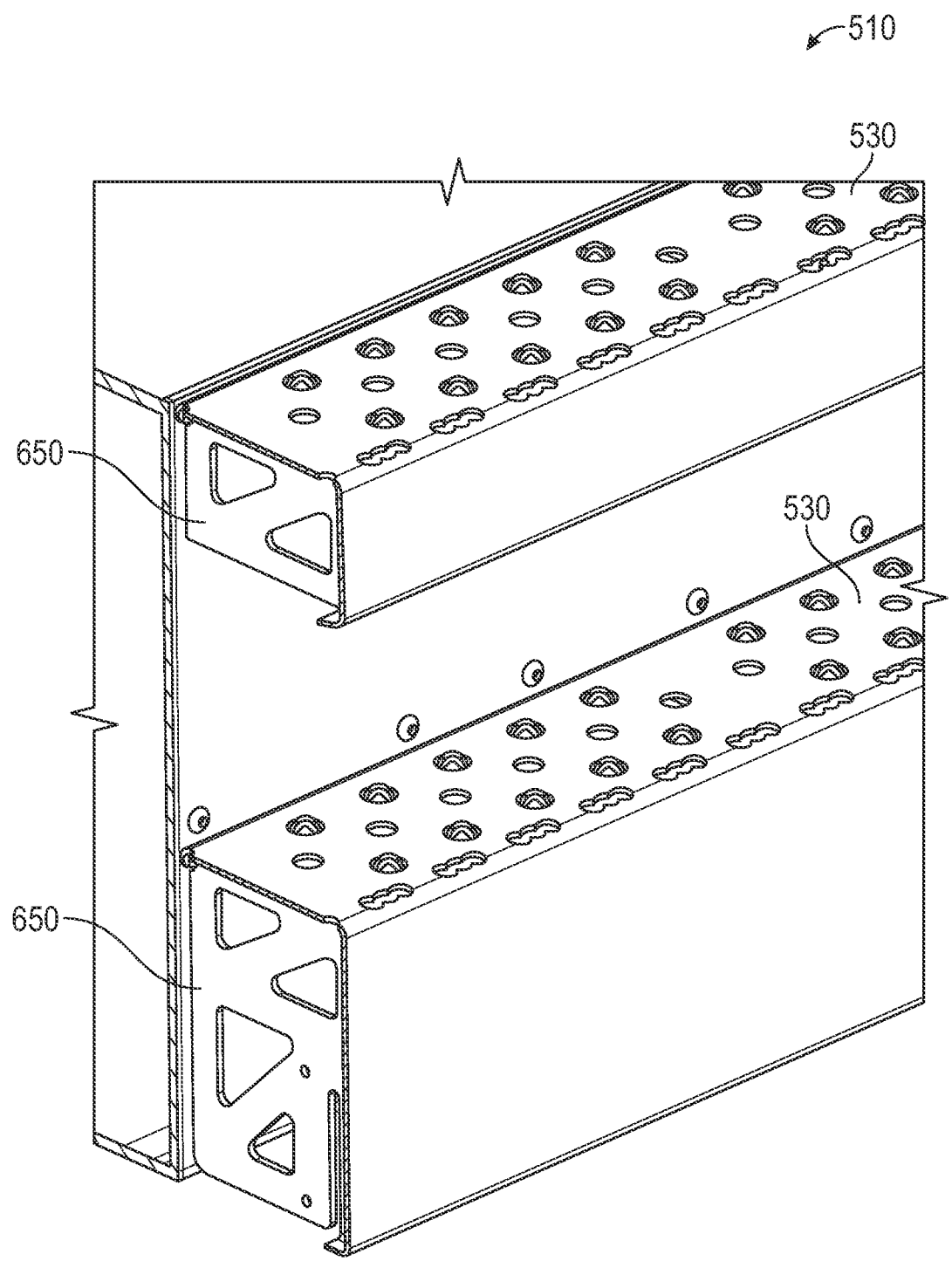
FIG. 20 is a detailed view of the underslung battery mount of FIG. 14, showing the step, according to an exemplary embodiment.

Referring now to FIG. 20, the steps 530 may be coupled to the battery housing 520 via a step frame 650. The step frame 650 may be a structure provided between the steps 530 and the battery housing 520, where the step frame 650 may provide structural support to the steps 530. The step frame 650 may extend substantially vertical in relation to the steps 530. In other embodiments, the step frame 650 may be extend substantially horizontal in relation to the steps 530.

Figure 21:
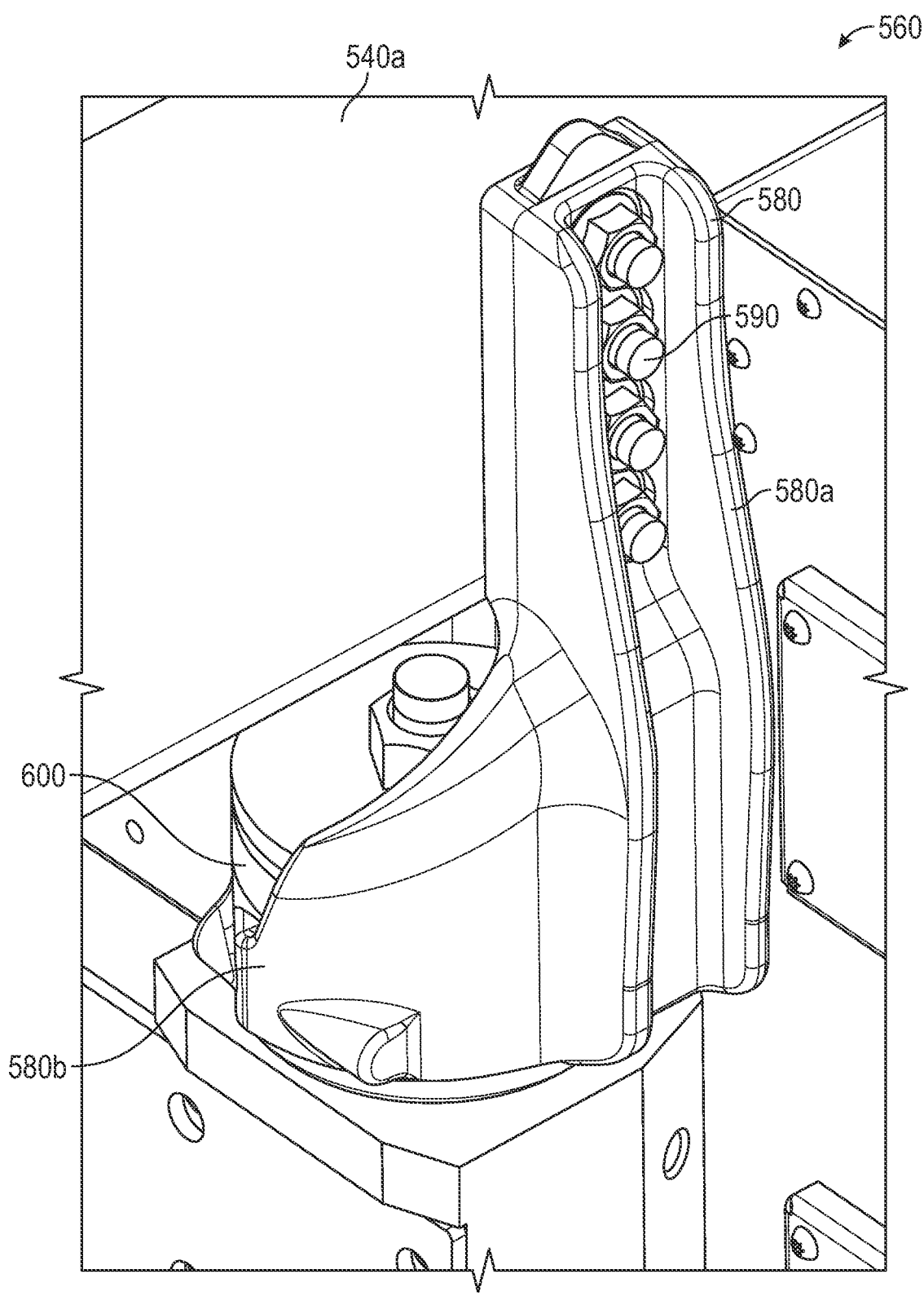
FIGS. 21 and 22 are various views of a mounting assembly for the underslung battery mount of FIG. 14, according to an exemplary embodiment.
Figure 22:
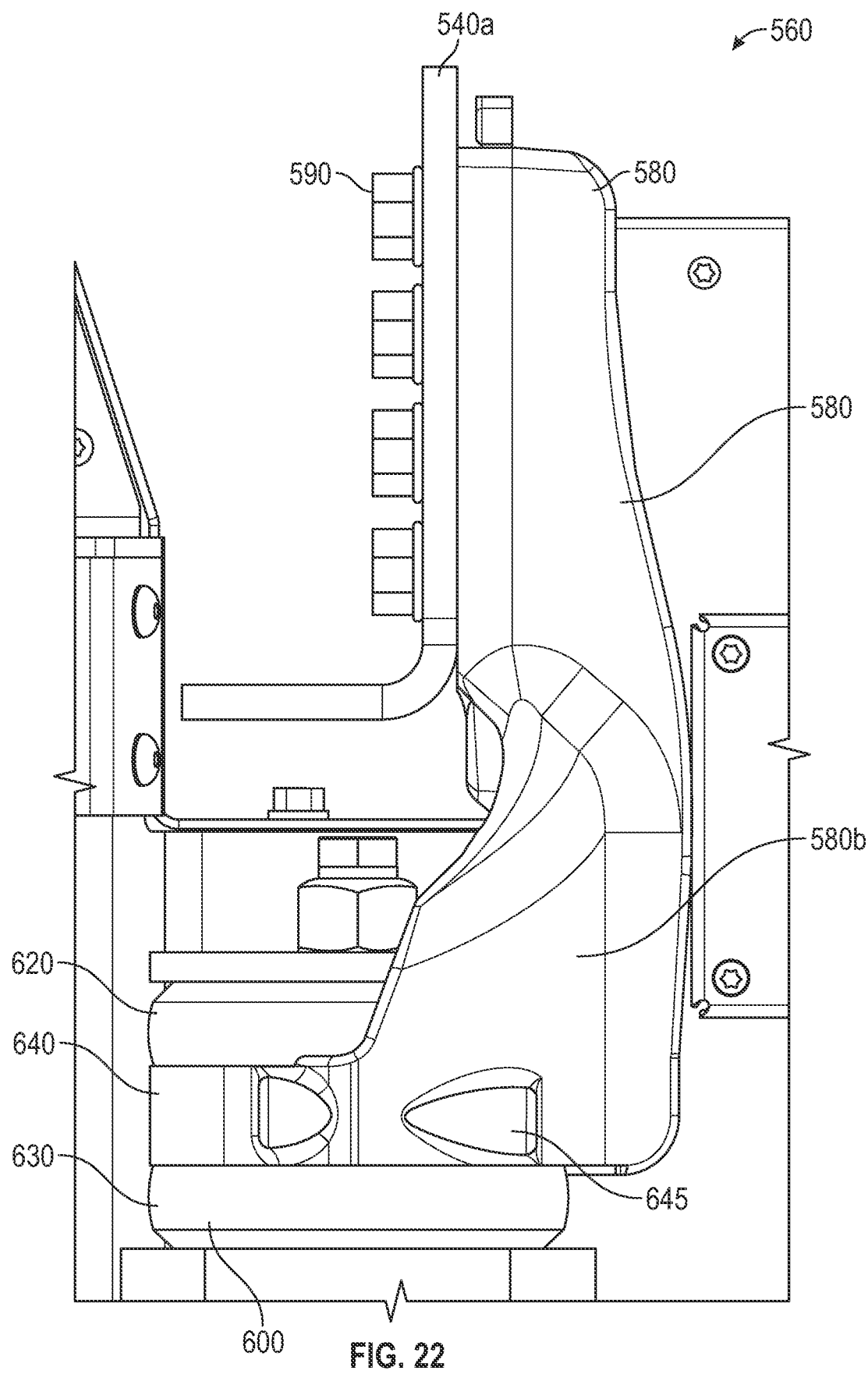
Figure 23:
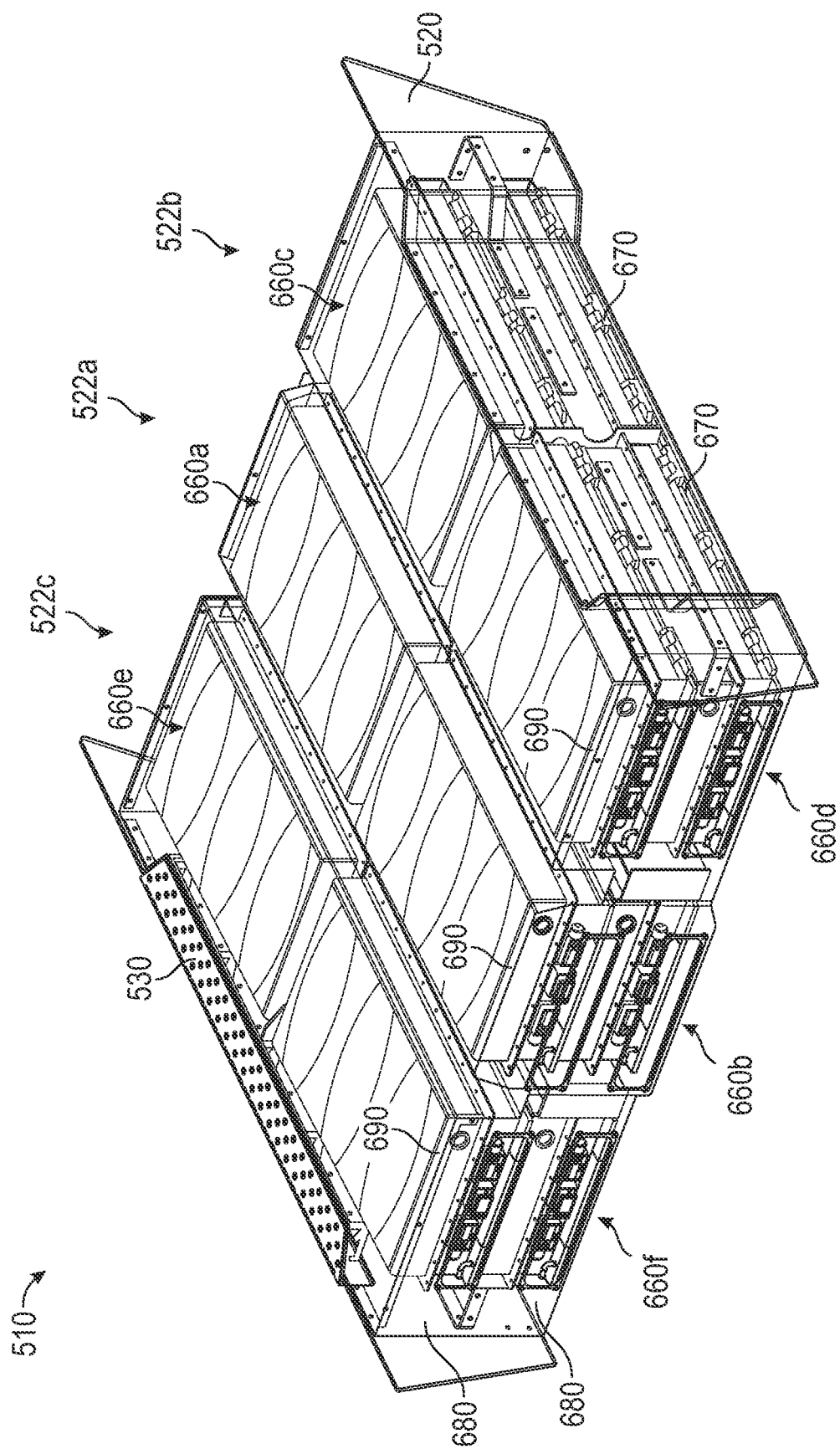
FIGS. 23-26 are various detailed views of the underslung battery mount of FIG. 14, according to an exemplary embodiment.
Figure 24:
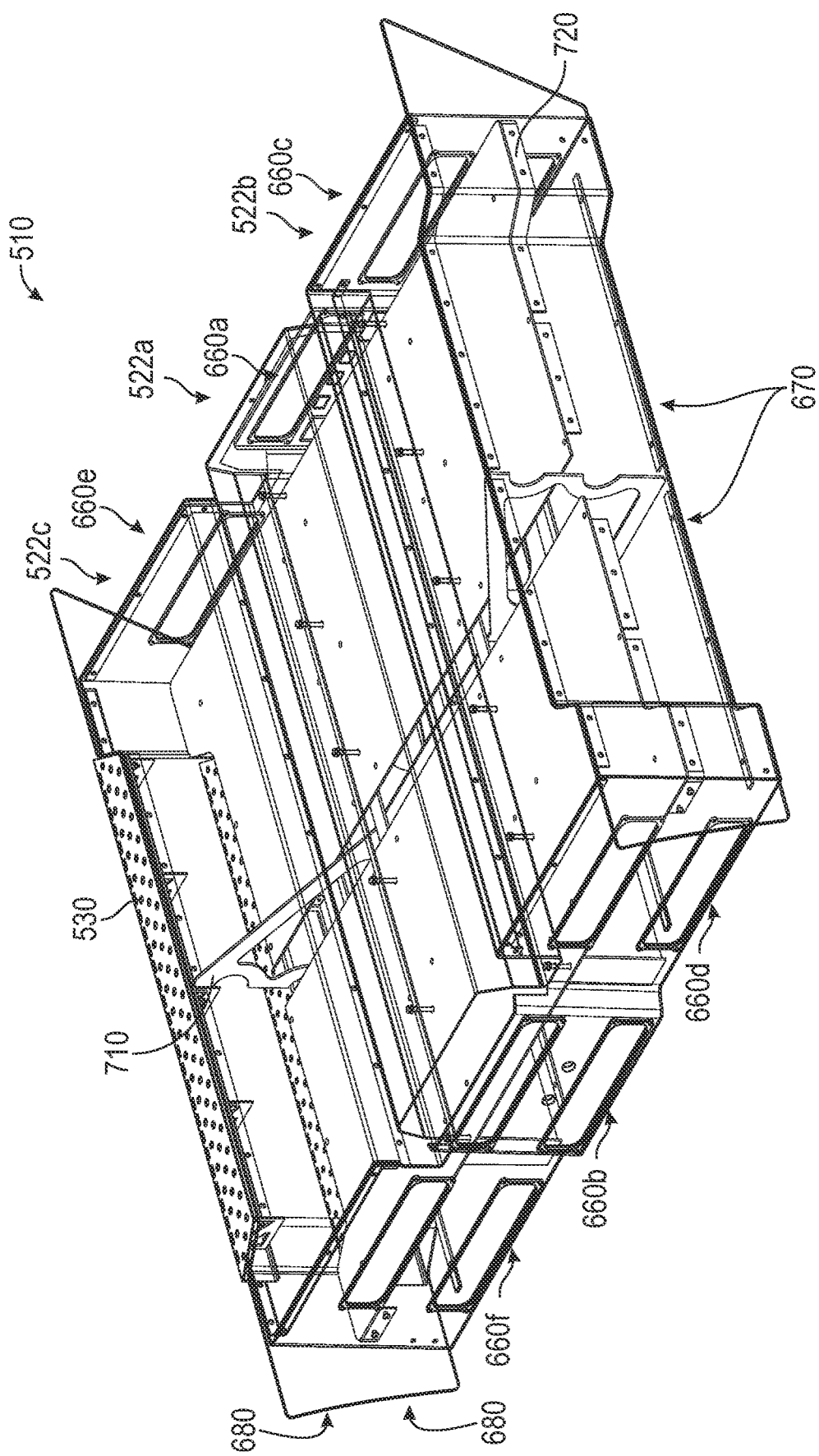
Figure 25:
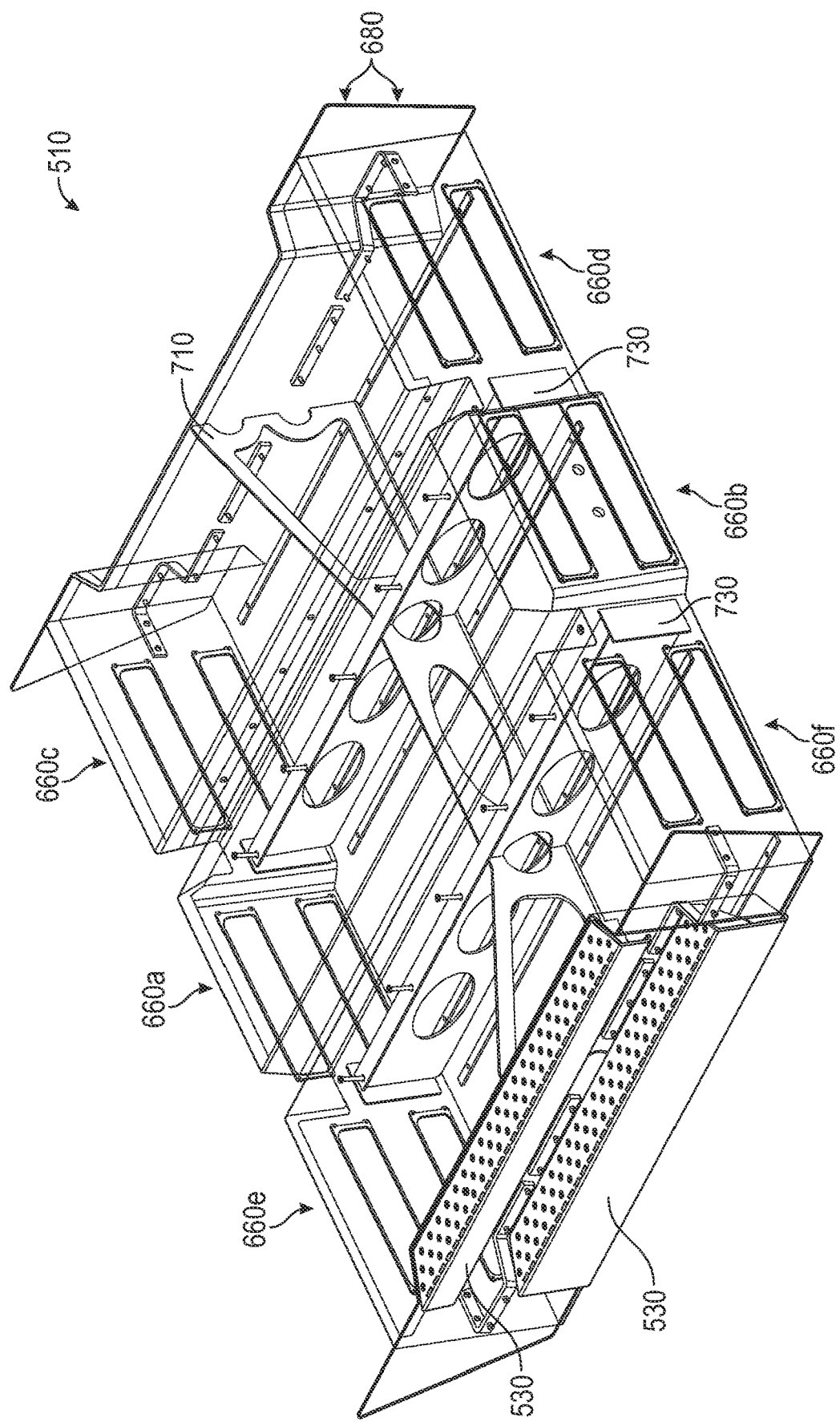
Figure 26:
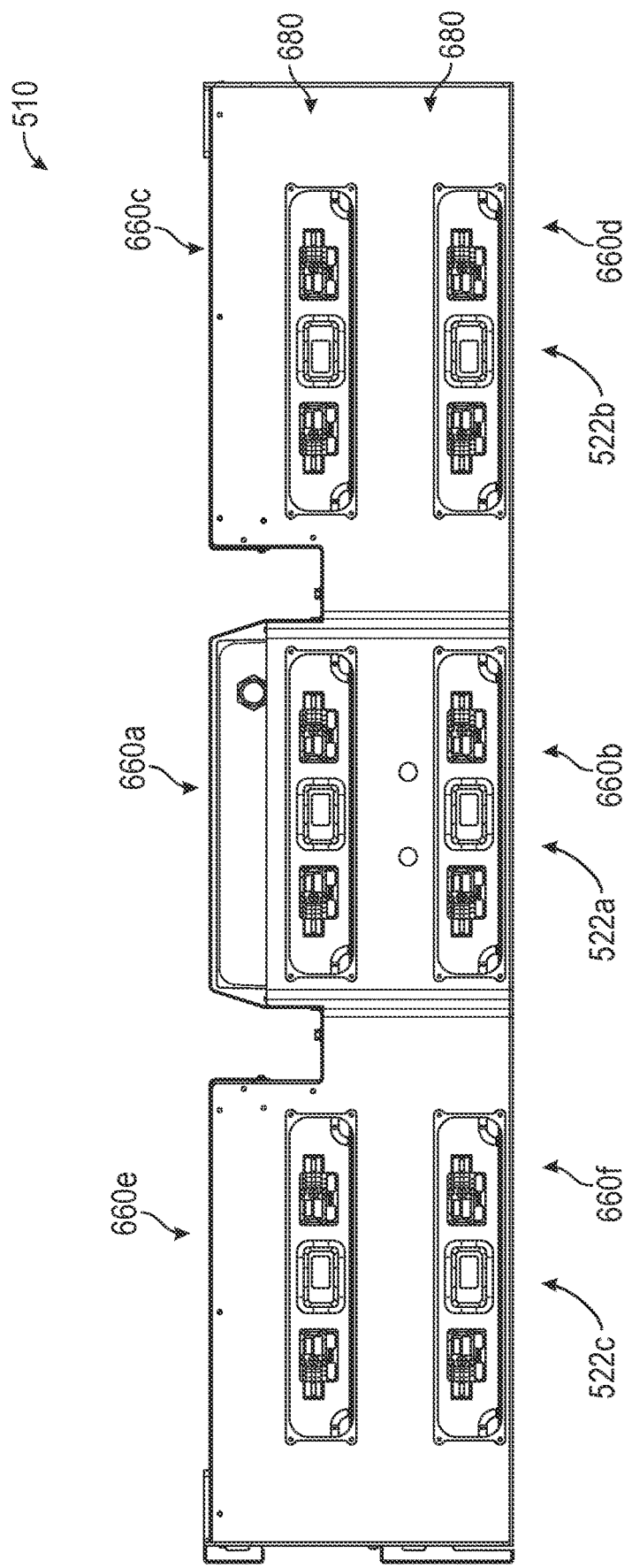

Referring now to FIGS. 21 and 22, the mounting body 580 may include one or more portions shown as upper portion 580a and lower portion 580b (e.g., a protrusion that extends inwards towards the rails 540 or underneath the rails 540). The upper portion 580a may be positioned proximate the rails 540. In some embodiments, the upper portion 580a is configured to directly engage an outer or exterior surface of the rails 540. Additionally or alternatively, the lower portion 580b may be positioned distal the rails 540. The upper portion 580a may be a substantially elongated member vertically extending between the lower portion 580b and the rails 540. The lower portion 580b may be a substantially circular member provided around the isolator 600. The isolator 600 may be an integrated component to the mounting assembly 560. The mounting body 580 can have a hook shape or and L-shape.

In other embodiments, as shown in FIG. 22, the lower portion 580b may include a locking mechanism 645. The locking mechanism 645 may be configured to engage and horizontally compress the isolator 600. The locking mechanism 645 may include a fastener that is selectively loosened and tightened to compress the isolator 600, and, as such, the lower portion 580b may be coupled to the isolator 600 via the locking mechanism 645.

Referring generally to FIGS. 23-26, the battery assembly 510 may be configured to secure one or more battery components (e.g., battery packs, battery modules, batteries, battery cells, etc.). The battery housing 520 defines an inner volume 556, within which the batteries 660 are positioned. In some embodiments, the medial portion 522a defines a first inner sub-volume 558a within which the batteries 660a and the batteries 660b are positioned. In some embodiments, the first lateral portion 522b defines a second inner sub-volume 558b within which the batteries 660b and the batteries 660c are positioned. In some embodiments, the second lateral portion 5ssc defines a third inner sub-volume 558c within which the batteries 660d and the batteries 660e are positioned. The battery assembly 510 may include one or more upper rows of batteries, shown batteries 660a, batteries 660c, and batteries 660e. The upper rows of batteries may extend along a first axis (e.g., a longitudinal axis, a longitudinal direction, defined by a lengthwise extension of the rails 540). According to an exemplary embodiment, the battery assembly 510 may include three first or upper rows of batteries 660 (e.g., batteries 660a, batteries 660c, and batteries 660e). Additionally or alternatively, the first or upper rows of batteries 660 may separate the battery assembly 510 into three regions, where the regions are separated proximate the rails 540. By way of example, the slots 740 may separate the first rows of batteries 660. The battery assembly 510 may include one or more second or lower rows of batteries, shown as the batteries 660b, the batteries 660d, and the batteries 660f. The lower or second rows of batteries include the batteries 660b, the batteries 660d, and the batteries 660f. According to some embodiments, the batteries 660a, the batteries 660b, the batteries 660c, the batteries 660d, the batteries 660e, and the batteries 660f each include multiple sets of battery packs (e.g., two sets of battery packs) that are longitudinally spaced apart from each other. The battery assembly 510 may include one or more columns, shown as battery columns 680. The battery columns 680 may extend along a third axis and define columns for additional batteries. In some embodiments, each of the batteries 660a, the batteries 660b, the batteries 660c, the batteries 660d, the batteries 660e, and the batteries 660f include two battery packs or battery modules, thereby resulting in twelve battery packs or modules being positioned within the inner volume 556 of the housing 502. In some embodiments, the battery assembly 510 may include more or less than twelve battery packs or modules. For example, depending on the size and/or shape of the housing 502, the housing may include additional batteries 660 or battery packs (e.g., with increased longitudinal length of the housing 502 and thereby increased longitudinal length of the inner volume 556 and the inner sub-volumes 558).

The battery assembly 510 may include an insulator 690. The insulator 690 may extend along each of the batteries 660a, the batteries 660c, and the batteries 660e. The insulator 690 may be configured to insulate the batteries 660a, the batteries 660c, and the batteries 660e such to contain protect the batteries 660a, the batteries 660c, and the batteries 660e from being damaged (e.g., damage from extreme temperatures, etc.). By way of example, the insulator 690 may be positioned proximate the top portion 550 and the bottom portion 570. In other embodiments, the insulator 690 may be positioned between each column 680. The insulator 690 may be manufactured out of any material suitable to insulate the batteries 660. Additionally or alternatively, the battery assembly 510 may include a battery separator 720. The battery separator 720 may be configured to separate the batteries 660 positioned in each battery space (e.g., thereby defining the different inner sub-volumes 558). The battery separator 720 may be further configured to support one or more batteries 660 that are positioned within an upper column of the battery assembly 510. In some embodiments, the battery assembly 510 includes one or more of the insulators 690 positioned below each of the batteries 660a, the batteries 660c, the batteries 660e, the batteries 660f, the batteries 660b, and the batteries 660d (e.g., proximate cooling plates).

The battery assembly 510 may further include a barrier, separator, structural member, shown as support 710. The support 710 may extend between different packs or modules of the batteries 660 (e.g., forwards and rearwards positioned modules or packs of the batteries 660a), where the support 710 separates the different packs or modules of the batteries 660. In some embodiments, the battery assembly 510 may include additional supports 710 positioned at ends of the battery assembly 510. The support 710 may be configured to provide structural support to the battery assembly 510 to prevent the sidewalls from being compromised upon introduction of an impact force onto the battery assembly 510. The battery assembly 510 may further include an additional barrier, separator, structural member, shown as second support 730. The second support 730 may extend substantially perpendicular to the support 710. The second support 730 may be configured substantially perpendicular to the support 710, and, as such, the description of support 710 is reiterated here.

Figure 27:
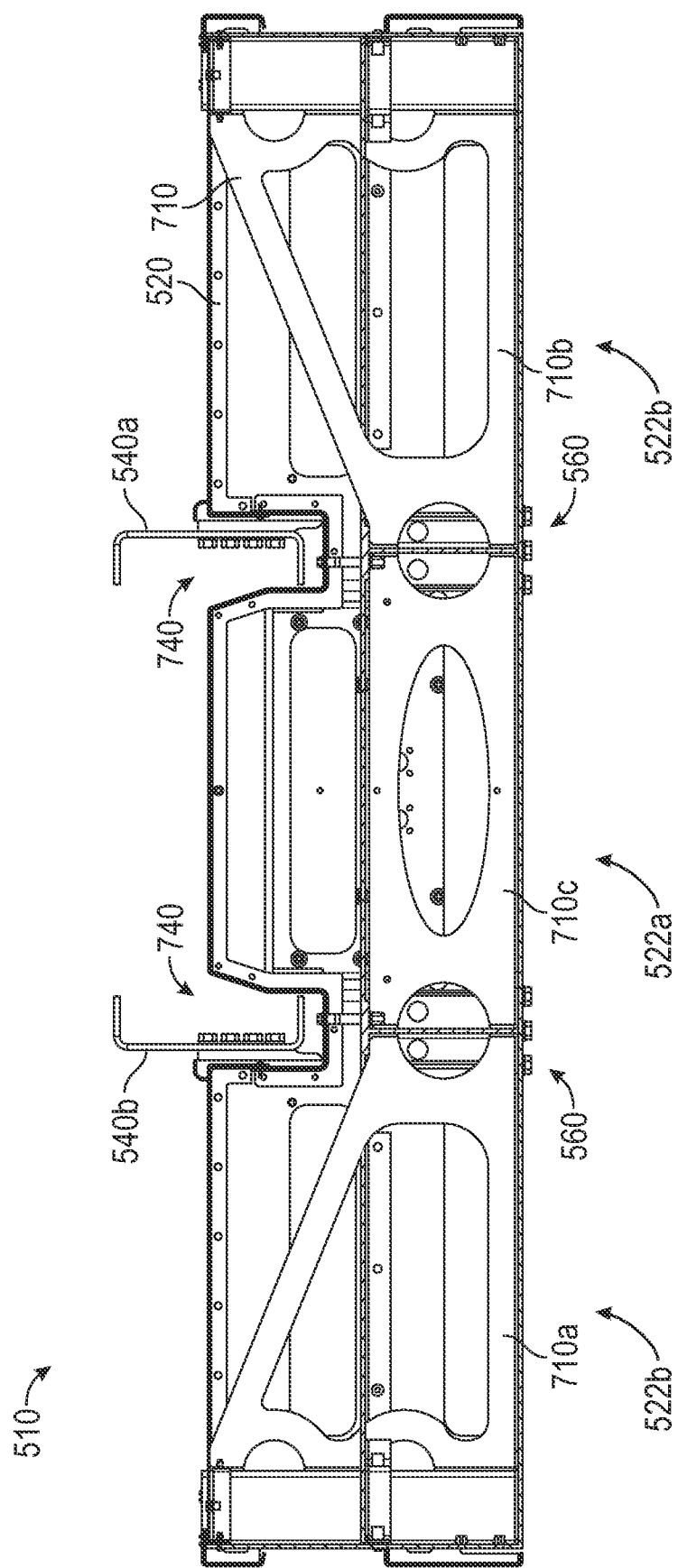
FIG. 27 is a detailed side view of the underslung battery mount of FIG. 14, according to an exemplary embodiment.
Figure 28:
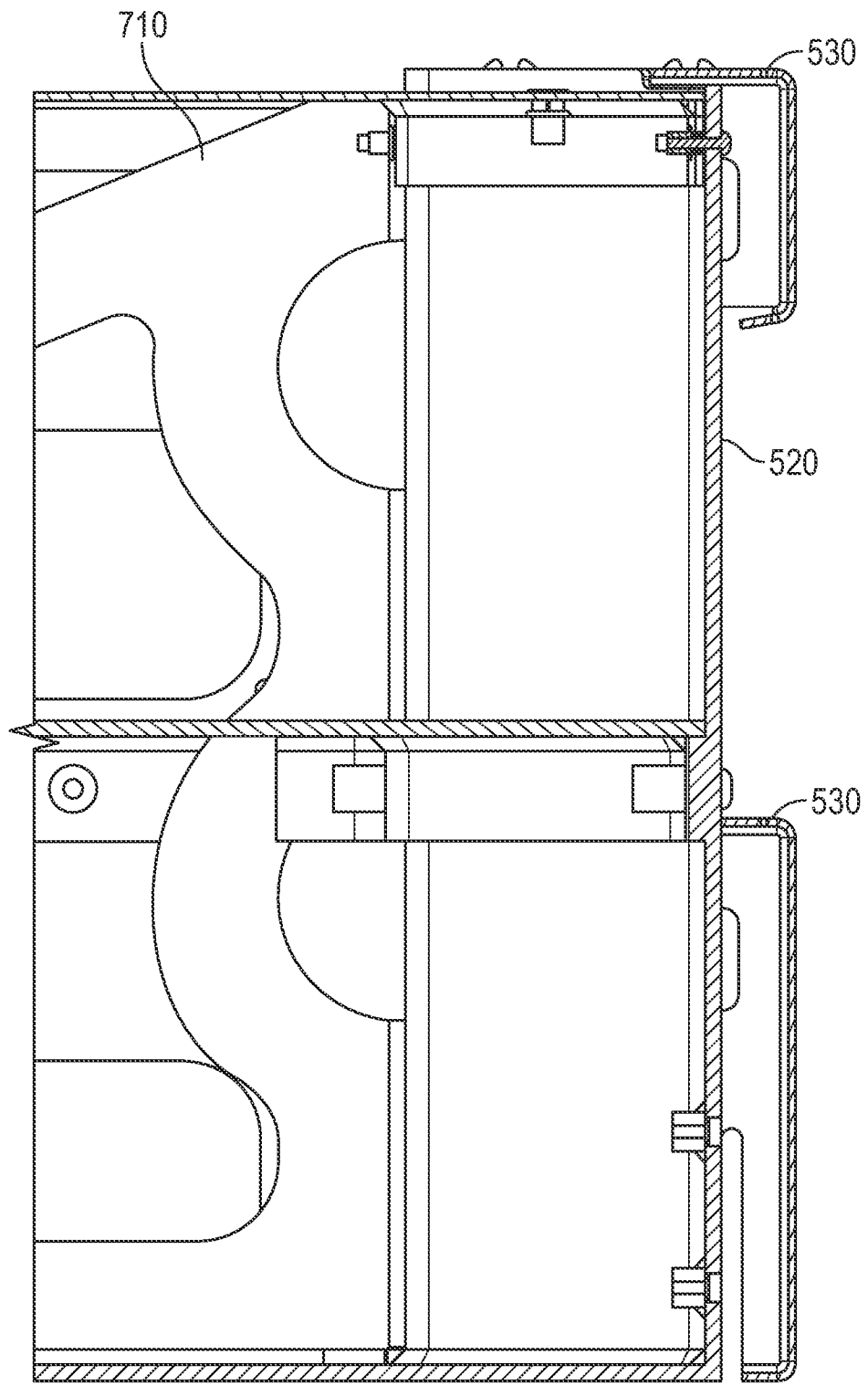
FIG. 28 is a detailed view of the underslung battery mount of FIG. 27, according to an exemplary embodiment.
Figure 29:
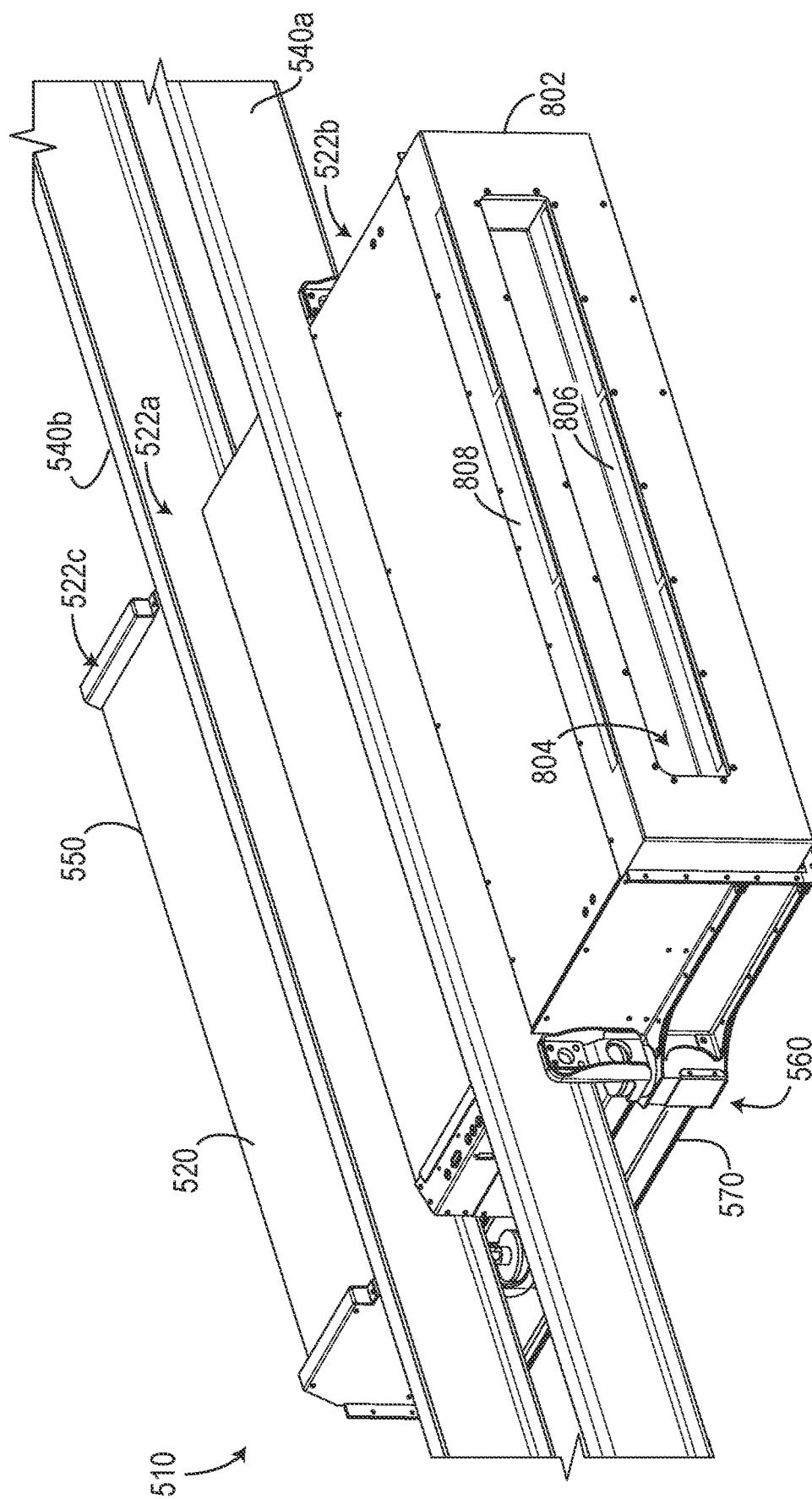
FIG. 29 is a perspective view of the underslung battery mount of FIG. 14, according to an exemplary embodiment.
Figure 30:
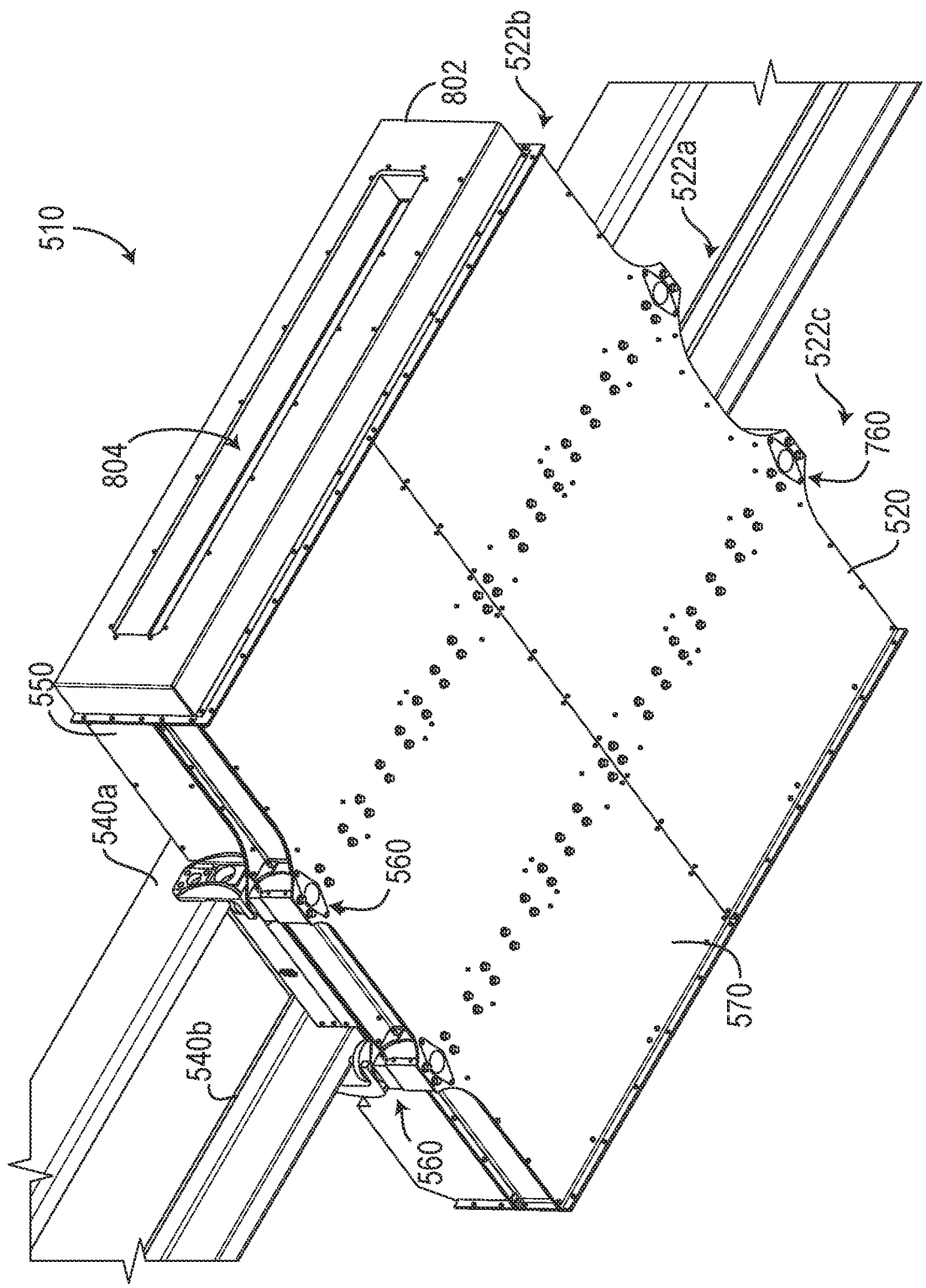
FIG. 30 is a bottom perspective view of the underslung battery mount of FIG. 14, according to an exemplary embodiment.
Figure 31:
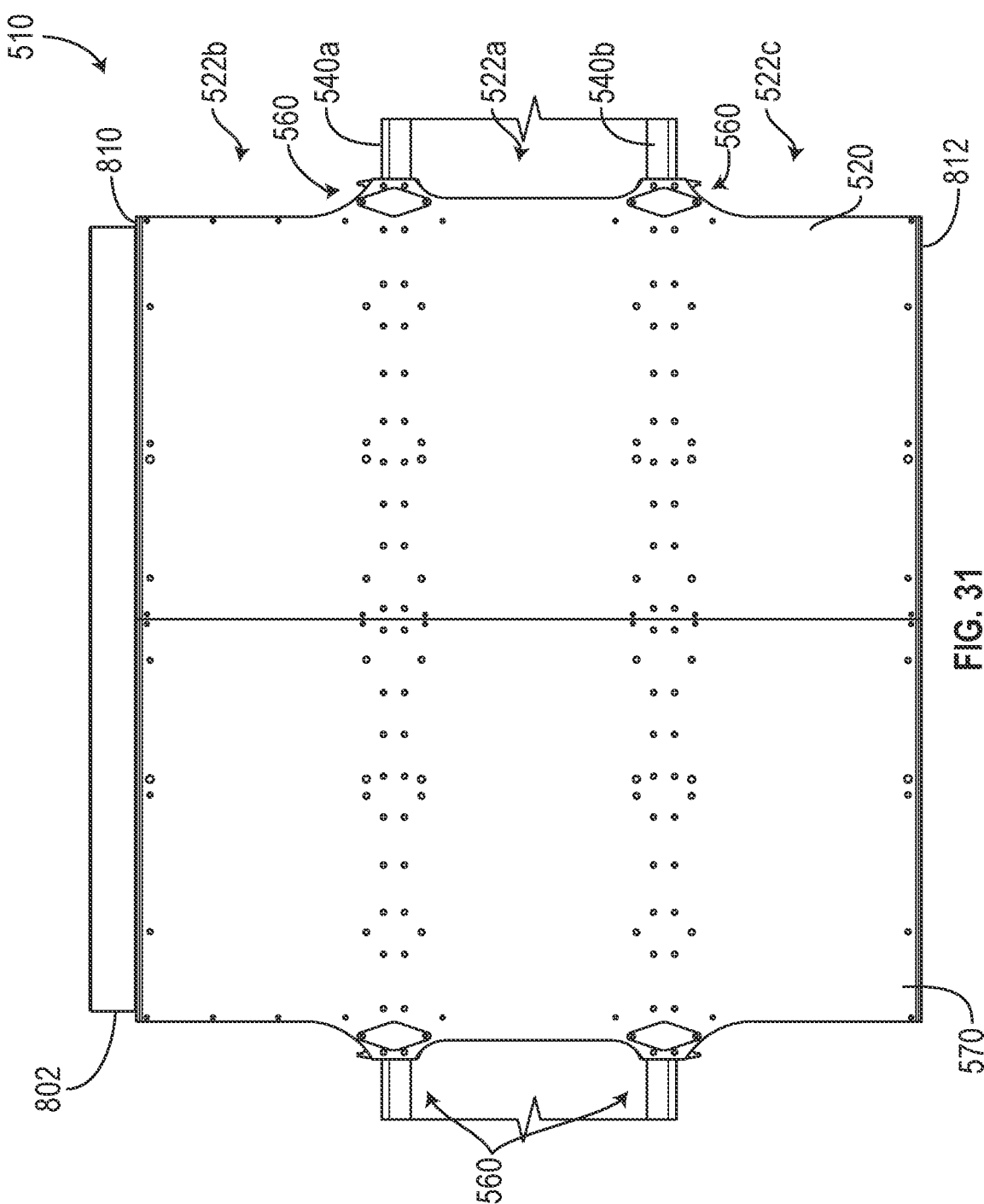
FIG. 31 is a bottom view of the underslung battery mount of FIG. 14, according to an exemplary embodiment.
Figure 32:
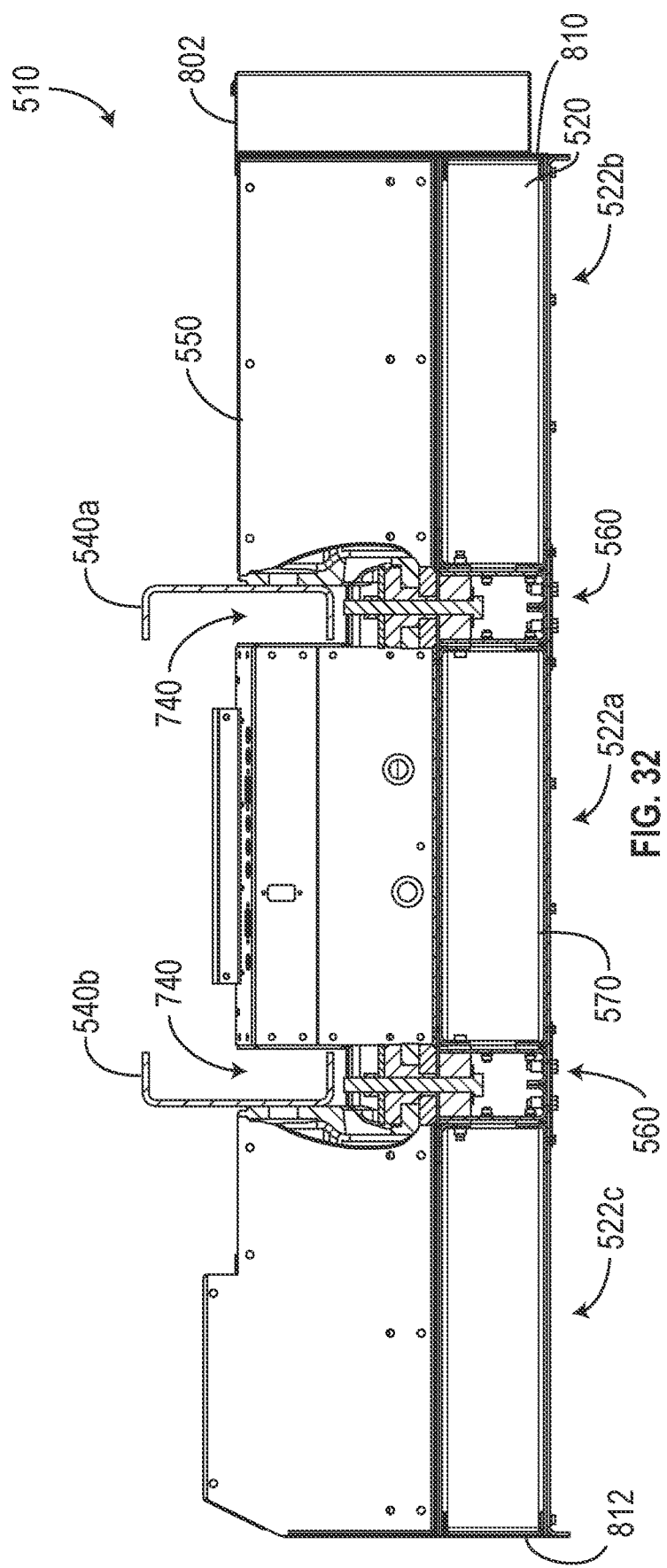
FIG. 32 is a front view of the underslung battery mount of FIG. 14, according to an exemplary embodiment.
Figure 33:
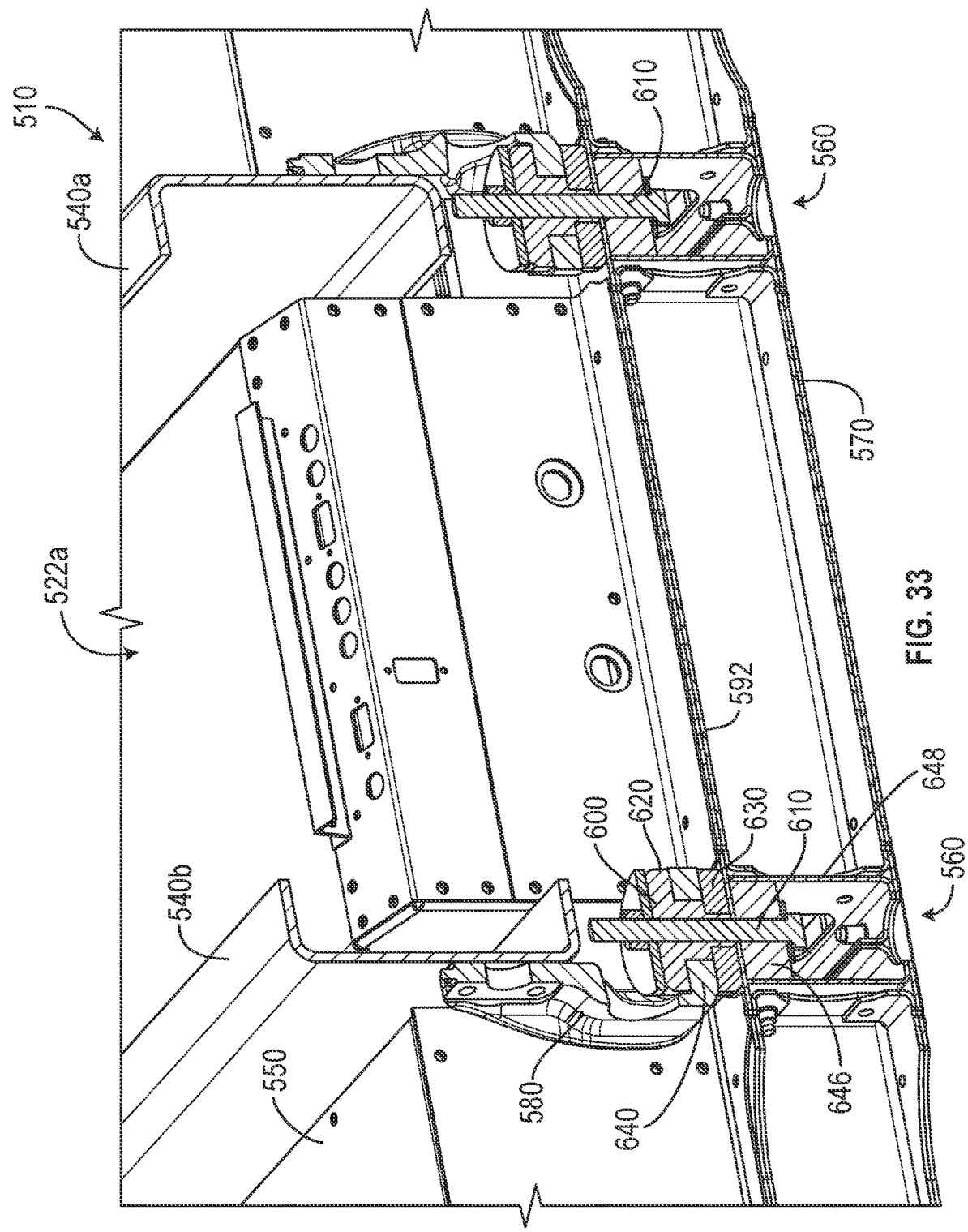
FIG. 33 is a sectional perspective view of the underslung battery mount of FIG. 14, according to an exemplary embodiment.
Figure 34:
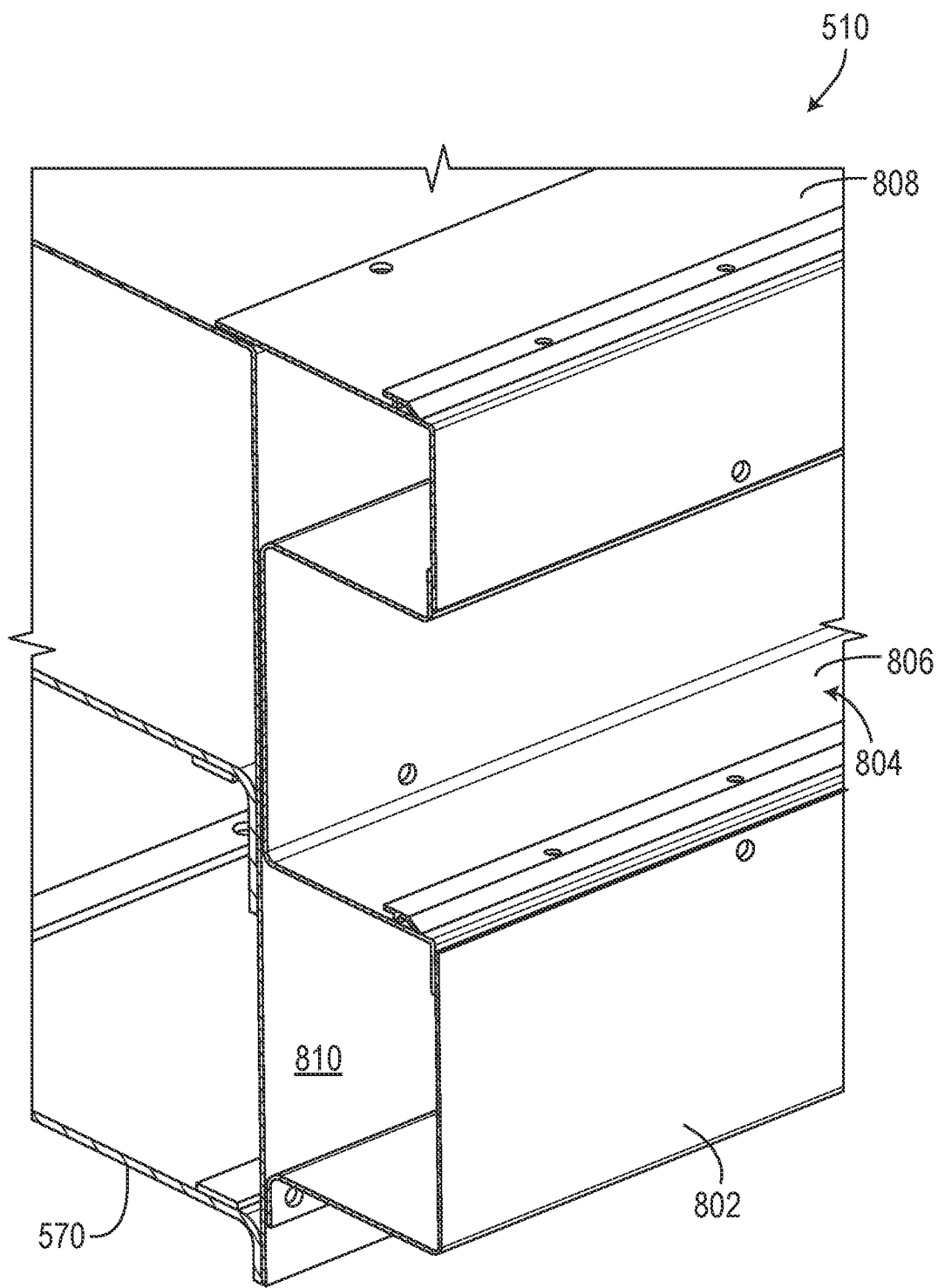
FIG. 34 is a perspective view of a step of the underslung battery mount of FIG. 14, according to an exemplary embodiment.
Figure 35:
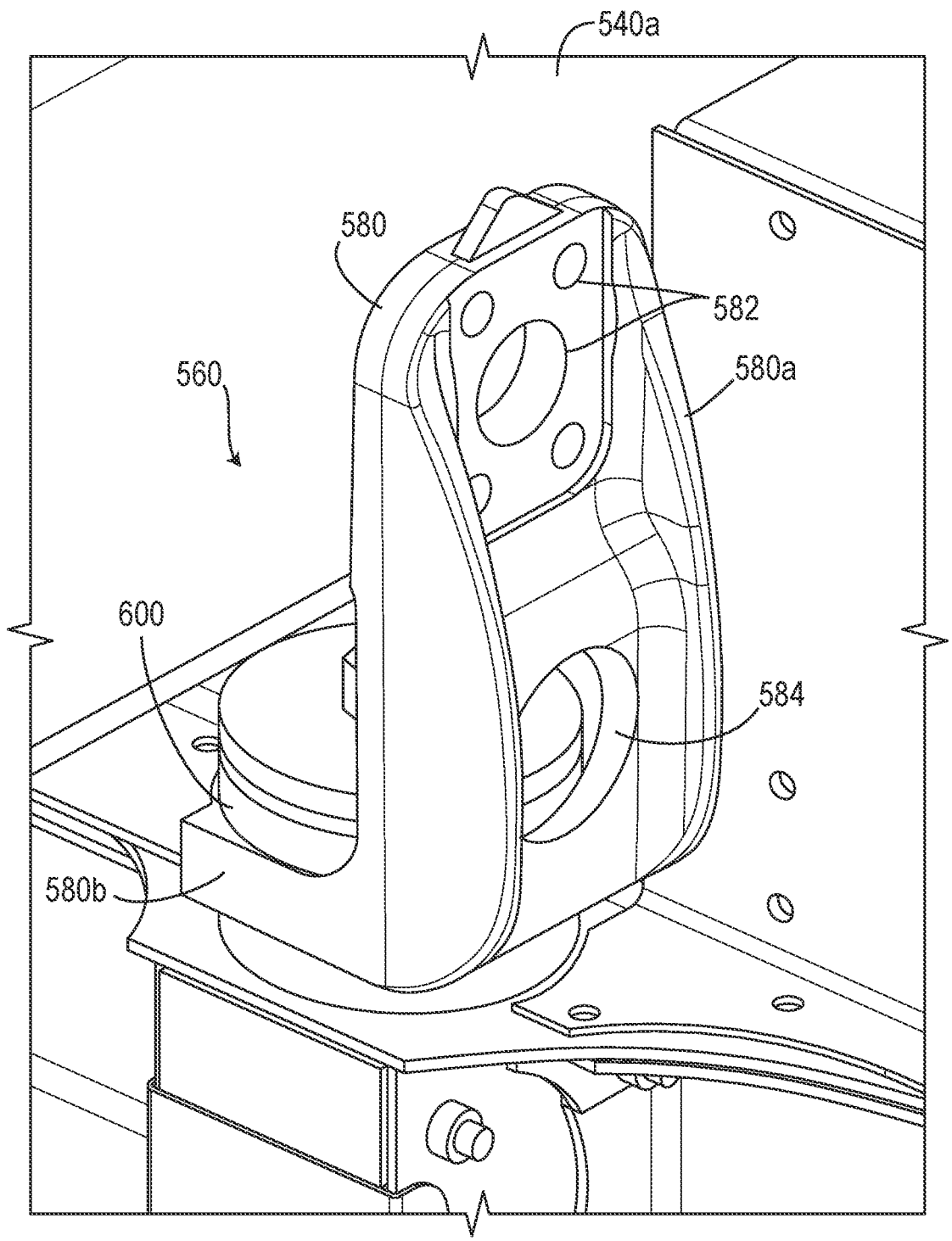
FIG. 35 is a perspective view of a mount of the underslung battery mount of FIG. 14, according to an exemplary embodiment.
Figure 36:
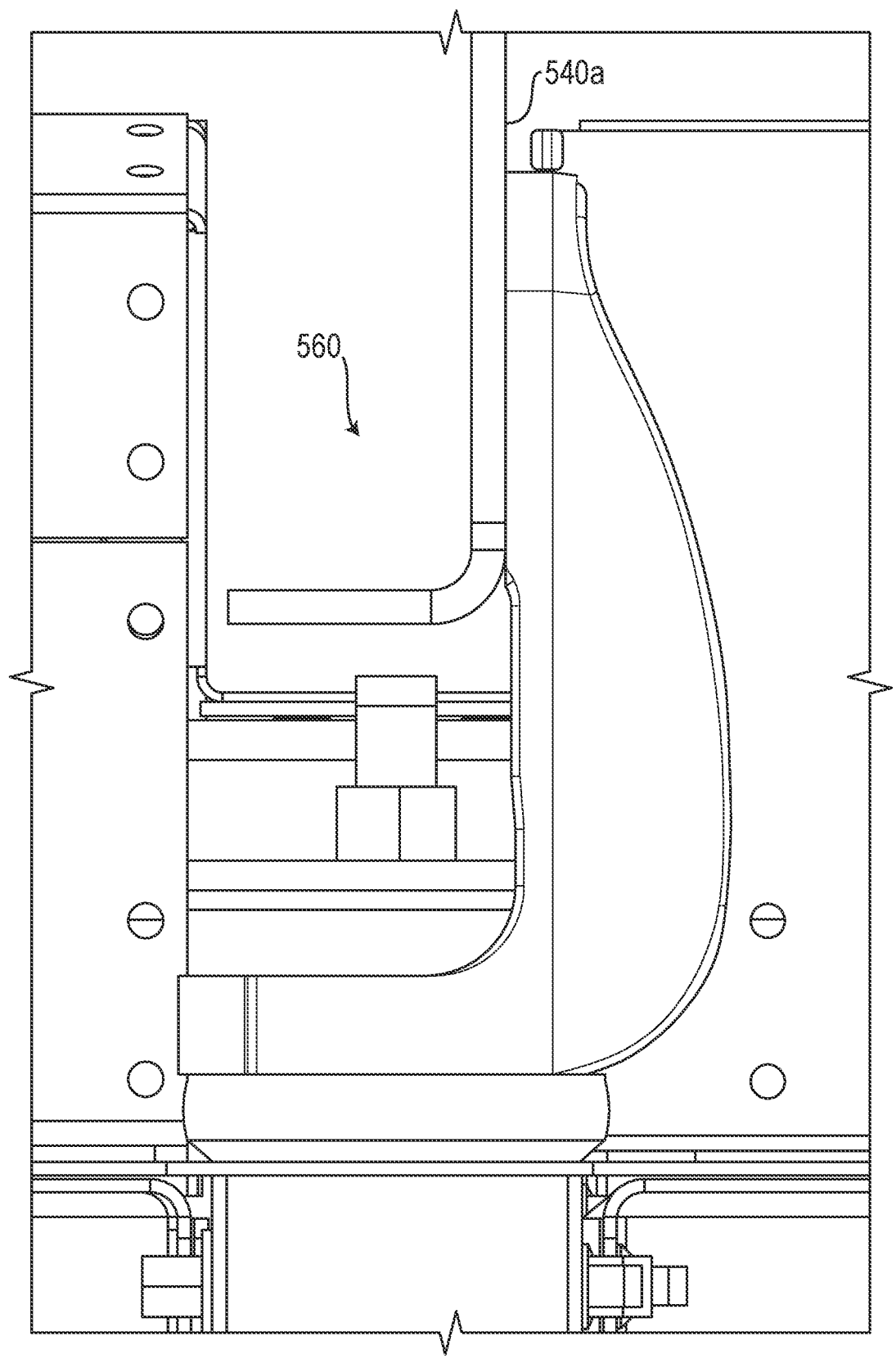
FIG. 36 is a view of the mount of FIG. 35, according to an exemplary embodiment.
Figure 37:
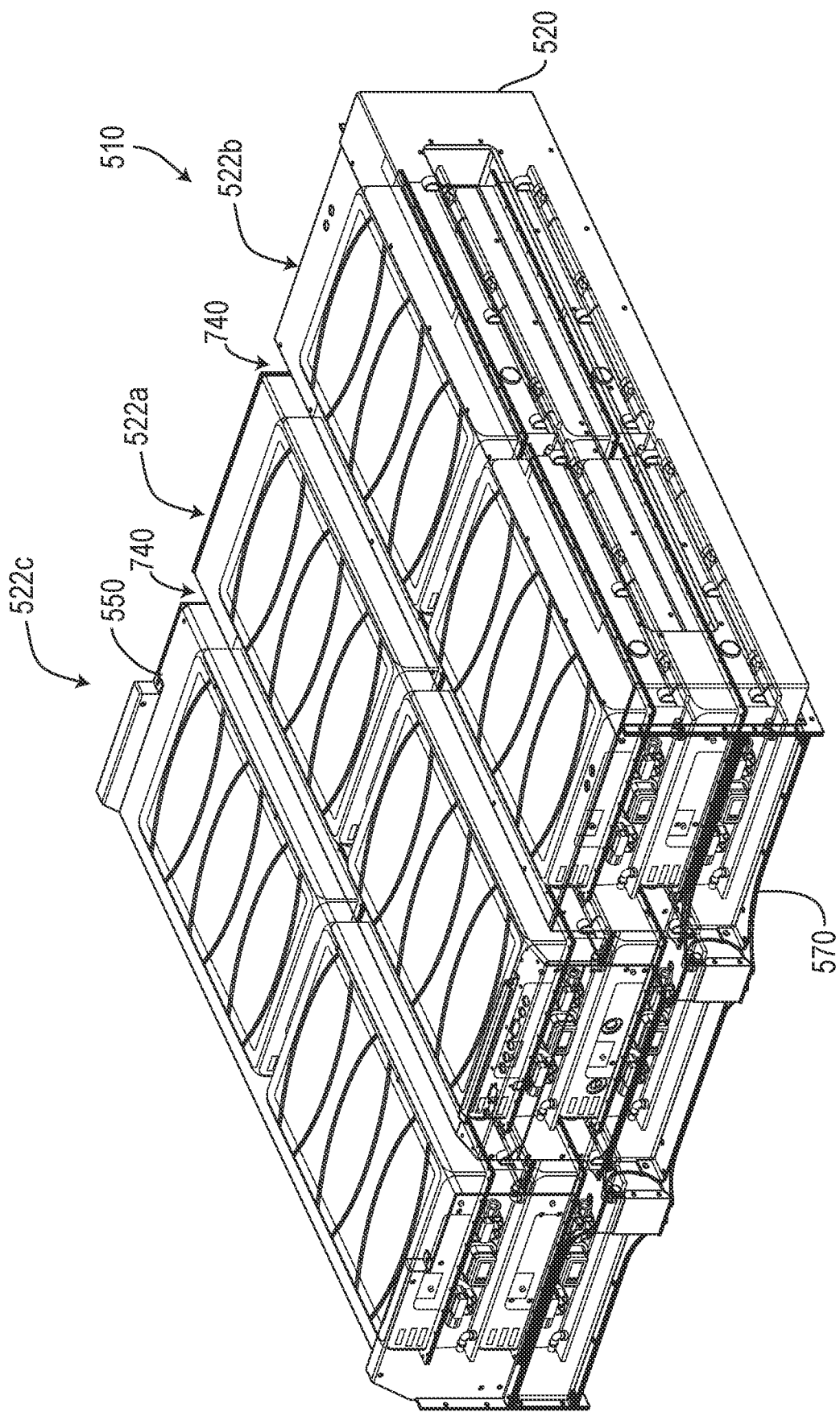
FIG. 37 is a perspective view of the underslung battery mount of FIG. 14, according to an exemplary embodiment.
Figure 38:
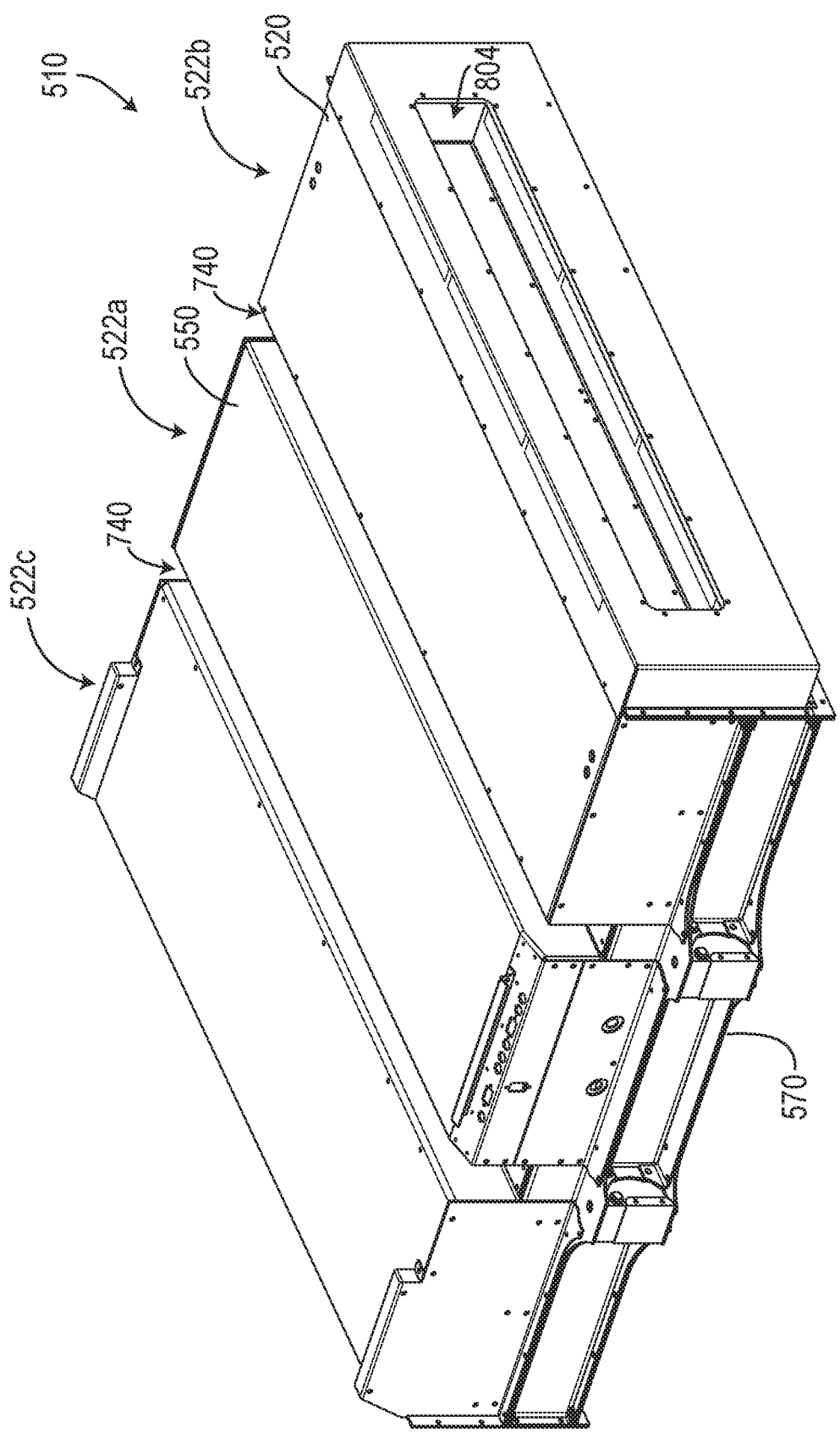
FIG. 38 is a perspective view of the underslung battery mount of FIG. 14, according to an exemplary embodiment.
Figure 39:
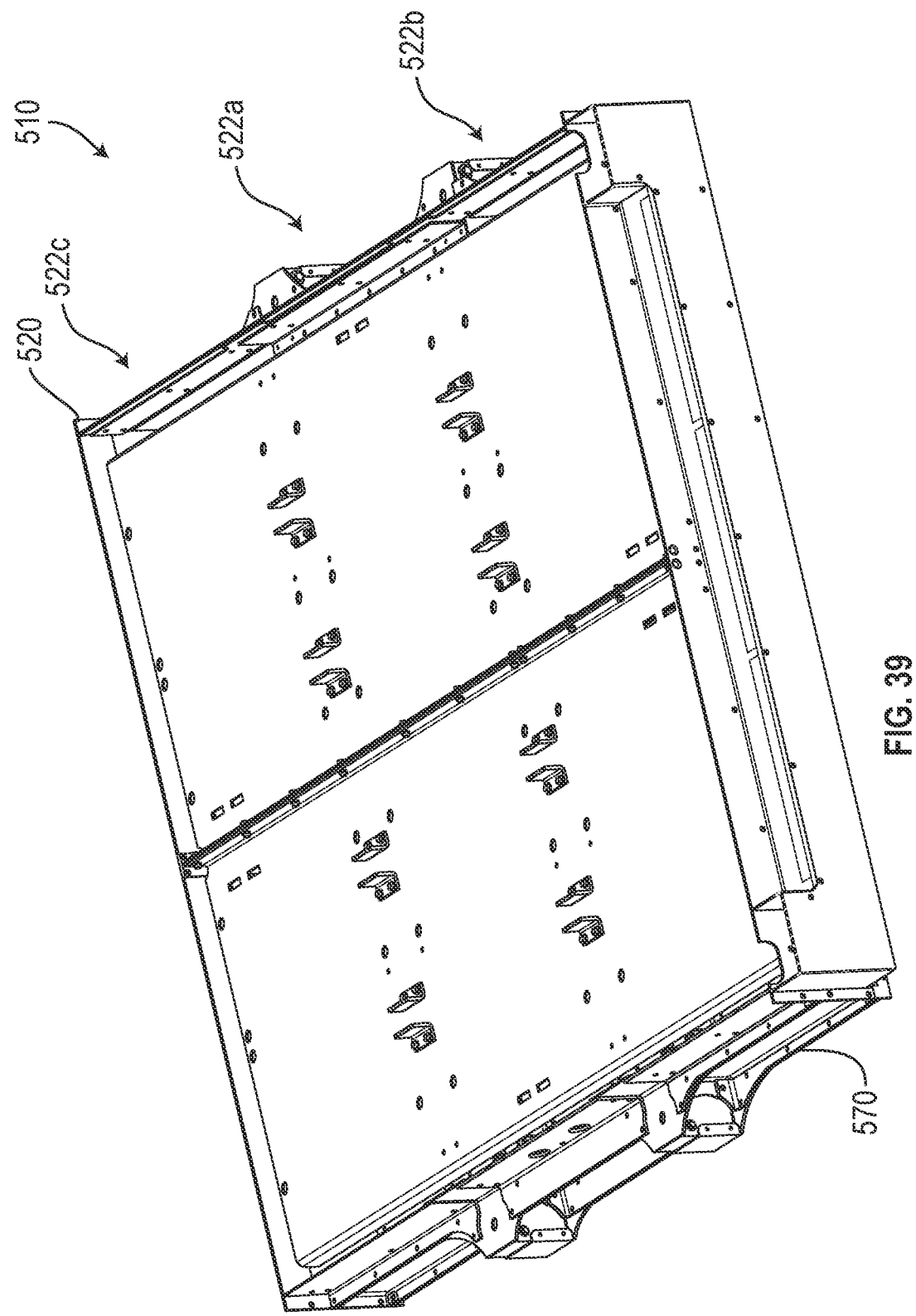
FIG. 39 is a perspective sectional view of the underslung battery mount of FIG. 14, according to an exemplary embodiment.
Figure 40:
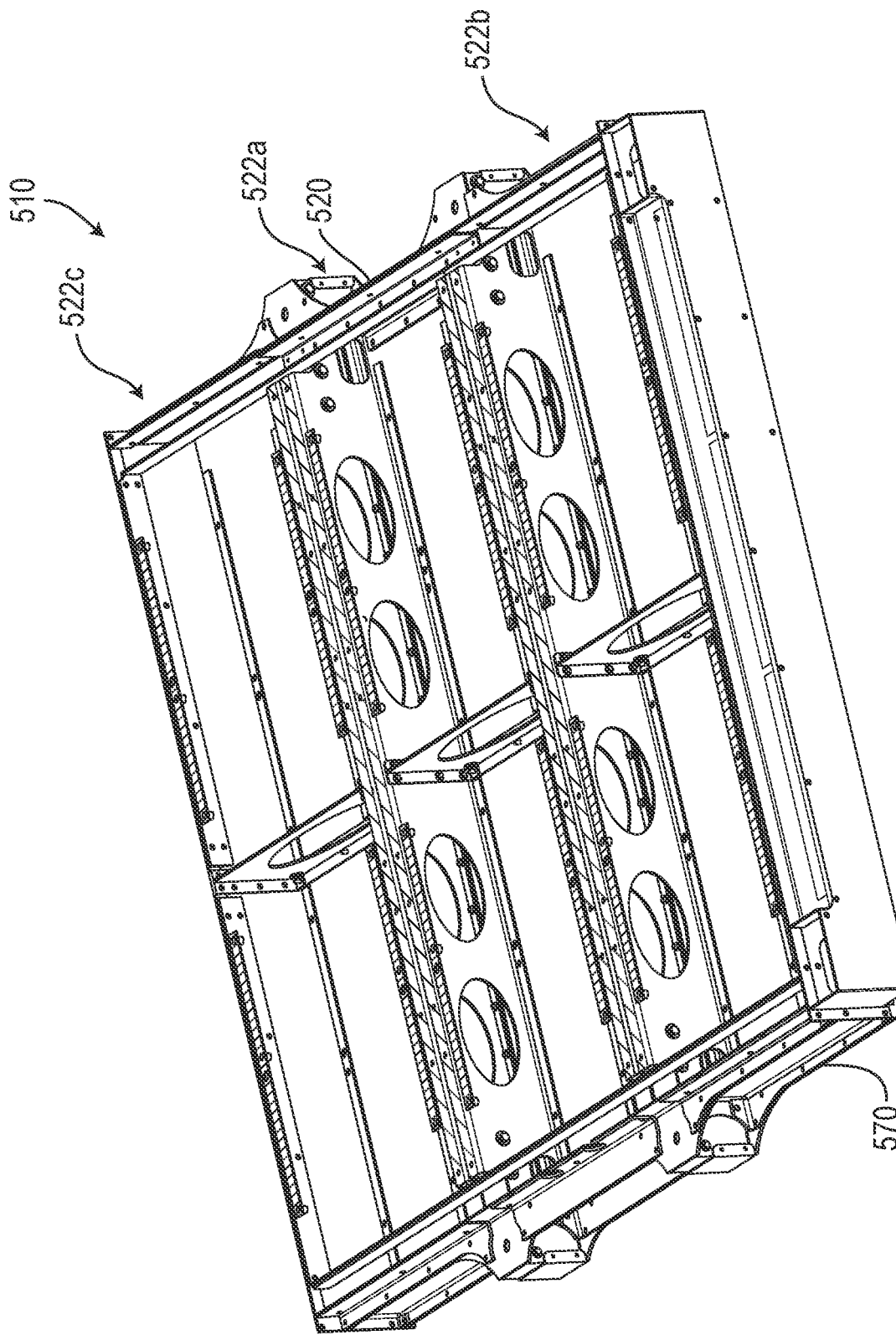
FIG. 40 is a perspective sectional view of the underslung battery mount of FIG. 14, according to an exemplary embodiment.
Figure 41:
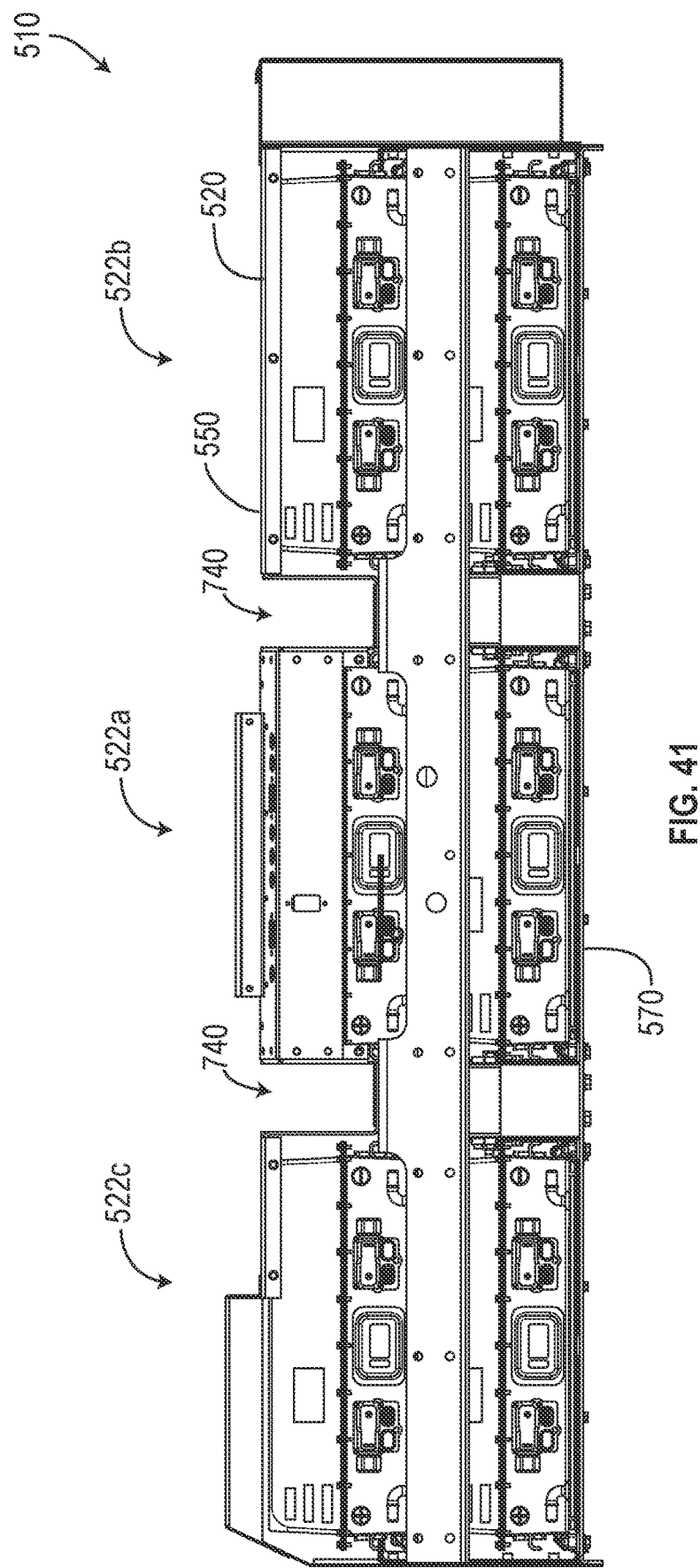
FIG. 41 is a front view of the underslung battery mount of FIG. 14, according to an exemplary embodiment.
Figure 42:
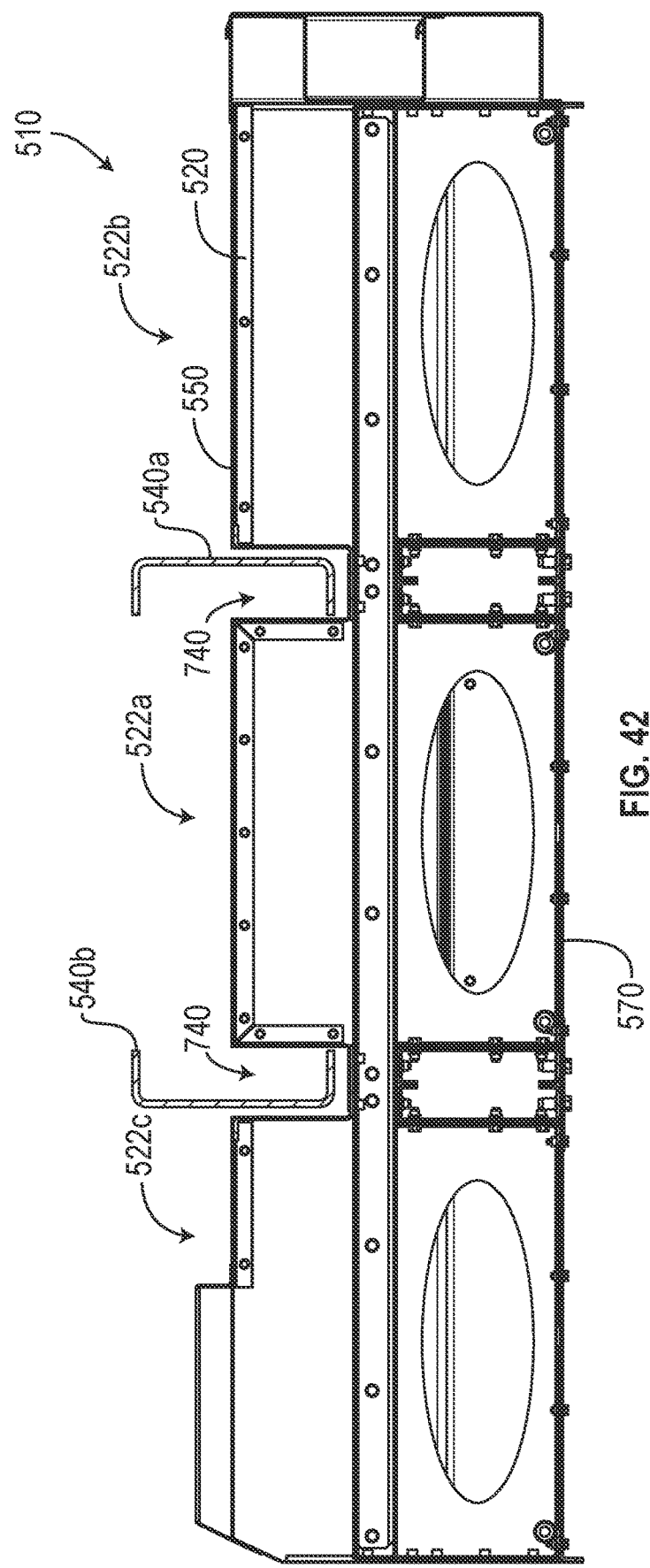
FIG. 42 is a front view of the underslung battery mount of FIG. 14, according to an exemplary embodiment.
Figure 43:
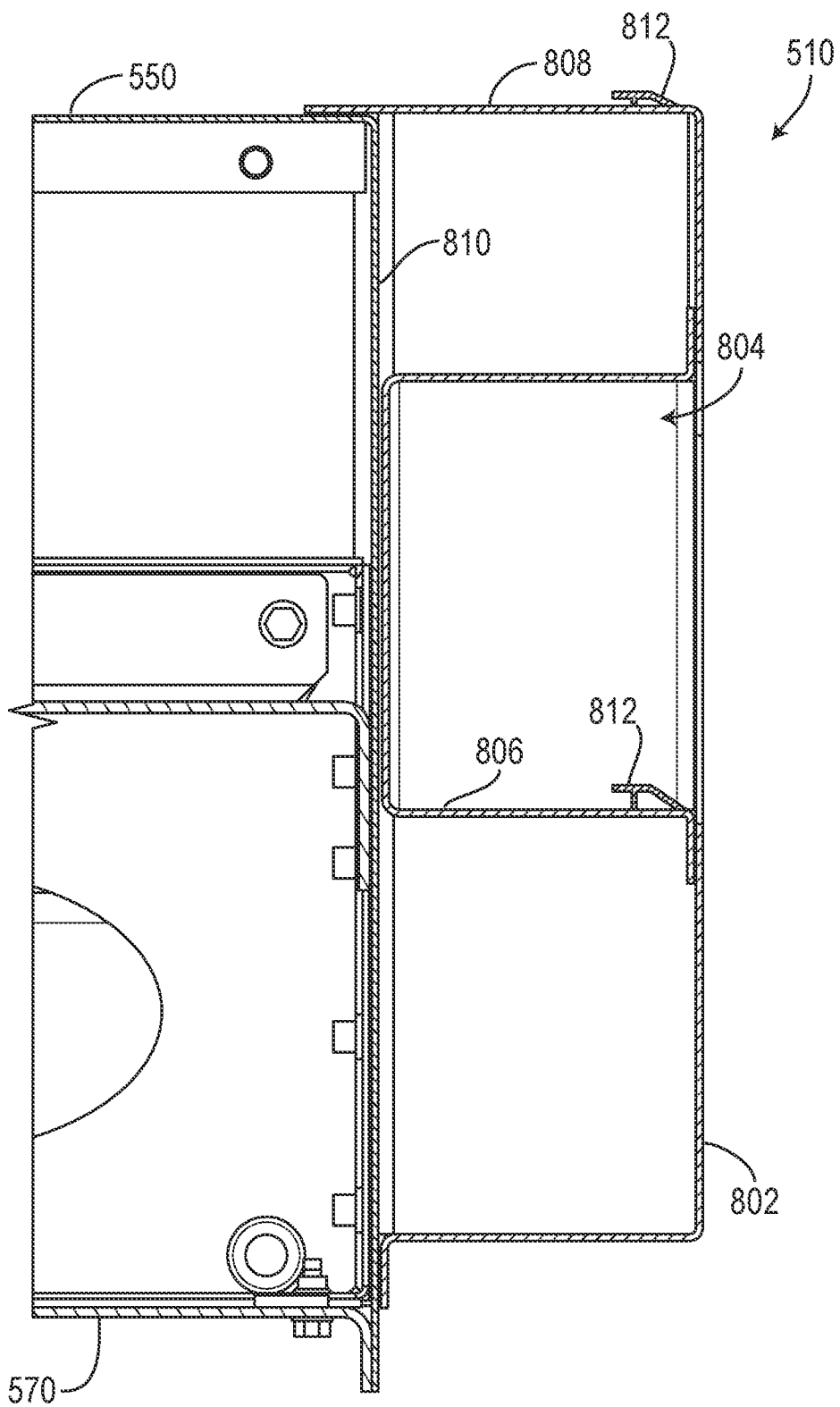
FIG. 43 is a front sectional view of the underslung battery mount of FIG. 14, according to an exemplary embodiment.
Figure 44:
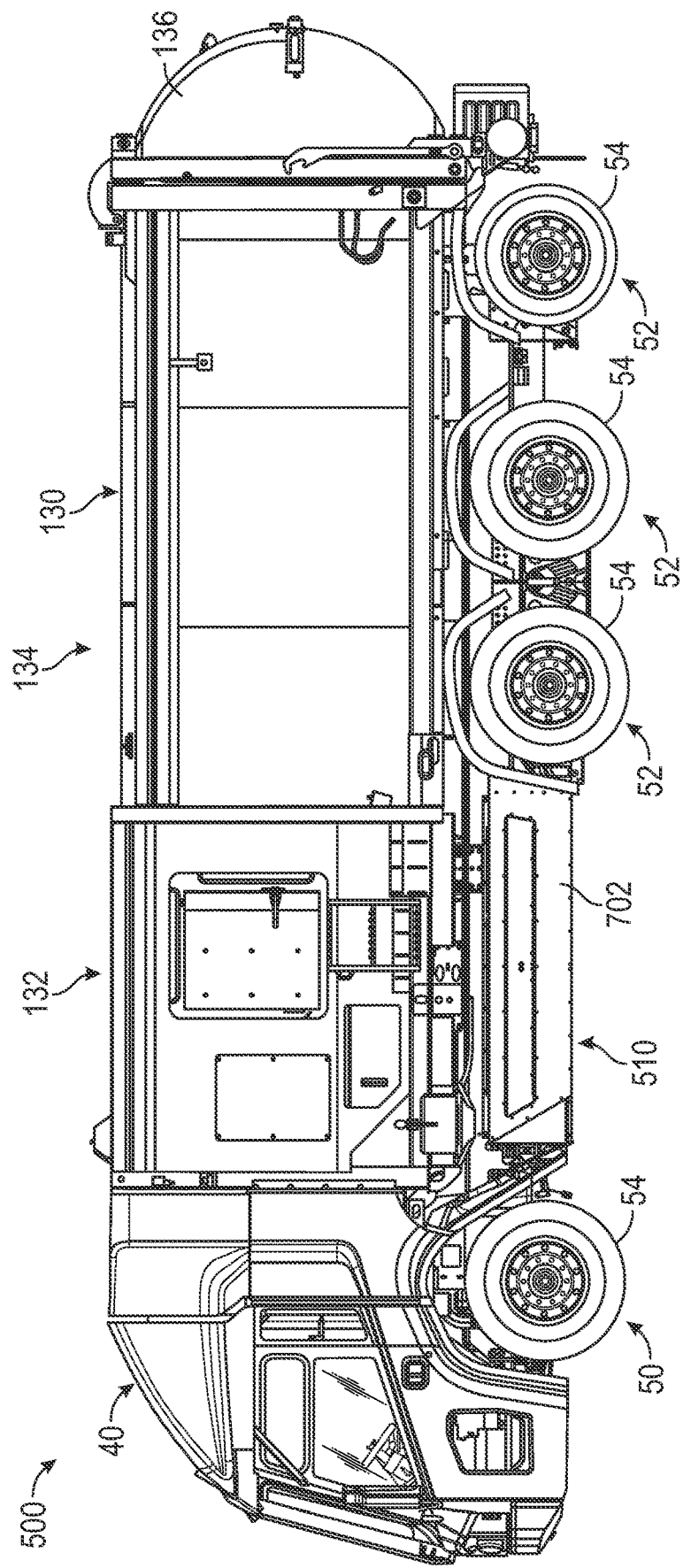
FIG. 44 is a side view of the underslung battery mount of FIG. 14 installed on a refuse vehicle, according to an exemplary embodiment.

Referring to FIGS. 27 and 28, the support 710 may include a first portion 710a, a second portion 710b, and a middle portion 710c. The first portion 710a may be substantially similar to the second portion 710b. In other embodiments, the first portion 710a and the second portion 710b may be substantially different. The portions 710a, 710b, 710c may have a width corresponding to a lateral width of the batteries 660, with transitions between the portions 710a, 710b, 710c at locations substantially similar to the slots 740. The first and second portions 710a, 710b may define substantially triangular structures, although different geometrical structures may be used to define the first and second portions 710a, 710b (e.g., prismatic, cylindrical, frustoconical, etc.). The middle portion 710c may be positioned between the first and second portions 710a, 710b. The middle portion 710c may further define a substantially rectangular structure, although different geometrical structures may be used to define the middle portion 710c (e.g., triangular, cylindrical, frustoconical, etc.). The support 710 may be fixedly coupled to an inner portion of the battery housing 520.

As shown in FIG. 28, the support 710 may be fixedly coupled to an inner portion of the battery housing 520. The support 710 may be coupled to an inner wall of the battery housing 520 via welding, fasteners (e.g., brackets, etc.), or the like. In other embodiments, the support 710 may not be coupled to the battery housing 520, where the support 710 may be held by the batteries 660 (e.g., battery modules) positioned around the support 710. The support 710 may further extend along an entire height of the battery housing 520. As can be appreciated, the support 710 may structurally hold the battery housing 520 into a desired shape to protect the batteries 660 positioned within from impact forces introduced to the battery assembly 510.

Referring to FIGS. 29-32, 34, 37-43, the battery assembly 510 may include a step member 802 that is coupled on one or more lateral sides of the battery housing 520. The step member 802 may be positioned similarly to the steps 530 as described in greater detail above. The step member 802 is positioned on a first lateral side 810 of the battery housing 520, according to some embodiments. In some embodiments, the battery assembly 510 includes another step member 802 positioned on an opposite lateral side of the battery housing 520 (e.g., a lateral side of the battery housing 520 that is opposite the first lateral side 810).

The step member 802 defines a first space 804 and includes a first stepping surface 806 that defines a bottom portion of the first space 804. The first space 804 provides space for the user to put their toe or foot into when ascending or descending the step member 802. The step member 802 also includes a second stepping surface 808 that is positioned substantially coplanar with or slightly above the top portion 550 (e.g., a top surface, an upper periphery) of the battery housing 520. In some embodiments, a rubber insert 812 (e.g., a rubber member, a plastic member, a tractive member, etc.) is positioned on the first stepping surface 806 (e.g., a first step) and the second stepping surface 808 (e.g., a second step). The rubber insert 812 is configured to improve traction or grip for the user when the user ascends or descends the first stepping surface 806 and the second stepping surface 808.

Referring to FIGS. 32-33 and 35-36, the mounting assembly 560 is configured to couple the battery assembly 510 with the rails 540 through a connection at intermediate member 592 of the battery housing 520. The intermediate member 592 is positioned vertically above the bottom portion 570 of the battery housing 520 and is coupled with the bottom portion 570 of the battery housing 520 through vertical members 648. The vertical members 648 extend between and couple with (e.g., are integrally formed with, are fastened with, etc.) the bottom portion 570 of the battery housing 520 (e.g., a bottom plate) and the intermediate member 592 of the battery housing 520. In some embodiments, the lateral fastener 610 extends upwards through the isolator 600 and a support block 646 (e.g., a cylindrical member, a mounting member, a washer, etc.). The fasteners 610 couple the mounting body 580 with the intermediate member 592. The mounting body 580 includes one or more openings 582 (e.g., an aperture, a hole, a bore, etc.) positioned at the upper portion 580a of the mounting body 580. The openings 582 are configured to receive fasteners to couple the mounting body 580 with the rails 540. In this way, the battery assembly 510 may be hung from the rails 540 through the mounting assemblies 560 that couple with the battery housing 520 at a position above the bottom portion 570. The body 580 may include an opening 584 for accessing the fastener of the top fastener 610.

Referring to FIGS. 44-51, the step member 802 can be provided on a lateral side of the battery assembly 510 as a removable panel 702 (e.g., a removable step assembly, a removable member, a removable housing, etc.). In some embodiments, the removable panel 702 is fastened (e.g., using bolts) to the lateral side of the battery assembly 510 such that the removable panel 702 can be removed and replaced with a different panel (e.g., a different step arrangement). In some embodiments, the removable panel 702 can be removed and replaced with a different panel or step assembly that has a cut out and room for the grabber assembly 162 and the lift assembly 160 (e.g., in a side loading arrangement of the refuse vehicle 500). In a front end loading or rear end loading configurations (e.g., as shown in FIGS. 44-49), the removable panel 702 may be installed on the lateral sides of the battery assembly 510 (e.g., on the first lateral side 810 of the battery housing 520 and the opposite lateral side). In some embodiments, if the refuse vehicle 500 is configured as a side loading vehicle, the refuse vehicle 500 includes the removable panel 702 (e.g., the removable step assembly) as shown in FIGS. 44-49 on one side of the refuse vehicle 500 that does not include the grabber assembly 162 and the lift assembly 160, and includes a cut out on the side of the refuse vehicle 500 that includes the grabber assembly 162 and the lift assembly 160. The removable panel 702 can be structurally similar to the step member 802 and may define the first space 804, the stepping surface 806, and the stepping surface 808.

Figure 45:
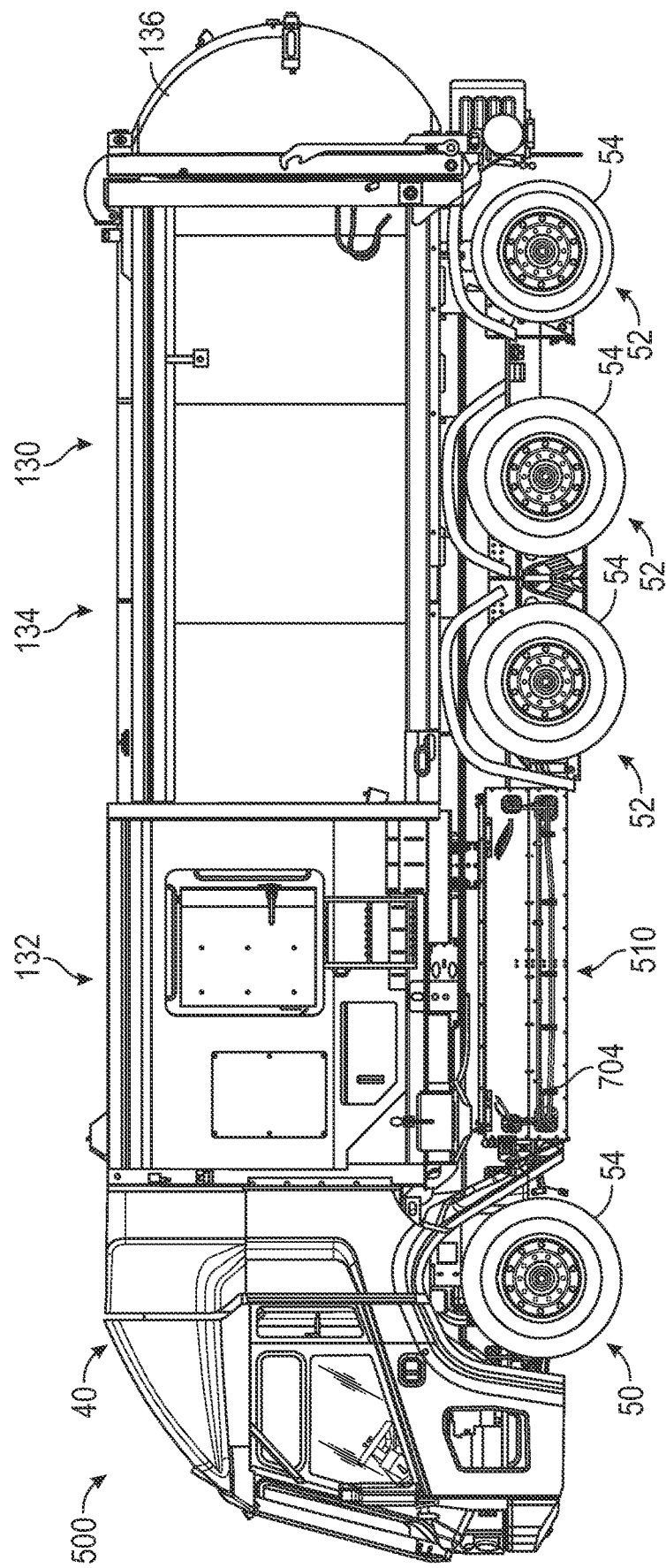
FIG. 45 is a side view of the underslung battery mount of FIG. 14 installed on a refuse vehicle with a removable step removed, according to an exemplary embodiment.
Figure 46:
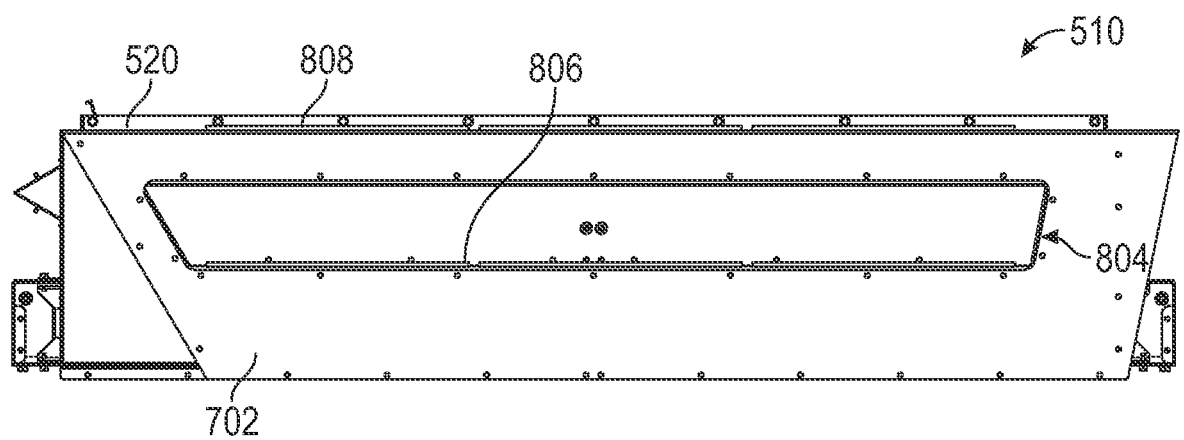
FIG. 46 is a side view of the underslung battery mount of FIG. 44, according to an exemplary embodiment.
Figure 47:
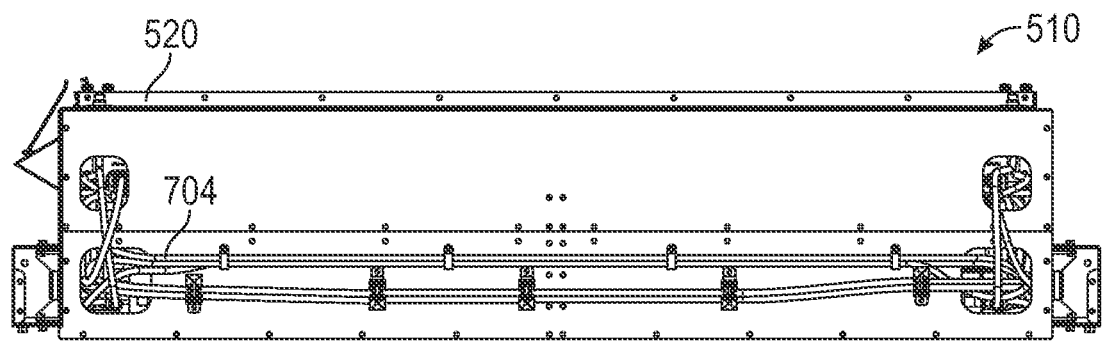
FIG. 47 is a side view of the underslung battery mount of FIG. 45, according to an exemplary embodiment.
Figure 48:
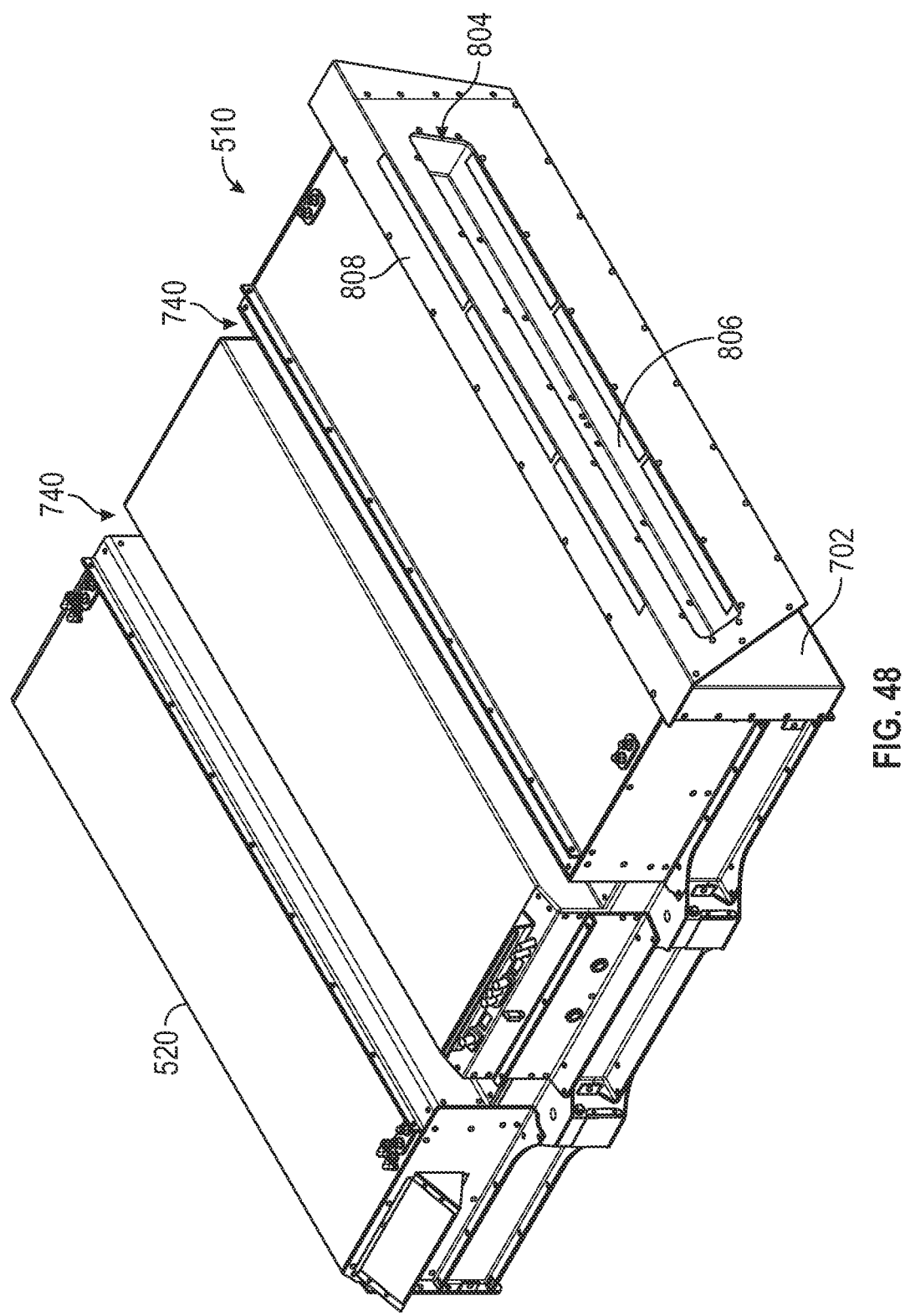
FIG. 48 is a perspective view of the underslung battery mount of FIG. 44, according to an exemplary embodiment.
Figure 49:
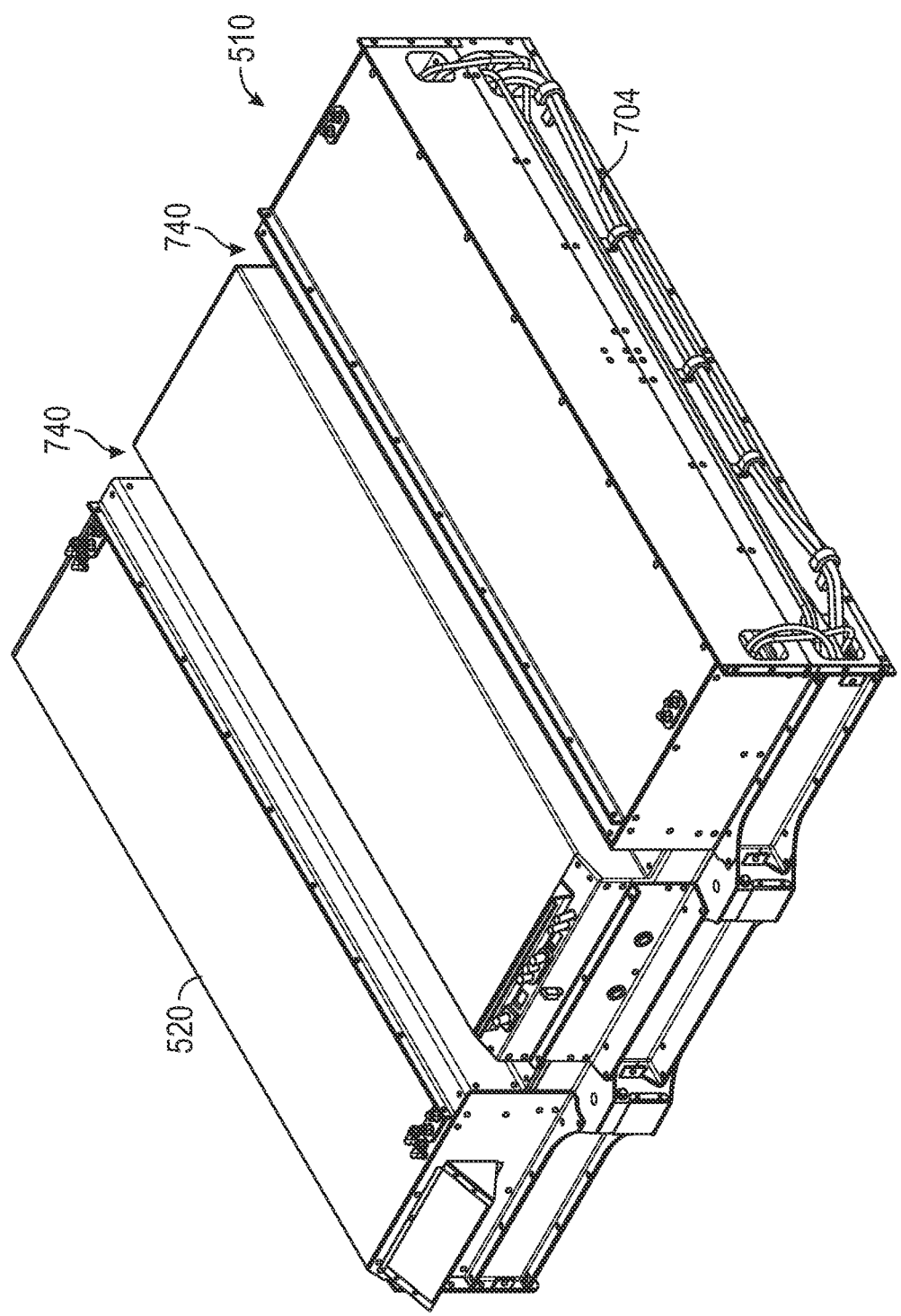
FIG. 49 is a perspective view of the underslung battery mount of FIG. 45, according to an exemplary embodiment.

Referring particularly to FIGS. 45, 47, and 49, the removable panel 702 can enclose, surround, provide a housing for, etc., one or more electric cables 704 (e.g., cords, power lines, etc.). In some embodiments, the electric cables 705 are electrically coupled with the batteries 660 of the battery assembly 510. In some embodiments, the electric cables 704 are configured to provide electrical energy or power to one or more electric components of the vehicle 500 (e.g., electric actuators of the grabber assembly 162, the lift assembly 160, etc.). In some embodiments, the removable panel 702 function as both a structural support for stepping, and also functions as a housing or barrier for the electric cables 704.

Figure 50:
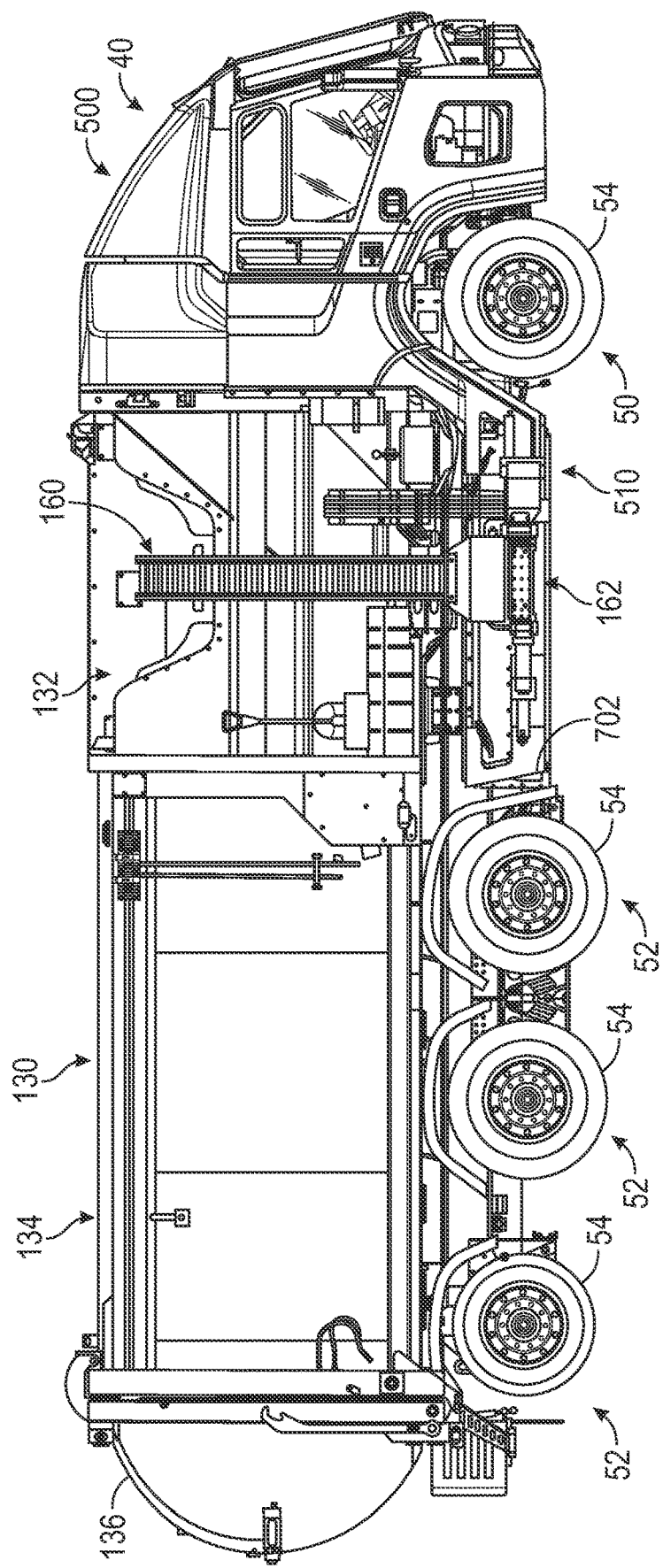
FIG. 50 is a side view of the underslung battery mount of FIG. 14 including a recess for a side loading arm, installed on a side loading refuse vehicle, according to an exemplary embodiment.
Figure 51:
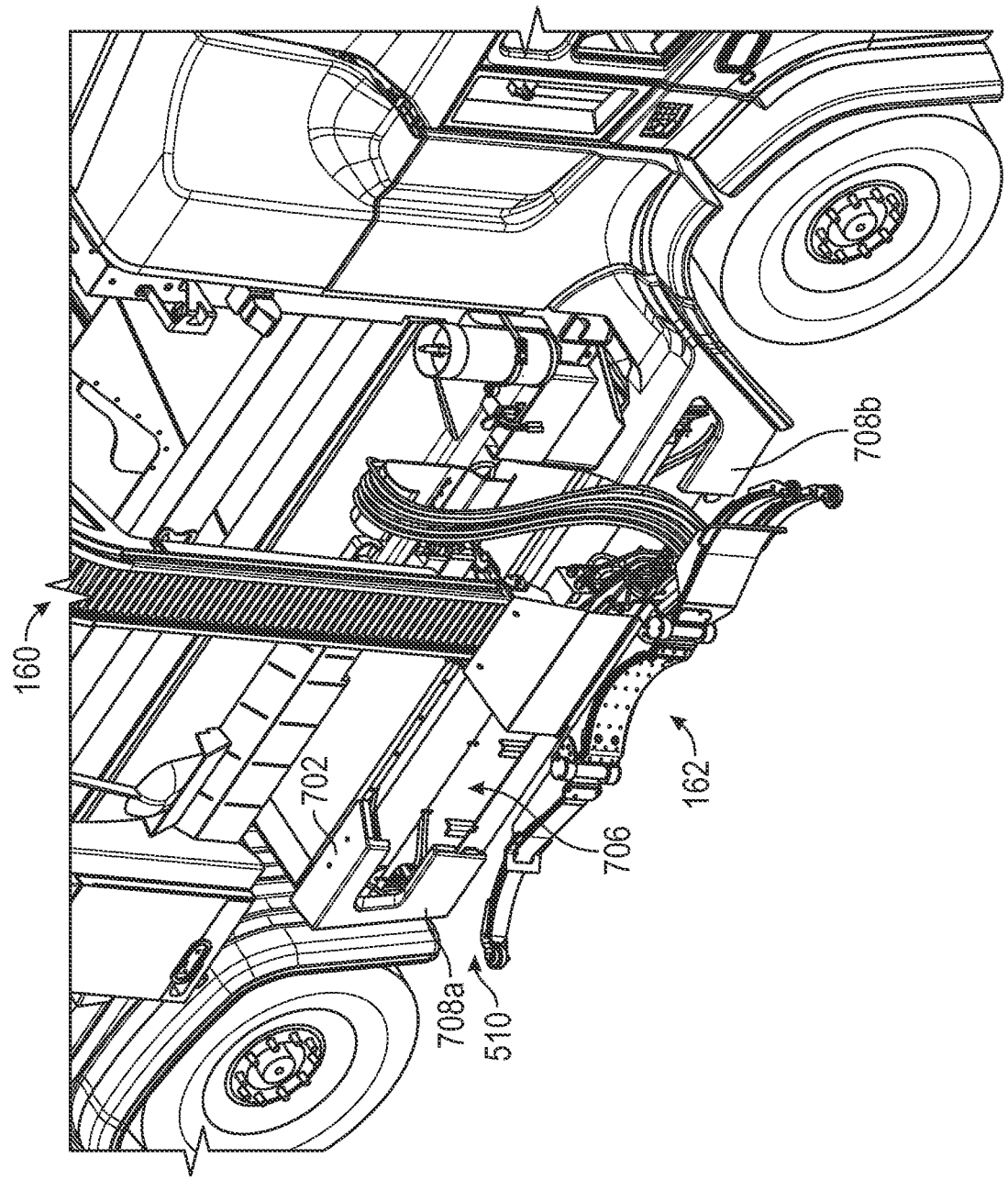
FIG. 51 is a perspective view of the underslung battery mount of FIG. 50, according to an exemplary embodiment.

Referring to FIGS. 50-51, the removable panel 702 may include a recess 706 such that the removable panel 702 is divided into two sections, a first section 708a and a second section 708b. The first section 708a and the second section 708b may be positioned on opposite sides of the grabber assembly 162. The recess 706 defines a space, a volume, etc., for the grabber assembly 162 to extend or travel through such that the removable panel 702 does not impede travel of the grabber assembly 162. In some embodiments, the first section 708a and the second section 708b cooperatively define parts of the stepping surface 806, the first space 804, and the stepping surface 808. Advantageously, the removable panel 702 includes the recess 706 to provide clearance for the grabber assembly 162 while also including discrete portions that define stepping surfaces.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
    a chassis comprising a first rail and a second rail spaced apart from each other in a lateral direction and extending lengthwise in a longitudinal direction;
    a plurality of tractive elements coupled with the chassis; and
    a battery assembly coupled to the chassis at a longitudinal position between a front pair of the plurality of tractive elements and a rear pair of the plurality of tractive elements, the battery assembly comprising a housing defining an inner volume and including:
        a medial portion positioned between the first rail and the second rail, the medial portion defining a first inner sub-volume, wherein a first battery is positioned within the first inner sub-volume;
        a first lateral portion positioned laterally outwards of the first rail, the first lateral portion defining a second inner sub-volume, wherein a second battery is positioned within the second inner sub-volume; and
        a second lateral portion positioned laterally outwards of the second rail, the second lateral portion defining a third inner sub-volume, wherein a third battery is positioned within the third inner sub-volume.

2. The refuse vehicle of claim 1, wherein the battery assembly further comprises a mounting assembly configured to support the medial portion, the first lateral portion, and the second lateral portion, the mounting assembly comprising a first mounting body configured to directly couple with the first rail on a laterally outer surface of the first rail, and a second mounting body configured to directly couple with the second rail on a laterally outer surface of the second rail.

3. The refuse vehicle of claim 2, wherein the first mounting body directly contacts the laterally outer surface of the first rail and the second mounting body directly contact the laterally outer surface of the second rail, the first mounting body coupled with the first rail by a first fastener that extends in the lateral direction, and the second mounting body coupled with the second rail by a second fastener that extends in the lateral direction.

4. The refuse vehicle of claim 2, wherein the medial portion, the first lateral portion, and the second lateral portion are hung from the first mounting body and the second mounting body through an isolator, the isolator configured to absorb forces or impacts being transferred between the medial portion, the first lateral portion, the second lateral portion and the chassis.

5. The refuse vehicle of claim 1, wherein the medial portion, the first lateral portion, and the second lateral portion define a first channel between the medial portion and the first lateral portion, and a second channel between the medial portion and the second lateral portion, wherein the first channel is configured to receive the first rail and the second channel is configured to receive the second rail.

6. The refuse vehicle of claim 5, wherein:
    an upper surface of the medial portion is positioned above a bottom of the first rail and the second rail and below a top of the first rail and the second rail;
    an upper surface of the first lateral portion is positioned above the bottom of the first rail and the second rail and below the top of the first rail and the second rail; and
    an upper surface of the second lateral portion is positioned above the bottom of the first rail and the second rail and below the top of the first rail and the second rail.

7. The refuse vehicle of claim 1, wherein the medial portion, the first lateral portion, and the second lateral portion comprise a common bottom surface, the common bottom surface disposed a distance below a bottom of the first rail and the second rail.

8. The refuse vehicle of claim 1, wherein the first battery is a first medial battery, the medial portion configured to store a second medial battery within the first inner sub-volume, wherein the first medial battery is positioned within the first inner sub-volume and the second medial battery is also positioned within the first inner sub-volume, the first medial battery extending upwards between the first rail and the second rail, and the second medial battery positioned at a vertical position beneath a bottom of the first rail and the second rail.

9. The refuse vehicle of claim 1, wherein the second battery is a first lateral battery, the first lateral portion configured to store the first lateral battery and a second lateral battery within the second inner sub-volume, wherein the first lateral battery is positioned above the second lateral battery, an upper periphery of the first lateral battery extending upwards beyond a bottom periphery of the first rail and the second rail, and a bottom periphery of the second lateral battery extending downwards beyond the bottom periphery of the first rail and the second rail.

10. The refuse vehicle of claim 1, wherein the refuse vehicle is a fully electric refuse vehicle and the first battery, the second battery, and the third battery are configured to provide electrical energy for transporting the refuse vehicle.

11. The refuse vehicle of claim 1, wherein at least one of the first lateral portion or the second lateral portion defines a plurality of steps positioned on a laterally outer side of the battery assembly, the plurality of steps configured to facilitate access to a lateral side of the refuse vehicle by a technician.

12. A chassis for a refuse vehicle, the chassis comprising:
a first rail and a second rail spaced apart from each other in a lateral direction and extending lengthwise in a longitudinal direction;
a battery assembly coupled to the first rail and the second rail, the battery assembly comprising:
a medial portion positioned between the first rail and the second rail, the medial portion defining a first inner sub-volume, wherein a first battery is positioned within the first inner sub-volume;
a first lateral portion positioned laterally outwards of the first rail, the first lateral portion defining a second inner sub-volume, wherein a second battery is positioned within the second inner sub-volume; and
a second lateral portion positioned laterally outwards of the second rail, the second lateral portion defining a third inner sub-volume, wherein a third battery is positioned within the third inner sub-volume.

13. The chassis of claim 12, wherein the battery assembly further comprises a mounting assembly configured to support the medial portion, the first lateral portion, and the second lateral portion, the mounting assembly comprising a first mounting body configured to directly couple with the first rail on a laterally outer surface of the first rail, and a second mounting body configured to directly couple with the second rail on a laterally outer surface of the second rail.

14. The chassis of claim 13, wherein the first mounting body directly contacts the laterally outer surface of the first rail and the second mounting body directly contact the laterally outer surface of the second rail, the first mounting body coupled with the first rail by a first fastener that extends in the lateral direction, and the second mounting body coupled with the second rail by a second fastener that extends in the lateral direction.

15. The chassis of claim 13, wherein the medial portion, the first lateral portion, and the second lateral portion are hang from the first mounting body and the second mounting body through an isolator, the isolator configured to absorb forces or impacts being transferred between the medial portion, the first lateral portion, the second lateral portion and the chassis.

16. The chassis of claim 12, wherein the medial portion, the first lateral portion, and the second lateral portion define a first channel between the medial portion and the first lateral portion, and a second channel between the medial portion and the second lateral portion, wherein the first channel is configured to receive the first rail and the second channel is configured to receive the second rail.

17. The chassis of claim 16, wherein:
an upper surface of the medial portion is positioned above a bottom of the first rail and the second rail and below a top of the first rail and the second rail;
an upper surface of the first lateral portion is positioned above the bottom of the first rail and the second rail and below the top of the first rail and the second rail; and
an upper surface of the second lateral portion is positioned above the bottom of the first rail and the second rail and below the top of the first rail and the second rail.

18. The chassis of claim 12, wherein the medial portion, the first lateral portion, and the second lateral portion comprise a common bottom surface, the common bottom surface disposed a distance below a bottom of the first rail and the second rail.

19. The chassis of claim 12, wherein the first battery is a first medial battery, the medial portion configured to store a second medial battery within the first inner sub-volume, wherein the first medial battery is positioned within the first inner sub-volume and the second medial battery is also positioned within the first inner sub-volume, the first medial battery extending upwards between the first rail and the second rail, and the second medial battery positioned at a vertical position beneath a bottom of the first rail and the second rail.

20. A vehicle, comprising:
a chassis comprising a first rail and a second rail spaced apart from each other in a lateral direction and extending lengthwise in a longitudinal direction;
a plurality of tractive elements coupled with the chassis; and
a battery assembly coupled to the chassis at a longitudinal position between a front pair of the plurality of tractive elements and a rear pair of the plurality of tractive elements, the battery assembly comprising a housing defining an inner volume and including:
a medial portion positioned between the first rail and the second rail, the medial portion defining a first inner sub-volume, wherein a first battery is positioned within the first inner sub-volume;
a first lateral portion positioned laterally outwards of the first rail, the first lateral portion defining a second inner sub-volume, wherein a second battery is positioned within the second inner sub-volume; and
a second lateral portion positioned laterally outwards of the second rail, the second lateral portion defining a third inner sub-volume, wherein a third battery is positioned within the third inner sub-volume.

\* \* \* \* \*